(12) United States Patent
Katoh et al.

(10) Patent No.: US 10,323,120 B2
(45) Date of Patent: Jun. 18, 2019

(54) POLYMERIZABLE COMPOSITION CONTAINING POLYMERIZABLE COMPOUND, FILM, AND HALF MIRROR FOR DISPLAYING PROJECTION IMAGE

(71) Applicant: FUJIFILM Corporation, Tokyo (JP)

(72) Inventors: Shunya Katoh, Ashigarakami-gun (JP); Yuki Nakazawa, Ashigarakami-gun (JP); Masaru Yoshikawa, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/465,829

(22) Filed: Mar. 22, 2017

(65) Prior Publication Data
US 2017/0190821 A1 Jul. 6, 2017

Related U.S. Application Data

(63) Continuation of application No. PCT/JP2015/076836, filed on Sep. 24, 2015.

(30) Foreign Application Priority Data

Sep. 25, 2014 (JP) .................. 2014-195167
Mar. 17, 2015 (JP) .................. 2015-053773

(51) Int. Cl.
| | | |
|---|---|---|
| *C08G 63/47* | (2006.01) | |
| *C08J 5/18* | (2006.01) | |
| *C08G 59/04* | (2006.01) | |
| *C08G 65/22* | (2006.01) | |
| *G02B 5/30* | (2006.01) | |
| *C08F 222/14* | (2006.01) | |
| *C09D 5/00* | (2006.01) | |
| *C09D 135/02* | (2006.01) | |
| *C09K 19/02* | (2006.01) | |
| *C09K 19/36* | (2006.01) | |
| *C09K 19/54* | (2006.01) | |
| *G02B 5/08* | (2006.01) | |
| *C08F 222/10* | (2006.01) | |
| *C08F 222/20* | (2006.01) | |
| *C08F 222/38* | (2006.01) | |
| *C09D 135/00* | (2006.01) | |

(52) U.S. Cl.
CPC ............ *C08G 63/47* (2013.01); *C08F 222/10* (2013.01); *C08F 222/14* (2013.01); *C08F 222/20* (2013.01); *C08F 222/38* (2013.01); *C08G 59/04* (2013.01); *C08G 65/22* (2013.01); *C08J 5/18* (2013.01); *C09D 5/006* (2013.01); *C09D 135/00* (2013.01); *C09D 135/02* (2013.01); *C09K 19/0275* (2013.01); *C09K 19/36* (2013.01); *C09K 19/544* (2013.01); *G02B 5/0841* (2013.01); *G02B 5/30* (2013.01); *C08F 222/385* (2013.01); *C08F 2222/1013* (2013.01); *C08F 2222/205* (2013.01); *C09K 2219/03* (2013.01)

(58) Field of Classification Search
CPC ........ C08G 63/47; C08G 59/04; C08G 65/22; C08F 222/20; C08F 222/38; C08F 222/10; C08F 222/14; C08F 222/385; C08F 2222/205; C08F 2222/1013; C09K 19/0275; C09K 19/36; C09K 19/544; C09K 2219/03; G02B 5/0841; G02B 5/30; C09D 5/006; C09D 135/02; C09D 135/00; C08J 5/18
See application file for complete search history.

(56) References Cited

U.S. PATENT DOCUMENTS

| | | |
|---|---|---|
| 6,338,902 B1 | 1/2002 | Hsu et al. |
| 6,395,351 B1 | 5/2002 | Benecke et al. |
| 6,771,340 B1 | 8/2004 | Yoshimi et al. |

(Continued)

FOREIGN PATENT DOCUMENTS

| | | |
|---|---|---|
| CN | 1257473 A | 6/2000 |
| CN | 101870651 A | 10/2010 |

(Continued)

OTHER PUBLICATIONS

Office Action dated Nov. 21, 2017 from the Japanese Patent Office in Japanese Application No. 2014-213749.
Office Action dated Nov. 21, 2017 from the Japanese Patent Office in Japanese Application No. 2014-214404.
International Search Report of PCT/JP2015/076836 dated Nov. 2, 2015 [PCT/ISA/210].
Written Opinion of PCT/JP2015/076836 dated Nov. 2, 2015 [PCT/ISA/237].
Office Action dated Mar. 6, 2018, from Japanese Patent Office in Japanese Application No. 2016-546701.
(Continued)

*Primary Examiner* — Robert S Jones
(74) *Attorney, Agent, or Firm* — Sughrue Mion, PLLC

(57) ABSTRACT

The present invention provides a polymerizable composition having low birefringence which contains at least two types of polymerizable compounds represented by Formula (I):

$$Q^1-Sp^1-[-A-L-]_m-Sp^2-Q^2 \quad (I)$$

in the formula, A represents a phenylene or a trans-1,4-cyclohexylene, L represents —OC(=O)—, —OC(=O)O—, and the like, m represents 3 to 12, $Sp^1$ and $Sp^2$ represent an alkylene of which —$CH_2$— may be substituted with —O— or the like, and the like, and $Q^1$ and $Q^2$ represent a polymerizable group, and the like, in which when a number obtained by dividing the number of trans-1,4-cyclohexylenes represented by A by m is set to mc, the polymerizable compounds include a polymerizable compound satisfying 0.5<mc<0.7 and a polymerizable compound satisfying 0.1<mc<0.3. A film such as a low birefringence phase difference film or a reflection film having high selectivity in a reflection wavelength range can be provided by using the polymerizable composition.

18 Claims, 2 Drawing Sheets

(56) References Cited

U.S. PATENT DOCUMENTS

| | | | |
|---|---|---|---|
| 6,791,645 | B2 | 9/2004 | Yano et al. |
| 7,927,671 | B2 | 4/2011 | Kato |
| 8,425,988 | B2 | 4/2013 | Hirai et al. |
| 8,771,810 | B2 | 7/2014 | Mizumura et al. |
| 9,505,980 | B2 | 11/2016 | Hirai et al. |
| 9,678,384 | B2 | 6/2017 | Ibaraki |
| 10,012,868 | B2 * | 7/2018 | Nakazawa ......... C09K 19/3068 |
| 2002/0039159 | A1 | 4/2002 | Yano et al. |
| 2003/0178609 | A1 | 9/2003 | Hammond-Smith et al. |
| 2003/0224175 | A1 | 12/2003 | Morita et al. |
| 2005/0007541 | A1 | 1/2005 | Sasada et al. |
| 2009/0087590 | A1 | 4/2009 | Aiki et al. |
| 2011/0001088 | A1 | 1/2011 | Ootsuki et al. |
| 2013/0109825 | A1 | 5/2013 | Mizumura et al. |
| 2015/0175564 | A1 | 6/2015 | Sakamoto et al. |
| 2015/0344782 | A1 | 12/2015 | Matsuyama et al. |
| 2016/0318845 | A1 | 11/2016 | Katoh et al. |
| 2017/0009138 | A1 | 1/2017 | Nakazawa et al. |
| 2017/0174991 | A1 | 6/2017 | Katoh et al. |
| 2017/0190821 | A1 | 7/2017 | Katoh et al. |
| 2017/0242175 | A1 | 8/2017 | Ibaraki |
| 2017/0349828 | A1 | 12/2017 | Katoh et al. |

FOREIGN PATENT DOCUMENTS

| | | | |
|---|---|---|---|
| JP | 2001-42127 | A | 2/2001 |
| JP | 2001-042127 | A | 2/2001 |
| JP | 2001-527570 | A | 12/2001 |
| JP | 2002-107541 | A | 4/2002 |
| JP | 2003-315553 | A | 11/2003 |
| JP | 2004-262884 | A | 9/2004 |
| JP | 2005-99236 | A | 4/2005 |
| JP | 2006-096877 | A | 4/2006 |
| JP | 2009-98596 | A | 5/2009 |
| JP | 2009-244433 | A | 10/2009 |
| JP | 2010-024438 | A | 2/2010 |
| JP | 2010-270108 | A | 12/2010 |
| JP | 2011-237513 | A | 11/2011 |
| JP | 2013-216591 | A | 10/2013 |
| JP | 2016-053149 | A | 4/2016 |
| JP | 6080884 | B2 | 2/2017 |
| WO | 2011/162291 | A1 | 12/2011 |
| WO | 2014/010325 | A1 | 1/2014 |
| WO | 2014/142026 | A1 | 9/2014 |
| WO | 2015/115390 | A1 | 8/2015 |
| WO | 2015/147243 | A1 | 10/2015 |
| WO | 2016/047648 | A1 | 3/2016 |
| WO | 2017/007007 | A1 | 1/2017 |

OTHER PUBLICATIONS

International Preliminary Report on Patentability dated Apr. 6, 2017 issued by the International Bureau in Application No. PCT/JP2015/076836 with translation of Written Opinion.
Office Action dated Mar. 26, 2018 from the U.S. Patent and Trademark Office in co-pending U.S. Appl. No. 15/448,975.
Extended European Search Report (EESR) dated Dec. 1, 2017 from the European Patent Office in European Application No. 15837387.8.
Non-Final Office Action dated Aug. 10, 2017 from the U.S. Patent and Trademark Office in U.S. Appl. No. 15/273,784.
International Preliminary Report on Patentability dated Oct. 13, 2016 from the International Bureau in International Application No. PCT/JP2015/059559.
International Search Report for PCT/JP2015/059559 dated Jun. 30, 2015.
Written Opinion for PCT/JP2015/059559 dated Jun. 30, 2015.
Partial Supplementary European Search Report dated Aug. 10, 2017, from the European Patent Office in European Application No. 15837387.8.
International Preliminary Report on Patentability with translation of Written Opinion dated Mar. 16, 2017 from the International Bureau in International Application No. PCT/JP2015/075153.
International Search Report of PCT/JP2015/075153 dated Nov. 24, 2015.
Written Opinion of PCT/JP2015/075153 dated Nov. 24, 2015.
Notification of Reasons for Refusal issued by the Japanese Patent Office dated Oct. 31, 2017, in connection with Japanese Patent Application No. 2016-546701.
Extended European Search Report issued by the EPO dated Aug. 2, 2017, in connection with European Patent Application No. 15844672.4.
International Preliminary Report on Patentability issued by WIPO dated Apr. 6, 2017 in connection with International Patent Application No. PCT/JP2015/076836.
International Search Report issued in PCT/JP2015/076836 dated Nov. 2, 2015.
Written Opinion issued in PCT/JP2015/076836 dated Nov. 2, 2015.
Non-Final Office Action issued in U.S. Appl. No. 14/886,740 dated Sep. 13, 2016.
Notice of Allowance issued in U.S. Appl. No. 14/886,740 dated Feb. 15, 2017.
U.S. Appl. No. 15/273,784, Nakazawa, filed Sep. 23, 2016.
U.S. Appl. No. 15/448,975, Katoh, filed Mar. 3, 2017.
U.S. Appl. No. 15/590,401, Ibaraki, filed May 9, 2017.
Extended European Search Report dated Aug. 2, 2017, from the European Patent Office in counterpart European Application No. 15844672.4.
Office Action dated Jun. 26, 2018 from the State Intellectual Property Office of the P.R.C. in counterpart Chinese Application No. 201580045362.5.
Notice of Allowance dated Mar. 1, 2018 from the United States Patent and Trademark Office in co-pending U.S. Appl. No. 15/273,784.
International Preliminary Report on Patentability and Translation of Written Opinion, dated Sep. 12, 2017 from the International Bureau in International application No. PCT/JP2016/057696, corresponding to U.S. Appl. No. 15/685,530.
Written Opinion, dated Jun. 14, 2016 from the International Bureau in International application No. PCT/JP2016/057696, corresponding to U.S. Appl. No. 15/685,530.
International Search Report, dated Jun. 14, 2016 from the International Bureau in International application No. PCT/JP2016/057696, corresponding to U.S. Appl. No. 15/685,530.
Notice of Allowance dated May 10, 2018 from the United States Patent and Trademark Office in co-pending U.S. Appl. No. 15/273,784.
Office Action dated Sep. 5, 2018 from the State Intellectual Property Office of the P.R.C. in counterpart Chinese Application No. 201580049139.8.
Non-Final Office Action dated Oct. 9, 2018 from the U.S. Patent and Trademark Office in co-pending U.S. Appl. No. 15/590,401.
Decision of Refusal dated Sep. 4, 2018 from the Japanese Patent Office in Japanese applicatin No. 2014-213749.
Notification of Reasons for Refusal dated Sep. 4, 2018 from the Japanese Patent Office in Japanese application No. 2014-214404.
Office Action dated Sep. 10, 2018 from the U.S. Patent and Trademark Office in co-pending U.S. Appl. No. 15/448,975.
Office Action dated Dec. 4, 2018 from the Japanese Patent Office in counterpart JP Application No. 2017-505414 (corresponds to U.S. Appl. No. 15/685,530).
Office Action dated Feb. 3, 2019 from the State Intellectual Property Office of the P.R.C. in counterpart Chinese Application No. 201580049139.8.
Office Action dated Jan. 29, 2019 from the United States Patent and Trademark Office in copending U.S. Appl. No. 15/590,401.
Office Action dated Mar. 1, 2019 in co-pending U.S. Appl. No. 15/685,530.
Office Action dated Feb. 15, 2019 in related Chinese Application No. 201580045362.5.

* cited by examiner

POLYMERIZABLE COMPOSITION CONTAINING POLYMERIZABLE COMPOUND, FILM, AND HALF MIRROR FOR DISPLAYING PROJECTION IMAGE

CROSS-REFERENCE TO RELATED APPLICATIONS

This application is a continuation of PCT International Application No. PCT/JP2015/076836 filed on Sep. 24, 2015, which claims priorities under 35 U.S.C § 119 (a) to Japanese Patent Applications Nos. 2014-195167 and 2015-053773 filed on Sep. 25, 2014 and Mar. 17, 2015, respectively, the entire contents of which are incorporated herein by reference.

BACKGROUND OF THE INVENTION

1. Field of the Invention

The present invention relates to a polymerizable composition containing a polymerizable compound. In addition, the present invention relates to a film which is prepared by using the polymerizable composition, and a half mirror for displaying a projection image which is prepared by using the polymerizable composition.

2. Description of the Related Art

It is possible to prepare various optical films such as a phase difference film or a reflection film by using a polymerizable compound having liquid crystallinity. The birefringence of the polymerizable compound is one of properties closely associated with the optical properties of an optical film to be obtained. For example, it is possible to obtain a reflection film having high selectivity in a reflection wavelength range with a film which is formed by using a polymerizable compound having low birefringence and by immobilizing a cholesteric liquid crystalline phase. In JP2004-262884A, it is disclosed that a low birefringence phase difference film, or a reflection film having high selectivity in a reflection wavelength range is obtained by using a non-liquid crystalline (meth)acrylate compound having a specific structure along with a polymerizable liquid crystal compound.

SUMMARY OF THE INVENTION

When an optical film using a polymerizable compound having liquid crystallinity is prepared, there is a case where two or more types of polymerizable compounds are used by being combined in order to obtain necessary birefringence or reflection properties at a constant film thickness. However, in the related art, a preferred range of the combination was not considered. The present inventors have found that a polymerizable compound which contains a plurality of cyclic groups having a trans-1,4-cyclohexylene group exhibits low birefringence, but in the related art, it was not considered that liquid crystallinity is controlled according to how a plurality of polymerizable compounds including the compound found by the present inventors are combined, and thus, a film having necessary birefringence or wavelength selectivity is obtained.

An object of the present invention, in particular, is to provide a polymerizable composition which contains two more types of polymerizable compounds having a trans-1,4-cyclohexylene group and a phenylene group, and has low birefringence. In addition, another object of the present invention is to provide a film such as a low birefringence phase difference film or a reflection film having high selectivity in a reflection wavelength range by using the polymerizable composition described above.

The present inventors have conducted various studies in order to attain the objects described above, have found that a ratio of a trans-1,4-cyclohexylene group to a phenylene group of each compound to be combined is controlled, and thus, liquid crystallinity or birefringence of a polymerizable composition containing the compound can be controlled, have further conducted studies on the basis of the findings, and thus, have completed the present invention.

That is, the present invention provides <1> to <18> described below.

<1> A polymerizable composition, comprising: at least two types of polymerizable compounds represented by Formula (I);

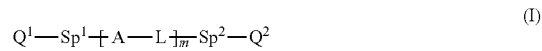
(I)

in the formula, A represents a phenylene group which may have a substituent or a trans-1,4-cyclohexylene group which may have a substituent, L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, m represents an integer of 3 to 12, Sp$^1$ and Sp$^2$ each independently represent a single bond or a linking group selected from the group consisting of a linear alkylene group or a branched alkylene group having 1 to 20 carbon atoms, and a group in which one or two or more —CH$_2$-'s in the linear alkylene group or the branched alkylene group having 1 to 20 carbon atoms are substituted with —O—, —S—, —NH—, —N(CH$_3$)—, —C(=O)—, —OC(=O)—, or —C(=O)O—, Q$^1$ and Q$^2$ each independently represent a polymerizable group selected from the group consisting of a hydrogen atom or groups represented by Formula (Q-1) to Formula (Q-5) below, and any one of Q$^1$ and Q$^2$ represents a polymerizable group,

(Q-1)

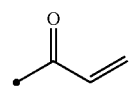
(Q-2)

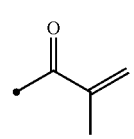
(Q-3)

(Q-4)

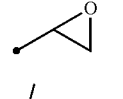
(Q-5)

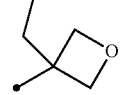

in which when a number obtained by dividing the number of trans-1,4-cyclohexylene groups which may have a substituent and are represented by A by m is set to mc, at least one type of the polymerizable compounds satisfies 0.5<mc<0.7, and other at least one type of the polymerizable compound satisfies 0.1<mc<0.3.

<2> The polymerizable composition according to <1>, in which in Formula (I), the substituent that the phenylene group and the trans-1,4-cyclohexylene group may have is selected from the group consisting of an alkyl group, an alkoxy group, and a group represented by —C(=O)—$X^3$-$Sp^3$-$Q^3$, and here, $X^3$ represents a single bond, —O—, —S—, or —N($Sp^4$-$Q^4$)—, or represents a nitrogen atom which forms a cyclic structure along with $Q^3$ and $Sp^3$, $Sp^3$ and $Sp^4$ each independently represent a single bond or a linking group selected from the group consisting of a linear alkylene group or a branched alkylene group having 1 to 20 carbon atoms, and a group in which one or two or more —$CH_2$—'s in the linear alkylene group or the branched alkylene group having 1 to 20 carbon atoms are substituted with —O—, —S—, —NH—, —N($CH_3$)—, —C(=O)—, —OC(=O)—, or —C(=O)O—, and $Q^3$ and $Q^4$ each independently represent any one polymerizable group selected from the group consisting of a hydrogen atom, a cycloalkyl group, a group in which one or two or more —$CH_2$—'s in the cycloalkyl group are substituted with —O—, —S—, —NH—, —N($CH_3$)—, —C(=O)—, —OC(=O)—, or —C(=O)O—, or groups represented by Formula (Q-1) to Formula (Q-5).

<3> The polymerizable composition according to <1> or <2>, in which in Formula (I), m is an integer of 3 to 5.

<4> The polymerizable composition according to any one of <1> to <3>, in which the compound represented by Formula (I) has a partial structure represented by Formula (II) below;

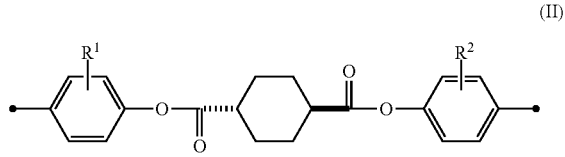

in the formula, $R^1$ and $R^2$ are each independently selected from the group consisting of a hydrogen atom, an alkyl group, an alkoxy group, and a group represented by —C(=O)—$X^3$-$Sp^3$-$Q^3$, and here, $X^3$ represents a single bond, —O—, —S—, or —N($Sp^4$-$Q^4$)—, or represents a nitrogen atom which forms a cyclic structure along with $Q^3$ and $Sp^3$, $Sp^3$ and $Sp^4$ each independently represent a single bond or a linking group selected from the group consisting of a linear alkylene group or a branched alkylene group having 1 to 20 carbon atoms, and a group in which one or two or more —$CH_2$—'s in the linear alkylene group or the branched alkylene group having 1 to 20 carbon atoms are substituted with —O—, —S—, —NH—, —N($CH_3$)—, —C(=O)—, —OC(=O)—, or —C(=O)O—, and $Q^3$ and $Q^4$ each independently represent any one polymerizable group selected from the group consisting of a hydrogen atom, a cycloalkyl group, a group in which one or two or more —$CH_2$—'s in the cycloalkyl group are substituted with —O—, —S—, —NH—, —N($CH_3$)—, —C(=O)—, —OC(=O)—, or —C(=O)O—, or groups represented by Formula (Q-1) to Formula (Q-5).

<5> The polymerizable composition <4>, in which $R^1$ and $R^2$ are each independently —C(=O)—$X^3$-$Sp^3$-$Q^3$, and $X^3$ is —O—.

<6> The polymerizable composition according to <4> or <5>, in which $R^1$ and $R^2$ are identical to each other.

<7> The polymerizable composition according to any one of <4> to <6>, comprising: at least one type of a compound represented by Formula (V) and at least one type of a compound represented by Formula (VI);

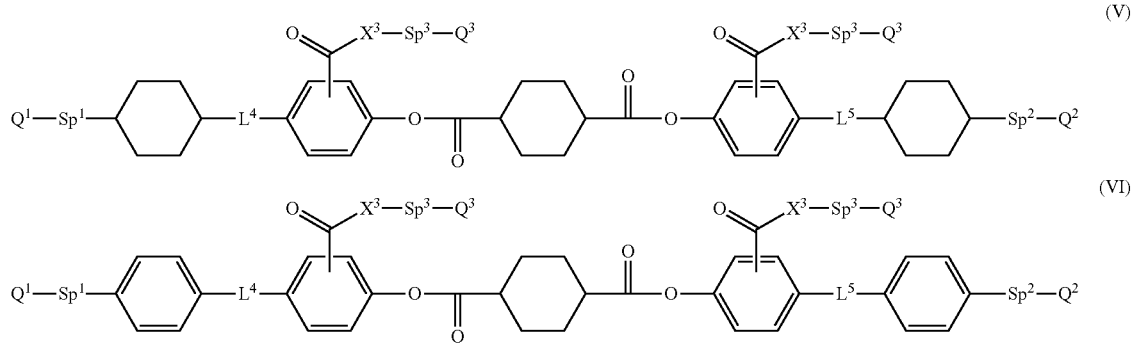

in the formulas, $L^4$ and $L^5$ each independently represent a single bond or a linking group selected from the group consisting of —C(=O)O—, —OC(=O)—, and —OC(=O)O—.

<8> The polymerizable composition according to any one of <1> to <7>, further comprising: a cross-linking agent.

<9> The polymerizable composition according to any one of <1> to <8>, further comprising: a polymerization initiator.

<10> The polymerizable composition according to any one of <1> to <9>, further comprising: a chiral compound.

<11> A film, comprising: a layer obtained by curing the polymerizable composition according to any one of <1> to <10>.

<12> A film, comprising: two or more layers obtained by curing the polymerizable composition according to any one of <1> to <10>.

<13> The film according to <11> or <12>, in which the film exhibits selective reflection, and $\Delta\lambda/\lambda$ which is a ratio of a half-width $\Delta\lambda$ of a wavelength range of the selective reflection to a center wavelength $\lambda$, of the selective reflection is less than or equal to 0.09.

<14> The film according to any one of <11> to <13>, in which the film reflects visible light.

<15> A film, comprising: at least three layers formed of the polymerizable composition according to any one of <1> to <10>, in which the three layers are a layer formed by immobilizing a cholesteric liquid crystalline phase having a center wavelength of selective reflection in a red light wavelength range, a layer formed by immobilizing a cholesteric liquid crystalline phase having a center wavelength of selective reflection in a green light wavelength range, and a layer formed by immobilizing a cholesteric liquid crystalline phase having a center wavelength of selective reflection in a blue light wavelength range.

<16> A half mirror for displaying a projection image, comprising: the film according to <15>.

<17> The half mirror for displaying a projection image according to <16>, further comprising: a base material which is inorganic glass or an acrylic resin.

<18> The half mirror for displaying a projection image according to <16> or <17>, further comprising: an antireflection layer on an outermost surface.

According to the present invention, a polymerizable composition having low birefringence is provided as a polymerizable composition which contains two or more types of polymerizable compounds having a trans-1,4-cyclohexylene group and a phenylene group. It is possible to provide a film such as a low birefringence phase difference film or a reflection film having high selectivity in a reflection wavelength range by using the polymerizable composition of the present invention.

DESCRIPTION OF THE PREFERRED EMBODIMENTS

Figure 1:
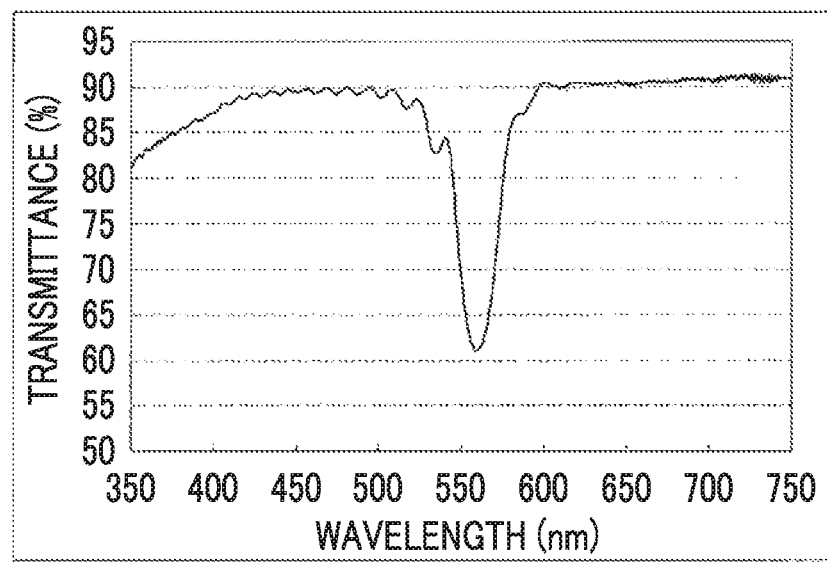
FIG. 1 is a diagram illustrating a transmission spectrum of a selective reflection film 1 which is prepared in an example.

Hereinafter, the present invention will be described in detail. Furthermore, herein, a numerical range represented by using "to" indicates a range including the numerical values before and after "to" as the lower limit value and the upper limit value.

Herein, "(meth)acrylate" indicates "any one or both of acrylate and methacrylate". The same applies to "(meth) acryl group" or the like, and "(meth)acryloyl group" indicates "any one or both of an acryloyl group and a methacryloyl group".

Herein, a phase difference indicates in-plane retardation, and indicates in-plane retardation at a wavelength of 550 nm, unless otherwise a wavelength is stated. Herein, the in-plane retardation is measured by using a polarization phase difference analysis device AxoScan manufactured by Axometrics, Inc. The in-plane retardation at a wavelength of λ nm can be measured by allowing light at a wavelength of λ nm to be incident in a film normal direction using KOBRA 21ADH or WR (manufactured by Oji Scientific Instruments).

<Polymerizable Composition>

A polymerizable composition of the present invention contains two or more types of polymerizable compounds represented by Formula (I).

The polymerizable composition may contain other components such as other liquid crystal compounds, a chiral compound, a polymerization initiator, and an alignment control agent, in addition to the polymerizable compound represented by Formula (I). Hereinafter, each component will be described.

[Polymerizable Compound Represented by Formula (I)]

The polymerizable compound represented by Formula (I) has m cyclic divalent groups represented by A. m A's may be different from each other, or some A's of m A's may be identical to each other. The cyclic divalent group is a phenylene group which may have a substituent or a trans-1,4-cyclohexylene group which may have a substituent. That is, A represents a phenylene group which may have a substituent or a trans-1,4-cyclohexylene group which may have a substituent. Herein, when A is a phenylene group, a 1,4-phenylene group is preferable.

The polymerizable composition of the present invention may contain the polymerizable compound represented by Formula (I) having a phenylene group which may have at least one substituent and a trans-1,4-cyclohexylene group which may have at least one substituent.

m represents an integer of 3 to 12, is preferably an integer of 3 to 9, is more preferably an integer of 3 to 7, and is even more preferably an integer of 3 to 5.

In Formula (I), the substituent of the phenylene group and the trans-1,4-cyclohexylene group "which may have a substituent" is not particularly limited, and examples of the substituent include a substituent selected from the group consisting of an alkyl group, a cycloalkyl group, an alkoxy group, an alkyl ether group, an amido group, an amino group, a halogen atom, and a group configured by combining two or more substituents described above. In addition, examples of the substituent include a substituent represented by —C(=O)—$X^3$-$Sp^3$-$Q^3$ described below. The phenylene group and the trans-1,4-cyclohexylene group may have 1 to 4 substituents. When the phenylene group and the trans-1, 4-cyclohexylene group have two or more substituents, the two or more substituents may be identical to each other or different from each other.

Herein, the alkyl group may be any one of a linear alkyl group and a branched alkyl group. The number of carbon atoms of the alkyl group is preferably 1 to 30, is more preferably 1 to 10, and is particularly preferably 1 to 6. Examples of the alkyl group can include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethyl propyl group, an n-hexyl group, an isohexyl group, a linear heptyl group or a branched heptyl group, an octyl group, a nonyl group, a decyl group, a undecyl group, or a dodecyl group. The same description with respect to the alkyl group described above applies to an alkoxy group including the alkyl group. In addition, herein, in the alkylene group, specific examples of the alkylene group include a divalent group or the like obtained by removing one arbitrary hydrogen atom from each of the examples of the alkyl group described above. Examples of the halogen atom include a fluorine atom, a chlorine atom, a bromine atom, and an iodine atom.

Herein, the number of carbon atoms of the cycloalkyl group is preferably 3 to 20, is more preferably greater than or equal to 5, and is preferably less than or equal to 10, is more preferably less than or equal to 8, and is even more preferably less than or equal to 6. Examples of the cycloalkyl group can include a cyclopropyl group, a cyclobutyl group, a cyclopentyl group, a cyclohexyl group, a cycloheptyl group, and a cyclooctyl group.

In particular, a substituent selected from the group consisting of an alkyl group, an alkoxy group, and —C(=O)—

$X^3$-$Sp^3$-$Q^3$ is preferable as the substituent that the phenylene group and the trans-1,4-cyclohexylene group may have. Here, $X^3$ represents a single bond, —O—, —S—, or —N($Sp^4$-$Q^4$)-, or represents a nitrogen atom which forms a cyclic structure along with $Q^3$ and $Sp^3$. $Sp^3$ and $Sp^4$ each independently represent a single bond or a linking group selected from the group consisting of a linear alkylene group or a branched alkylene group having 1 to 20 carbon atoms, and a group in which one or two or more —$CH_2$-'s in the linear alkylene group or the branched alkylene group having 1 to 20 carbon atoms are substituted with —O—, —S—, —NH—, —N($CH_3$)—, —C(=O)—, —OC(=O)—, or —C(=O)O—.

$Q^3$ and $Q^4$ each independently represent any one polymerizable group selected from the group consisting of a hydrogen atom, a cycloalkyl group, a group in which one or two or more —$CH_2$-'s in the cycloalkyl group are substituted with —O—, —S—, —NH—, —N($CH_3$)—, —C(=O)—, —OC(=O)—, or —C(=O)O—, or groups represented by Formula (Q-1) to Formula (Q-5).

Specifically, examples of the group in which one or two or more —$CH_2$-'s in the cycloalkyl group are substituted with —O—, —S—, —NH—, —N($CH_3$)—, —C(=O)—, —OC(=O)—, or —C(=O)O— include a tetrahydrofuranyl group, a pyrrolidinyl group, an imidazolidinyl group, a pyrazolidinyl group, a piperidyl group, a piperazinyl group, a morpholinyl group, and the like. A substitution position is not particularly limited. Among them, the tetrahydrofuranyl group is preferable, and a 2-tetrahydrofuranyl group is particularly preferable.

In Formula (I), L represents a single bond or a linking group selected from the group consisting of —$CH_2$O—, —O$CH_2$—, —($CH_2$)$_2$OC(=O)—, —C(=O)O($CH_2$)$_2$—, —C(=O)O—, —OC(=O)—, —OC(=O)O—, —CH=CH—C(=O)O—, and —OC(=O)—CH=CH—. It is preferable that L is —C(=O)O— or —OC(=O)—. m L's may be identical to each other or different from each other.

atom, or groups represented by Formula (Q-1) to Formula (Q-5) below, and any one of $Q^1$ and $Q^2$ represents a polymerizable group.

(Q-1)

(Q-2)

(Q-3)

(Q-4)

(Q-5)

An acryloyl group (Formula (Q-1)) or a methacryloyl group (Formula (Q-2)) is preferable as the polymerizable group.

Specifically, examples of the polymerizable compound represented by Formula (I) can include a polymerizable compound represented by Formula (I-11) below, a polymerizable compound represented by Formula (I-21), a polymerizable compound represented by Formula (I-31), and the like, in addition to known compounds described in JP2013-112631A, JP2010-70543A, JP4725516B, and the like.

Polymerizable Compound Represented by Formula (I-11)

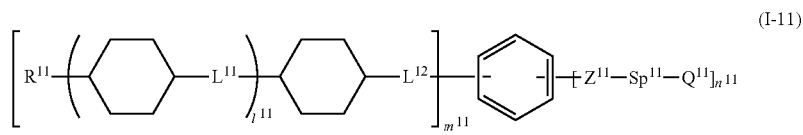
(I-11)

$Sp^1$ and $Sp^2$ each independently represent a single bond or a linking group selected from the group consisting of a linear alkylene group or a branched alkylene group having 1 to 20 carbon atoms, and a group in which one or two or more —$CH_2$-'s in the linear alkylene group or the branched having 1 to 20 carbon atoms are substituted with —O—, —S—, —NH—, —N($CH_3$)—, —C(=O)—, —OC(=O)—, or —C(=O)O—. It is preferable that $Sp^1$ and $Sp^2$ are each independently a linking group configured by combining one or two or more groups selected from the group consisting of a linear alkylene group having 1 to 10 carbon atoms in which a linking group selected from the group consisting of —O—, —OC(=O)—, and —C(=O)O— is bonded to both terminals, —OC(=O)—, —C(=O)O—, —O—, and a linear alkylene group having 1 to 10 carbon atoms, and it is more preferable that $Sp^1$ and $Sp^2$ are each independently a linear alkylene group having 1 to 10 carbon atoms in which —O— is bonded to each of both terminals.

$Q^1$ and $Q^2$ each independently represent a polymerizable group selected from the group consisting of a hydrogen In the formula, $R^{11}$ represents a hydrogen atom, a linear alkyl group or a branched alkyl group having 1 to 12 carbon atoms, or —$Z^{12}$-$Sp^{12}$-$Q^{12}$, $L^{11}$ represents a single bond, —C(=O)O—, or —O(C=O)—, $L^{12}$ represents —C(=O)O—, —OC(=O)—, or —CONR$^2$—, $Z^{11}$ and $Z^{12}$ each independently represent a single bond, —O—, —NH—, —N($CH_3$)—, —S—, —C(=O)O—, —OC(=O)—, —OC(=O)O—, or —C(=O)NR$^{12}$—, $R^{12}$ represents a hydrogen atom or -$Sp^{12}$-$Q^{12}$, $Sp^{11}$ and $Sp^{12}$ each independently represent a single bond, a linear alkylene group or a branched alkylene group having 1 to 12 carbon atoms which may be substituted with $Q^{11}$, or a linking group obtained by substituting one or more —$CH_2$-'s in the linear alkylene group or the branched alkylene group having 1 to 12 carbon atoms which may be substituted with $Q^{11}$ with —O—, —S—, —NH—, —N($Q^{11}$)-, or —C(=O)—, $Q^{11}$ represents a polymerizable group selected from the group consisting of a hydrogen atom, a cycloalkyl group, one or two or more —CH$_2$-'s in the cycloalkyl group are substituted with —O—, —S—, —NH—, —N(CH$_3$)—, —C(=O)—, —OC(=O)—, or —C(=O)O—, or groups represented by Formula (Q-1) to Formula (Q-5), Q$^{12}$ represents a polymerizable group selected from the group consisting of a hydrogen atom or groups represented by group Formula (Q-1) to Formula (Q-5), l$^{11}$ represents an integer of 0 to 2, m$^{11}$ represents an integer of 1 or 2, n$^{11}$ represents an integer of 1 to 3, and a plurality of R$^{11}$'s, a plurality of L$^{11}$'s, a plurality of L$^{12}$'s, a plurality of l$^{11}$'s, a plurality of Z$^{11}$'s, a plurality of Sp$^{11}$'s, and a plurality of Q$^{11}$'s may be respectively identical to each other or different from each other. In addition, the polymerizable compound represented by Formula (I-11) has at least one —Z$^{12}$-Sp$^{12}$-Q$^{12}$, in which Q$^{12}$ is a polymerizable group selected from the group consisting of groups represented by Formula (Q-1) to Formula (Q-5), as R$^{11}$. It is preferable that the polymerizable compound represented by Formula (I-11) has at least one group selected from the group consisting of —Z$^{11}$-Sp$^{11}$-Q$^{11}$ in which Z$^{11}$ is —C(=O)O— or —C(=O)NR$^{12}$—, and Q$^{11}$ is a polymerizable group selected from the group consisting of groups represented by Formula (Q-1) to Formula (Q-5), and —Z$^{12}$-Sp$^{12}$-Q$^{12}$ in which Z$^{12}$ is —C(=O)O— or —C(=O)NR$^{12}$—, and Q$^{12}$ is a polymerizable group selected from the group consisting of groups represented by Formula (Q-1) to Formula (Q-5).

All 1,4-cyclohexylene groups in the polymerizable compound represented by Formula (I-11) are trans-1,4-cyclohexylene groups.

Examples of a particularly preferred compound of the polymerizable compound represented by Formula (I-11) include a compound in which L$^{11}$ is a single bond, l$^{11}$ is 1 (a dicyclohexylene group), and Q$^{11}$ is a polymerizable group selected from the group consisting of groups represented by Formula (Q-1) to Formula (Q-5).

Example of another particularly preferred compound of the polymerizable compound represented by Formula (I-11) include a compound in which m$^{11}$ is 2, l$^{11}$ is 0, both of two R$^{11}$'s represent —Z$^{12}$-Sp$^{12}$-Q$^{12}$, and Q$^{12}$ is a polymerizable group selected from the group consisting of groups represented by Formula (Q-1) to Formula (Q-5).

Polymerizable Compound Represented by Formula (I-21)

when m21 represents 2, two Z$^{21}$'s may be identical to each other or different from each other, at least one of Z$^{21}$ or Z$^{22}$ is a phenylene group which may have a substituent, L$^{21}$, L$^{22}$, L$^{23}$, and L$^{24}$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, X$^{21}$ represents —O—, —S—, or —N(Sp$^{25}$-Q$^{25}$)-, or represents a nitrogen atom which forms a cyclic structure along with Q$^{23}$ and Sp$^{23}$, r21 represents an integer of 1 to 4, Sp$^{21}$, Sp$^{22}$, Sp$^{23}$, Sp$^{24}$, and Sp$^{25}$ each independently represent a single bond or a linking group selected from the group consisting of a linear alkylene group or a branched alkylene group having 1 to 20 carbon atoms, and a group in which one or two or more —CH$_2$-'s in the linear alkylene group or the branched alkylene group having 1 to 20 carbon atoms are substituted with —O—, —S—, —NH—, —N(CH$_3$)—, —C(=O)—, —OC(=O)—, or —C(=O)O—, Q$^{21}$ and Q$^{22}$ each independently represent any one polymerizable group selected from the group consisting of groups represented by Formula (Q-1) to Formula (Q-5), Q$^{23}$ represents any one polymerizable group selected from the group consisting of a hydrogen atom, a cycloalkyl group, a group in which one or two or more —CH$_2$-'s in the cycloalkyl group are substituted with —O—, —S—, —NH—, —N(CH$_3$)—, —C(=O)—, —OC(=O)—, or —C(=O)O—, or groups represented by Formula (Q-1) to Formula (Q-5), or represents a single bond in a case where X$^{21}$ is a nitrogen atom which forms a cyclic structure along with Q$^{23}$ and Sp$^{23}$, and Q$^{25}$ represents any one polymerizable group selected from the group consisting of a hydrogen atom, a cycloalkyl group, a group in which one or two or more —CH$_2$-'s in the cycloalkyl group are substituted with —O—, —S—, —NH—, —N(CH$_3$)—, —C(=O)—, —OC(=O)—, or —C(=O)O—, or groups represented by Formula (Q-1) to Formula (Q-5), and when Sp$^{25}$ is a single bond, Q$^{25}$ is not a hydrogen atom.

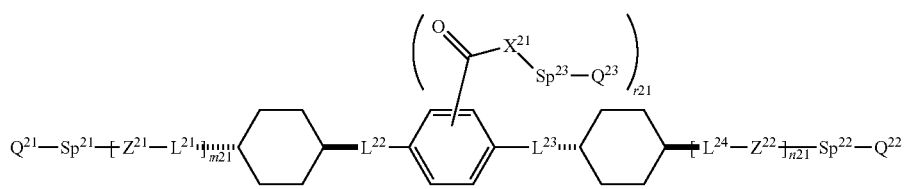

(I-21)

In the formula, Z$^{21}$ and Z$^{22}$ each independently represent a trans-1,4-cyclohexylene group which may have a substituent and a phenylene group which may have a substituent, all of the substituents described above are each independently 1 to 4 substituents selected from the group consisting of —CO—X$^{21}$-Sp$^{23}$-Q$^{23}$, an alkyl group, and an alkoxy group, m21 represents an integer of 1 or 2, and n21 represents an integer of 0 or 1, when m21 represents 2, n21 represents 0, It is also preferable that the polymerizable compound represented by Formula (I-21) has a structure in which a 1,4-phenylene group and a trans-1,4-cyclohexylene group alternately exist, and for example, a structure is preferable in which m21 is 2, n21 is 0, and Z$^{21}$ is each of a trans-1,4-cyclohexylene group which may have a substituent and an arylene group which may have a substituent from a Q$^{21}$ side, or m21 is 1, n21 is 1, Z$^{21}$ is an arylene group which may have a substituent, and Z$^{22}$ is an arylene group which may have a substituent.

Polymerizable Compound Represented by Formula (I-31);

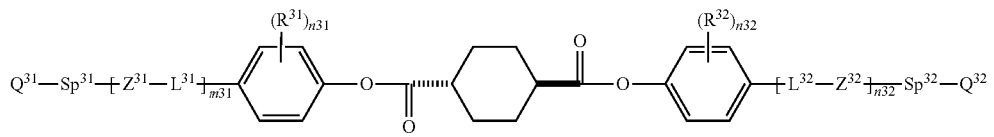

(I-31)

In the formula, $R^{31}$ and $R^{32}$ are each independently a group selected from the group consisting of an alkyl group, an alkoxy group, and —C(=O)—$X^{31}$-$Sp^{33}$-$Q^{33}$, n31 and n32 each independently represent an integer of 0 to 4, $X^{31}$ represents a single bond, —O—, —S—, or —N($Sp^{34}$-$Q^{34}$)-, or represents a nitrogen atom which forms a cyclic structure along with $Q^{33}$ and $Sp^{33}$, $Z^{31}$ represents a phenylene group which may have a substituent, $Z^{32}$ represents a trans-1,4-cyclohexylene group which may have a substituent or a phenylene group which may have a substituent, all of the substituents described above are each independently 1 to 4 substituents selected from the group consisting of an alkyl group, an alkoxy group, and —C(=O)—$X^{31}$-$Sp^{33}$-$Q^{33}$, m31 represents an integer of 1 or 2, and m32 represents an integer of 0 to 2, when m31 and m32 represent 2, two $Z^{31}$'s and $Z^{32}$'s may be identical to each other or different from each other, $L^{31}$ and $L^{32}$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, $Sp^{31}$, $Sp^{32}$, $Sp^{33}$, and $Sp^{34}$ each independently represent a single bond or a linking group selected from the group consisting of a linear alkylene group or a branched alkylene group having 1 to 20 carbon atoms, and a group in which one or two or more —CH$_2$-'s in the linear alkylene group or the branched alkylene group having 1 to 20 carbon atoms are substituted with —O—, —S—, —NH—, —N(CH$_3$)—, —C(=O)—, —OC(=O)—, or —C(=O)O—, $Q^{31}$ and $Q^{32}$ each independently represent any one polymerizable group selected from the group consisting of groups represented by Formula (Q-1) to Formula (Q-5), and $Q^{33}$ and $Q^{34}$ each independently represent any one polymerizable group selected from the group consisting of a hydrogen atom, a cycloalkyl group, a group in which one or two or more —CH$_2$-'s in the cycloalkyl group are substituted with —O—, —S—, —NH—, —N(CH$_3$)—, —C(=O)—, —OC(=O)—, or —C(=O)O—, or groups represented by Formula (Q-1) to Formula (Q-5), in a case where $Q^{33}$ forms a cyclic structure along with $X^{31}$ and $Sp^{33}$, $Q^{33}$ may represent a single bond, and when $Sp^{34}$ is a single bond, $Q^{34}$ is not a hydrogen atom.

Examples of a particularly preferred compound of the polymerizable compound represented by Formula (I-31) include a compound in which $Z^{32}$ is a phenylene group and a compound in which m32 is 0.

It is preferable that the compound represented by Formula (I) has a partial structure represented by Formula (II) below.

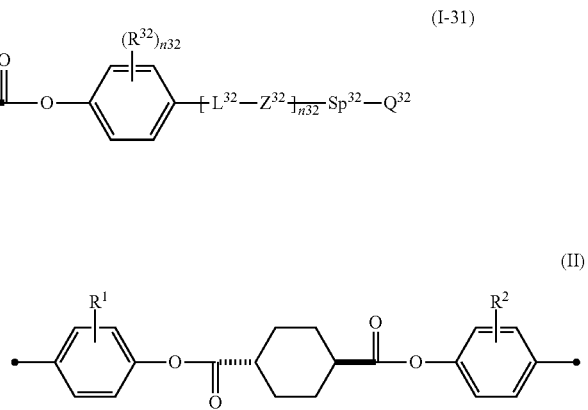

(II)

In Formula (II), a black circle represents a bonding position with the other portion of Formula (I). The partial structure represented by Formula (II) may be included as a part of a partial structure represented by Formula (III) described below in Formula (I).

(III)

In the formula, $R^1$ and $R^2$ are each independently a group selected from the group consisting of a hydrogen atom, an alkyl group, an alkoxy group, and —C(=O)—$X^3$-$Sp^3$-$Q^3$. Here, $X^3$ represents a single bond, —O—, —S—, or —N($Sp^4$-$Q^4$)-, or represents a nitrogen atom which forms a cyclic structure along with $Q^3$ and $Sp^3$. It is preferable that $X^3$ is a single bond or —O—. It is preferable that $R^1$ and $R^2$ are —C(=O)—$X^3$-$Sp^3$-$Q^3$. In addition, it is preferable that $R^1$ and $R^2$ are identical to each other. A bonding position of each of $R^1$ and $R^2$ with respect to a phenylene group is not particularly limited.

$Sp^3$ and $Sp^4$ each independently represent a single bond or a linking group selected from the group consisting of a linear alkylene group or a branched alkylene group having 1 to 20 carbon atoms, and a group in which one or two or more —CH$_2$-'s in the linear alkylene group or the branched having 1 to 20 carbon atoms are substituted with —O—, —S—, —NH—, —N(CH$_3$)—, —C(=O)—, —OC(=O)—, or —C(=O)O—. It is preferable that $Sp^3$ and $Sp^4$ are each independently a linear alkylene group or a branched alkylene group having 1 to 10 carbon atoms, it is more preferable that $Sp^3$ and $Sp^4$ are each independently a linear alkylene group having 1 to 5 carbon atoms, and it is even more preferable that $Sp^3$ and $Sp^4$ are each independently a linear alkylene group having 1 to 3 carbon atoms.

$Q^3$ and $Q^4$ each independently represent any one polymerizable group selected from the group consisting of a hydrogen atom, a cycloalkyl group, a group in which one or two or more —CH$_2$-'s in the cycloalkyl group are substituted with —O—, —S—, —NH—, —N(CH$_3$)—, —C(=O)—, —OC(=O)—, or —C(=O)O—, or groups represented by Formula (Q-1) to Formula (Q-5).

It is preferable that the represented by Formula (I), for example, has a structure represented by Formula (II-2) below.

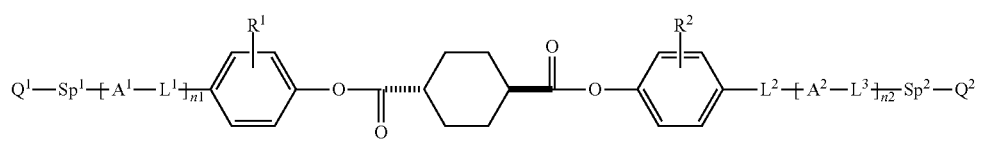

(II-2)

In the formula, $A^1$ and $A^2$ each independently represent a phenylene group which may have a substituent or a cyclohexylene group which may have a substituent, and all of the substituents described above are each independently 1 to 4 substituents selected from the group consisting of an alkyl group, an alkoxy group, and —C(=O)—X$^3$-Sp$^3$-Q$^3$, $L^1$, $L^2$, and $L^3$ represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)O—, —CH=CH—C(=O)O—, and —OC(=O)—CH=CH—, and n1 and n2 each independently represent an integer of 0 to 9, and n1+n2 is less than or equal to 9.

Hereinafter, in the polymerizable compound represented by Formula (I), an example of a compound in which 0.5<mc<0.7 and an example of a compound in which 0.1<mc<0.3 will be described, but the present invention is not limited thereto.

(Example of Compound in which 1.0.5<mc<0.7)

1-1

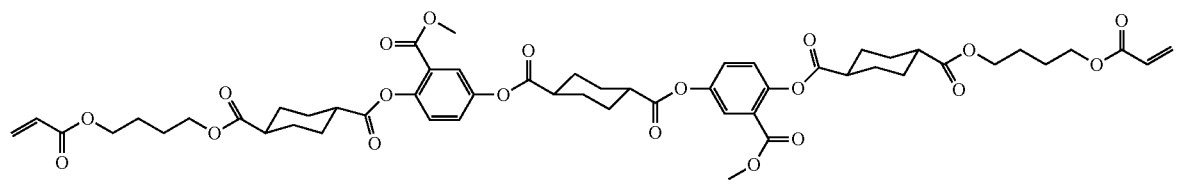

1-2

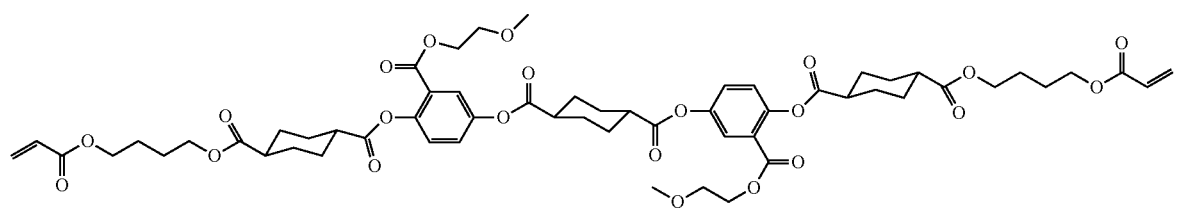

1-3

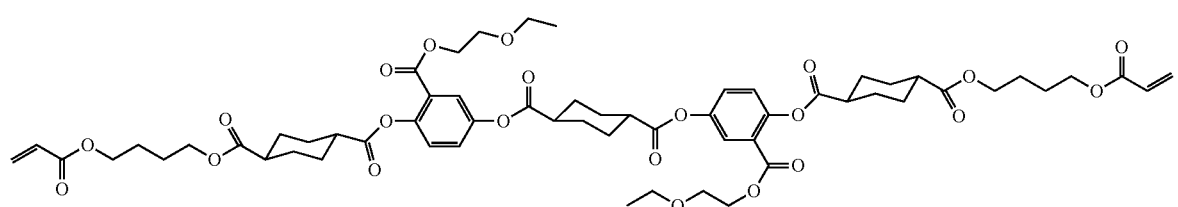

1-4

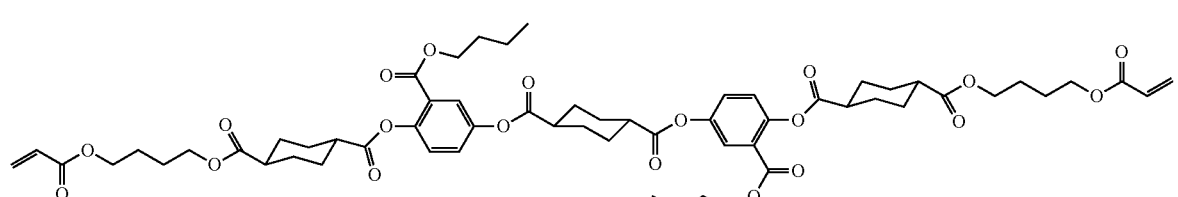

1-5

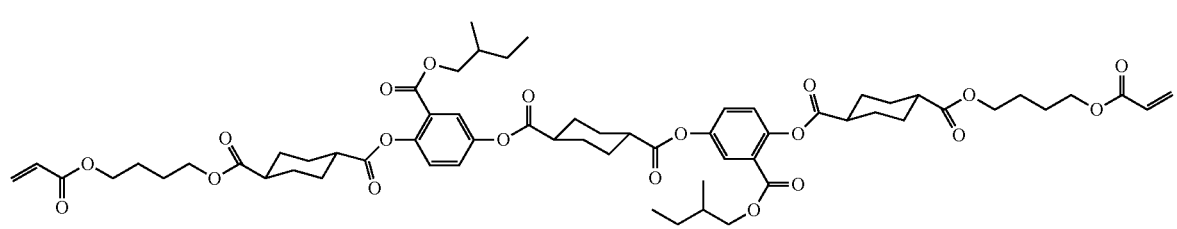

1-6
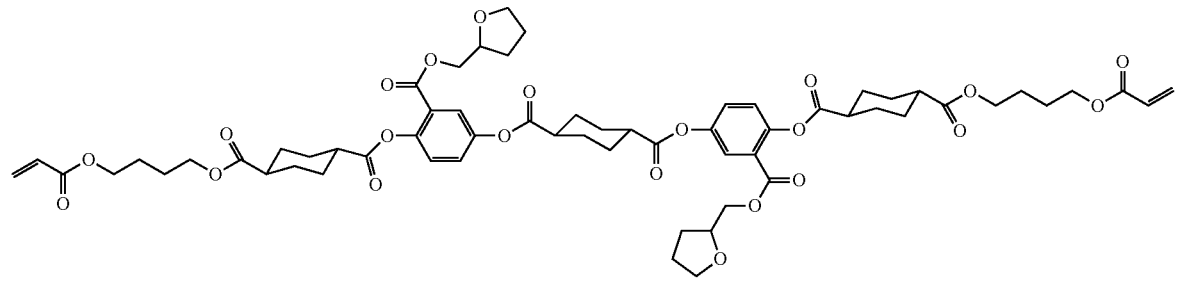
1-7
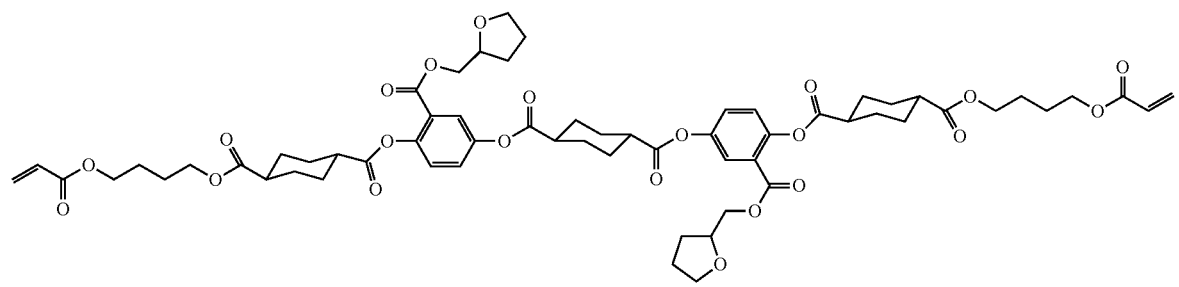
1-8
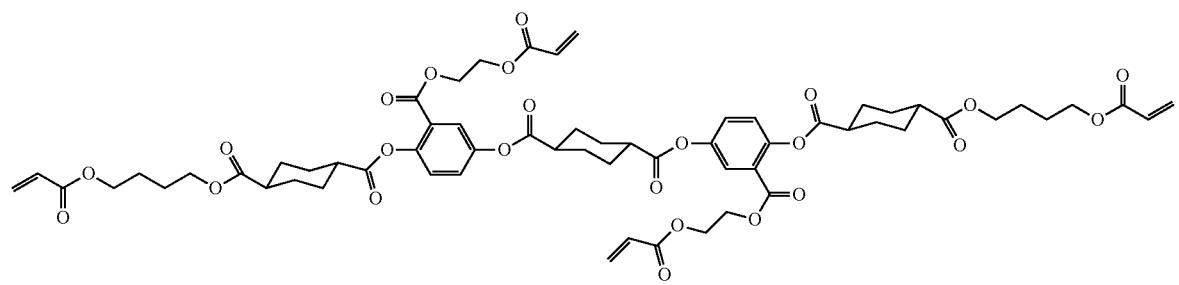
1-9
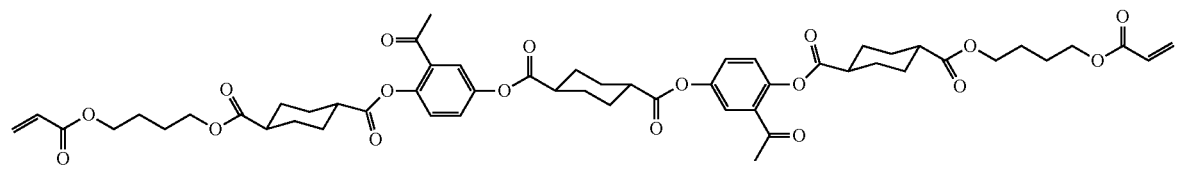
1-10
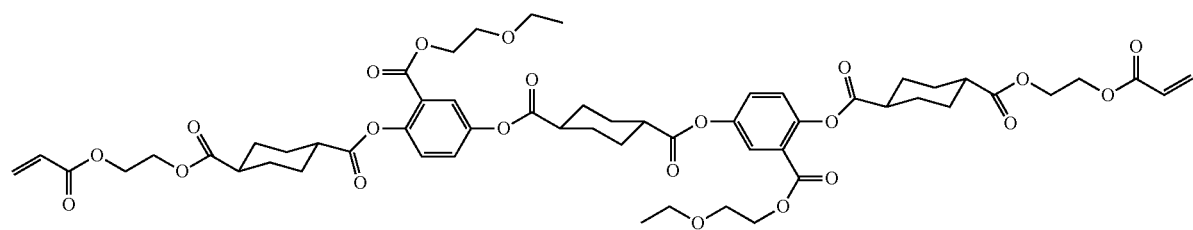
1-11
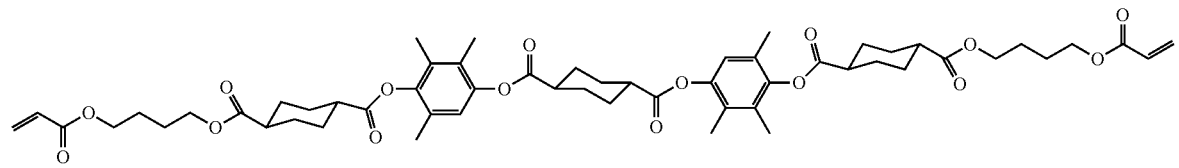

1-12
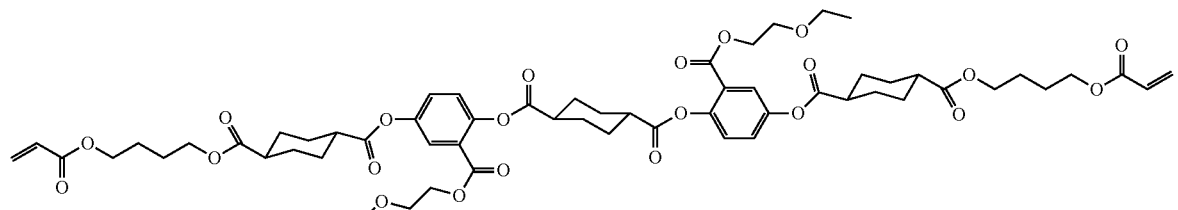
1-13
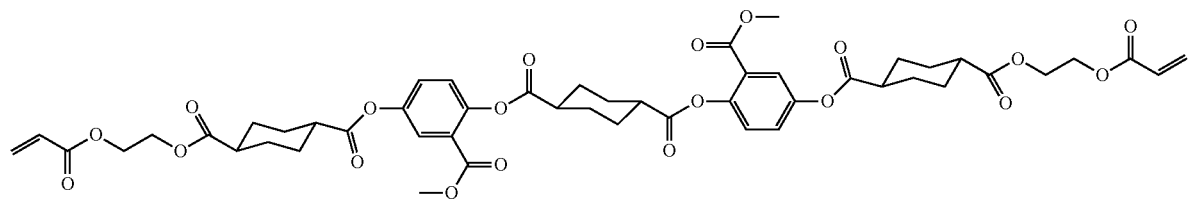
1-14
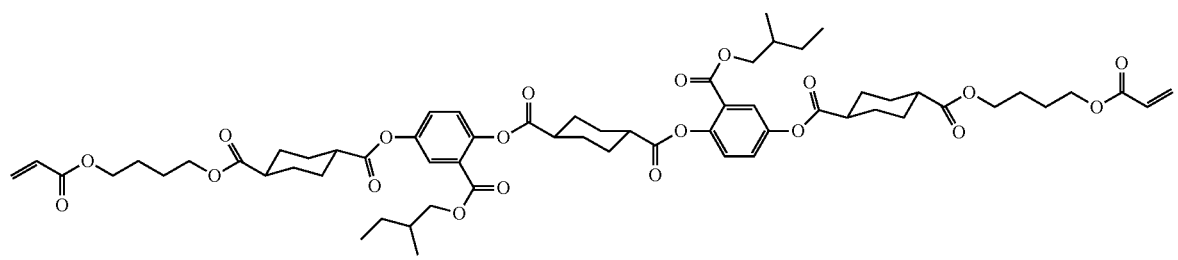
1-15
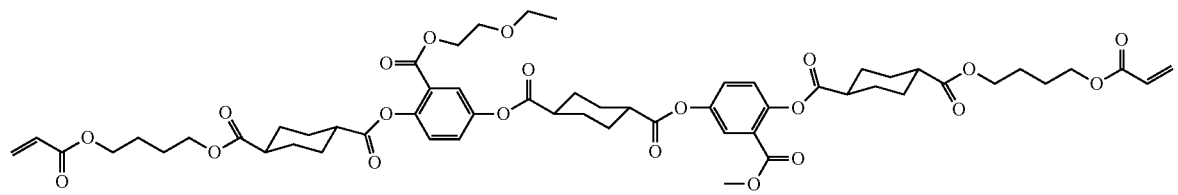
1-16
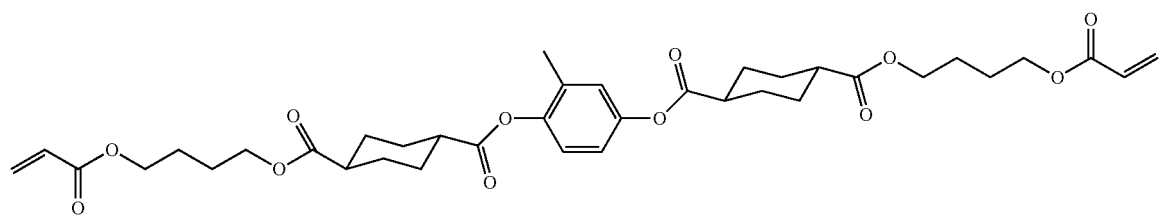
1-17
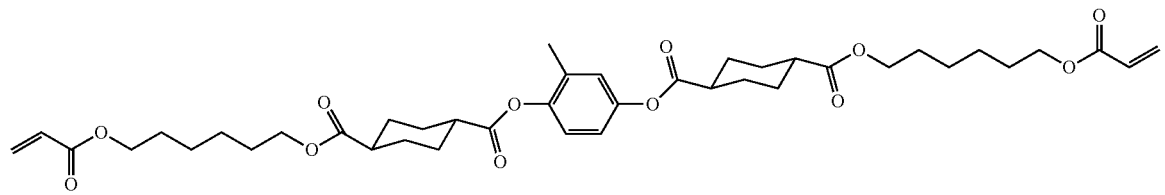
1-18
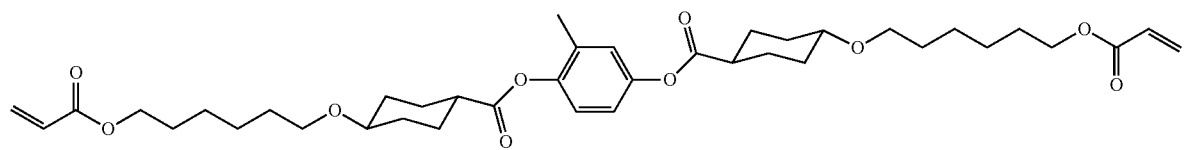

-continued
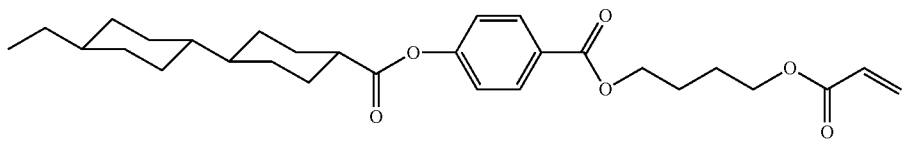
1-19
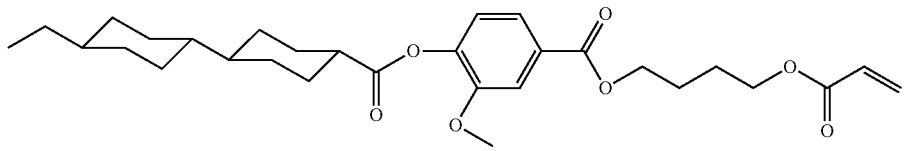
1-20
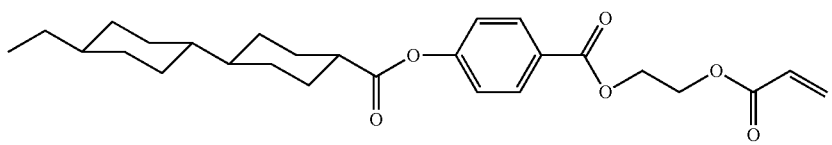
1-21
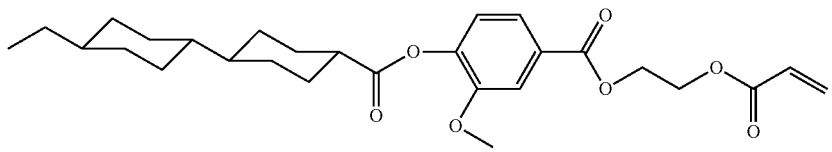
1-22
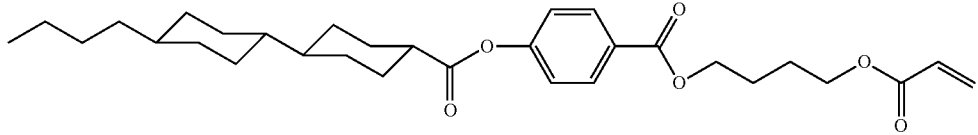
1-23
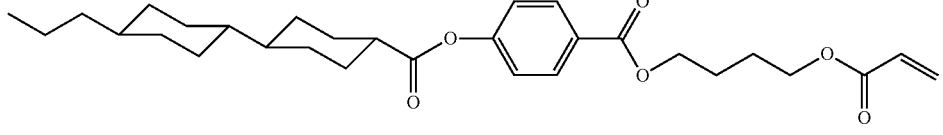
1-24
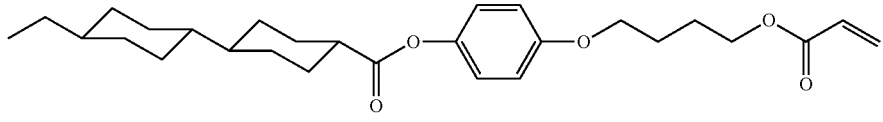
1-25
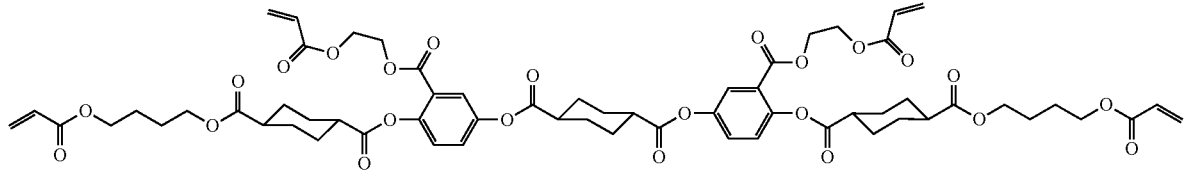
1-26
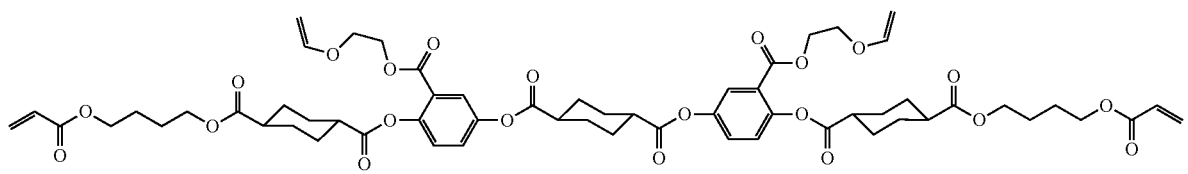
1-27

1-28
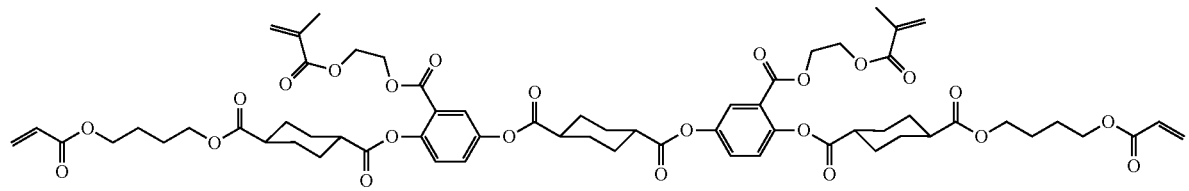
1-29
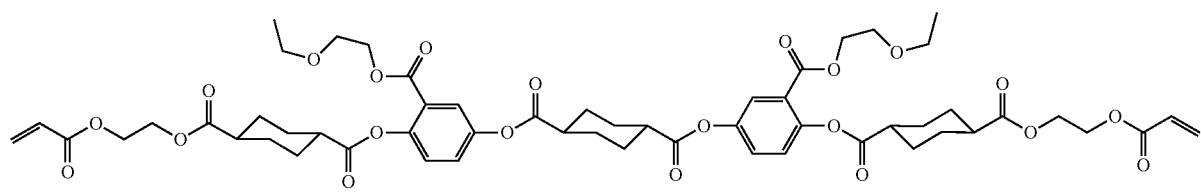
1-30
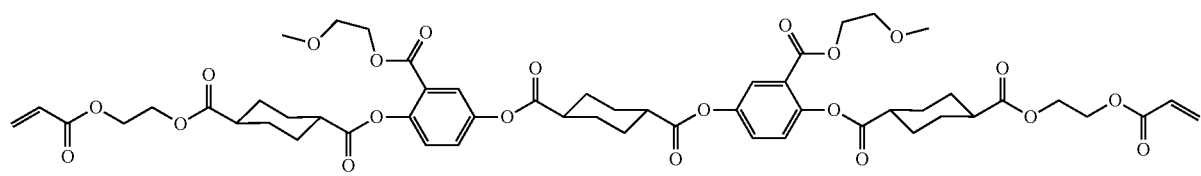
1-31
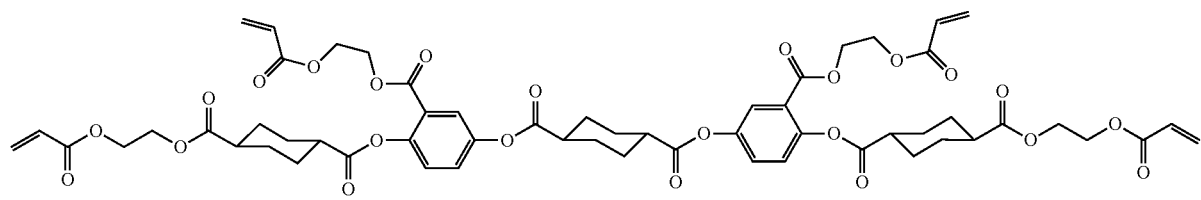
1-32
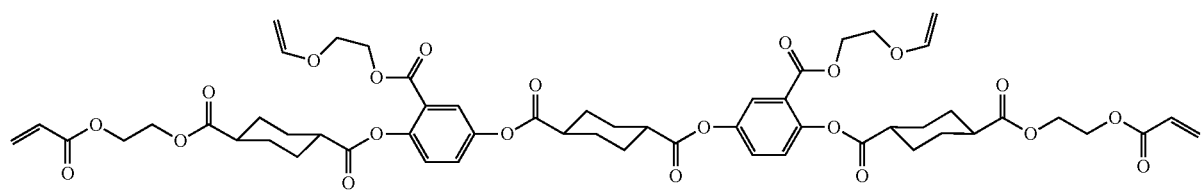
1-33
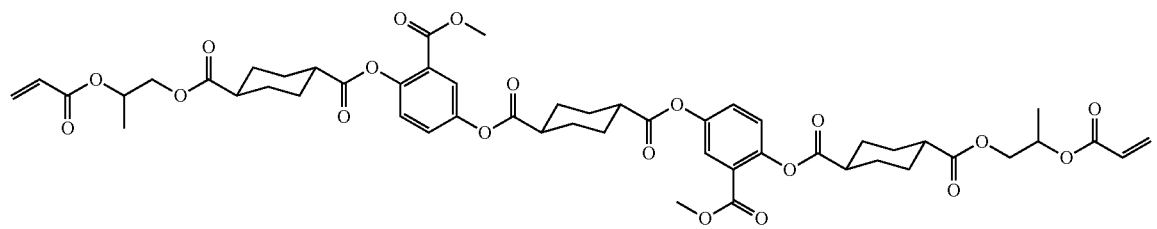
1-34
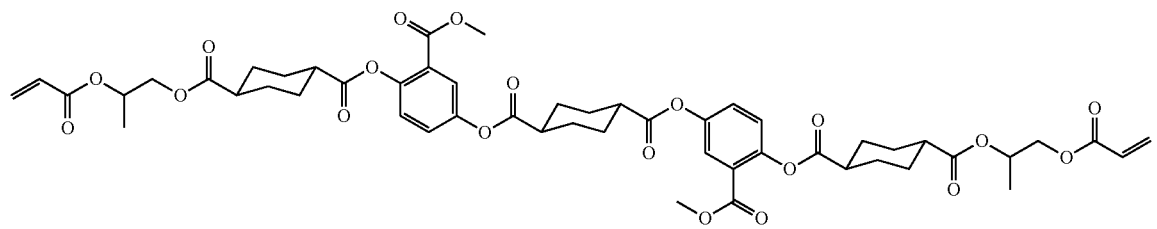

-continued
1-35
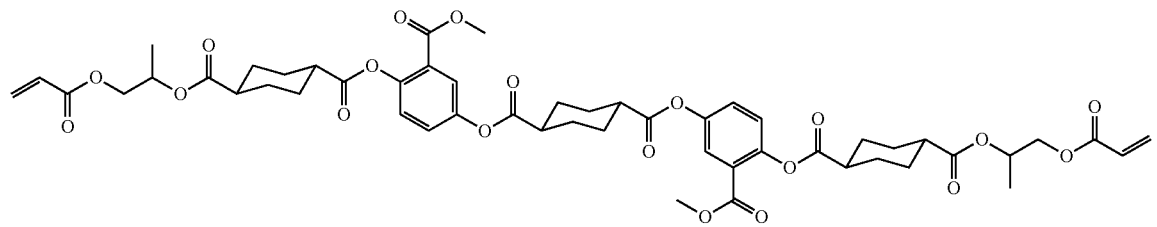
1-36
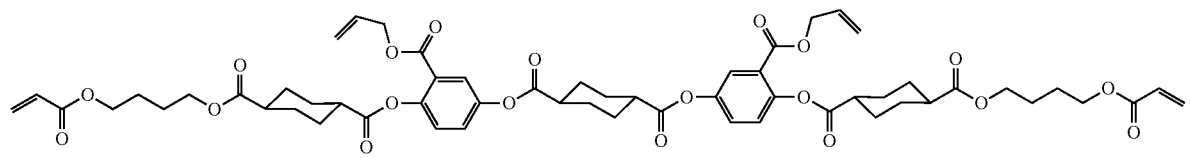
(Example of Compound in which 2.0.1<mc<0.3)
2-1
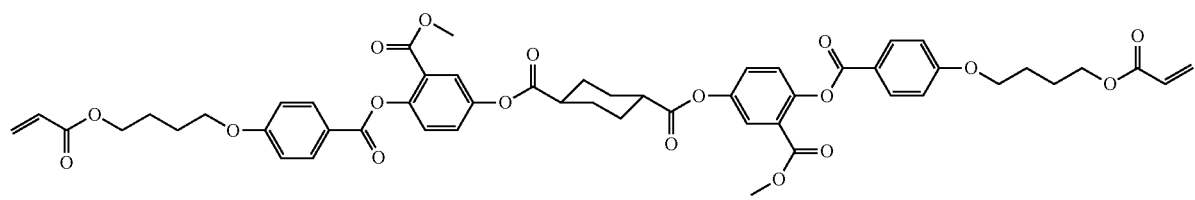
2-2
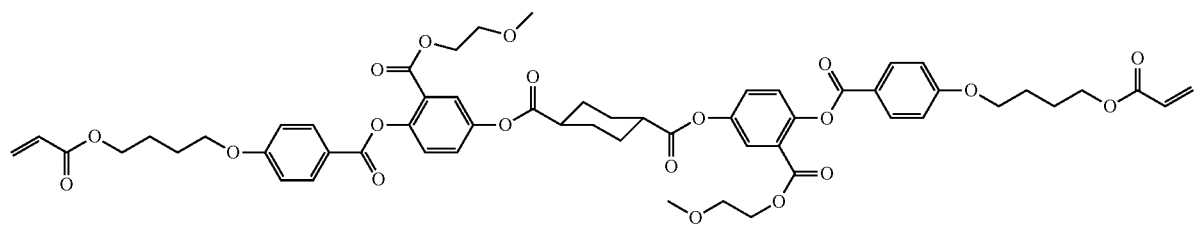
2-3
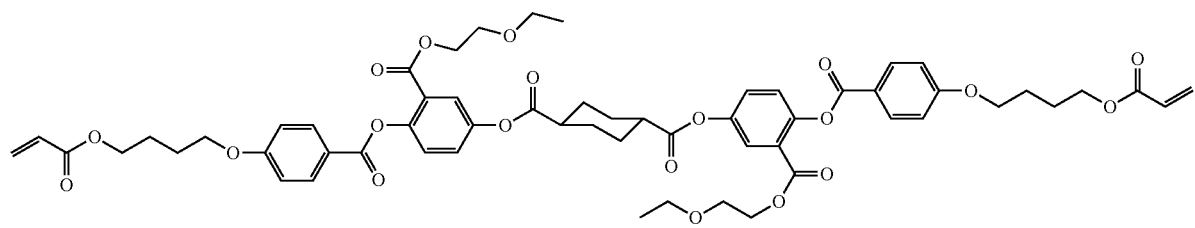
2-4
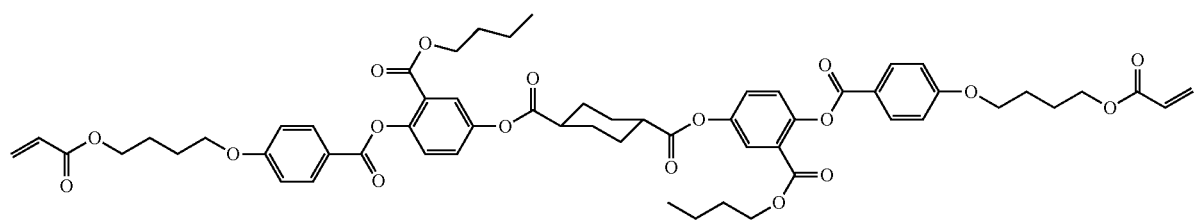

2-5
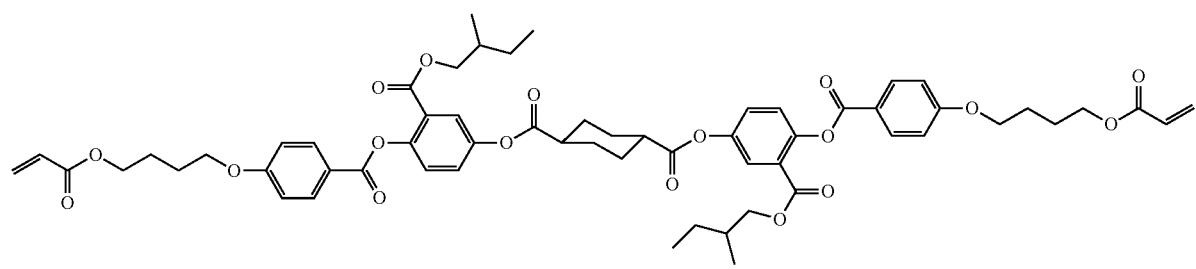
2-6
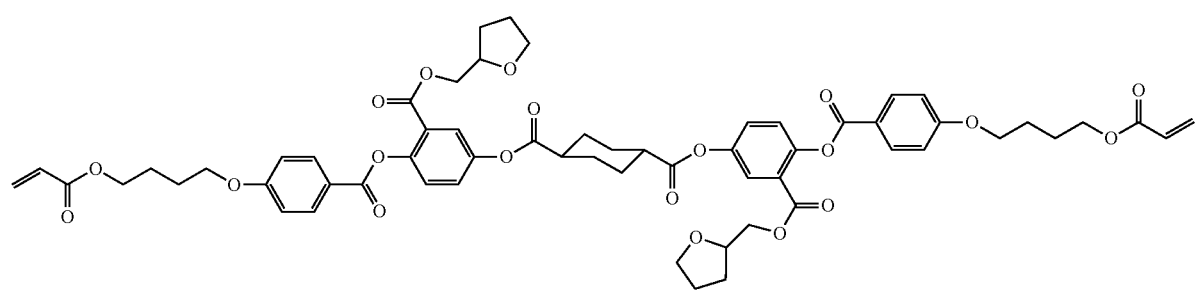
2-7
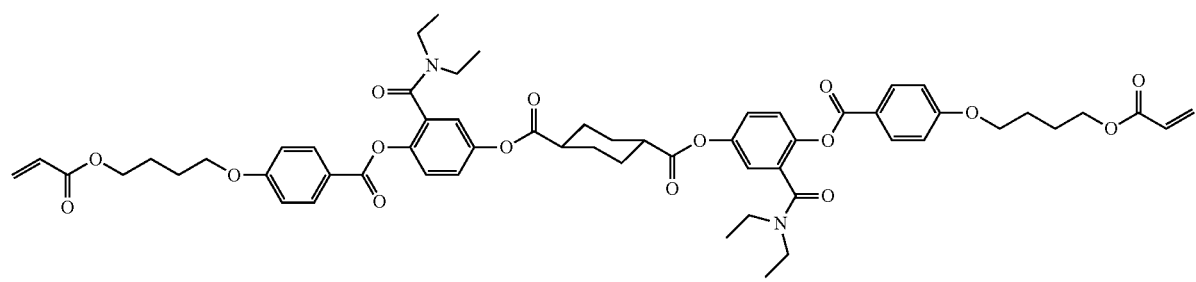
2-8
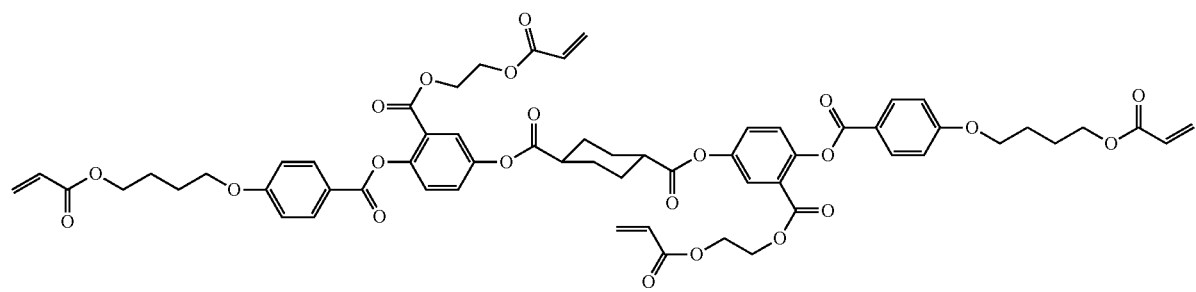
2-9
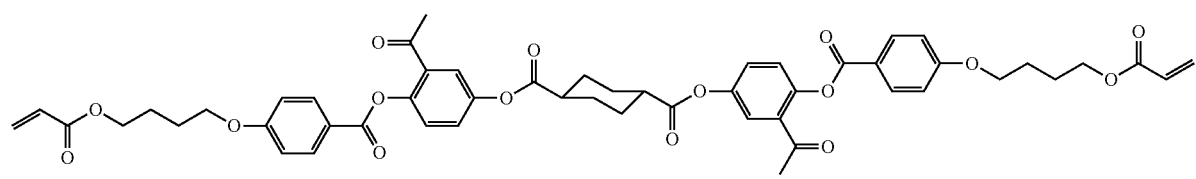

2-10
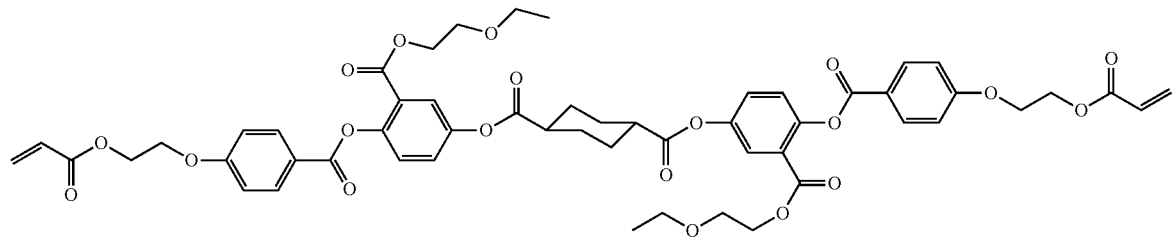
2-11
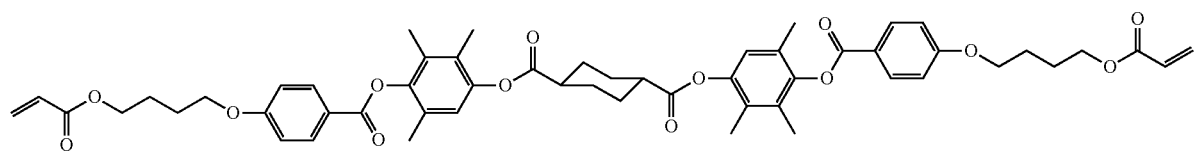
2-12
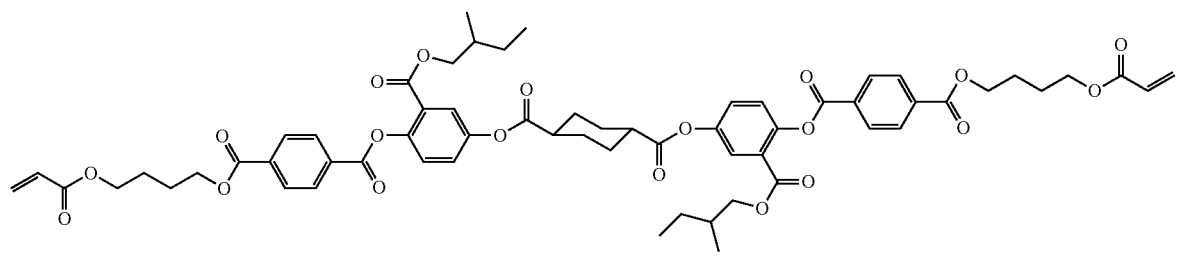
2-13
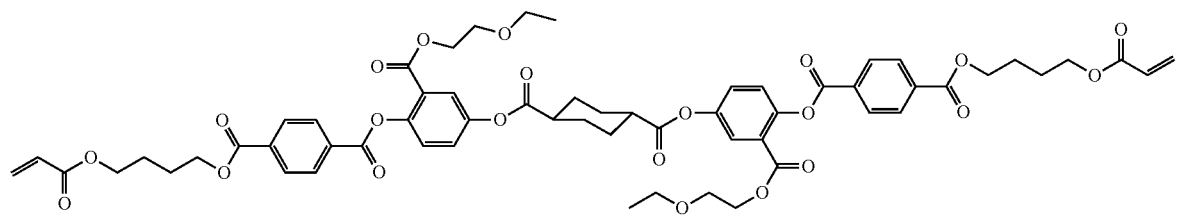
2-14
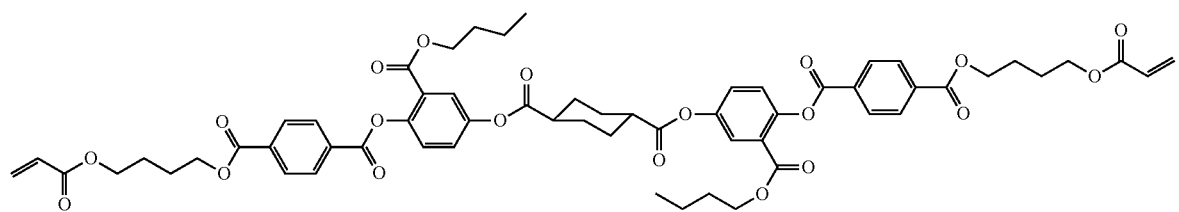
2-15
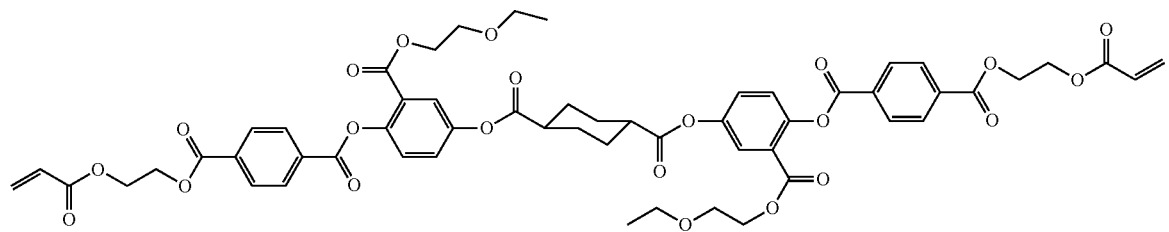

-continued
2-16
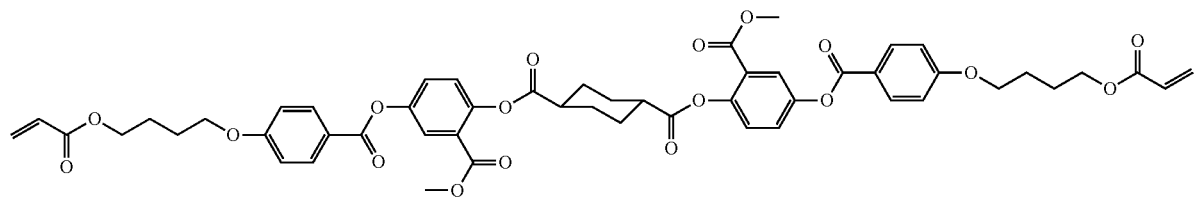
2-17
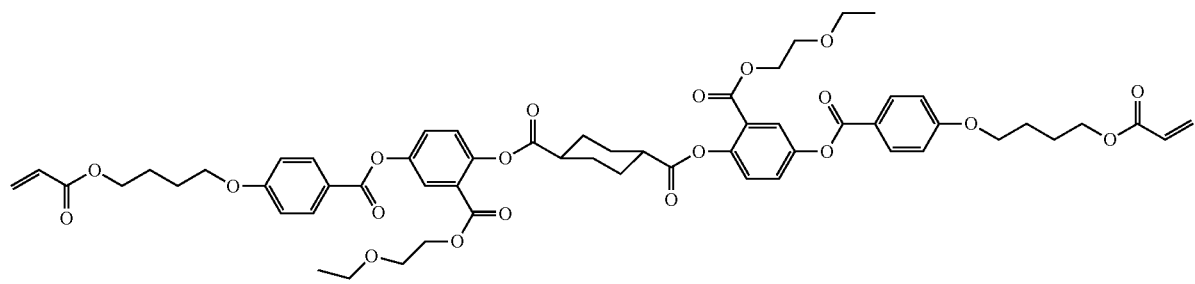
2-18
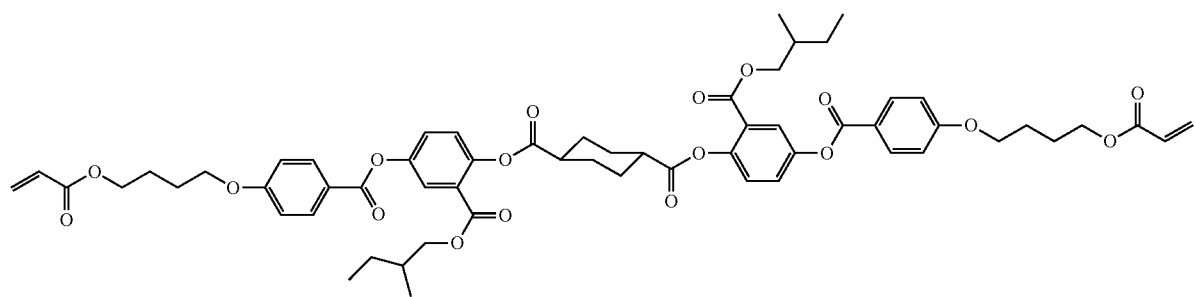
2-19
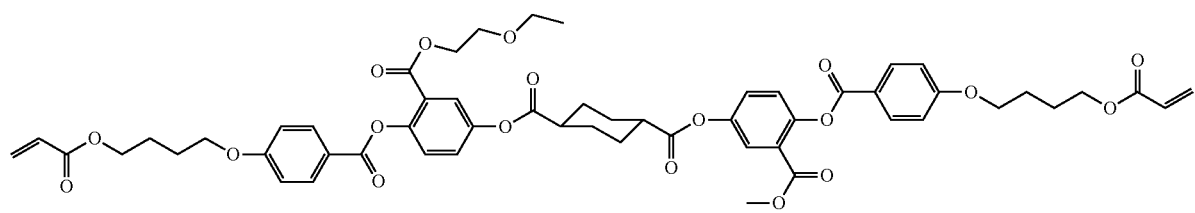
2-20
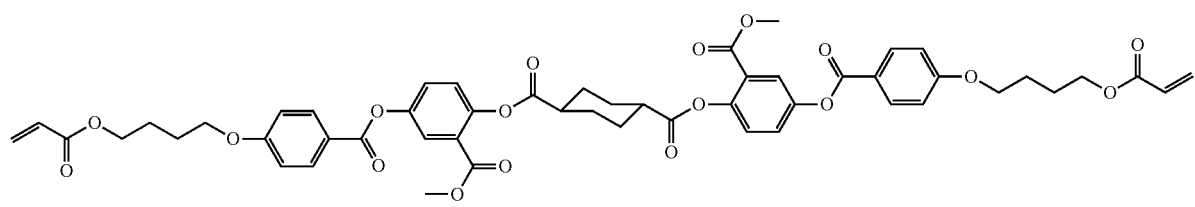
2-21
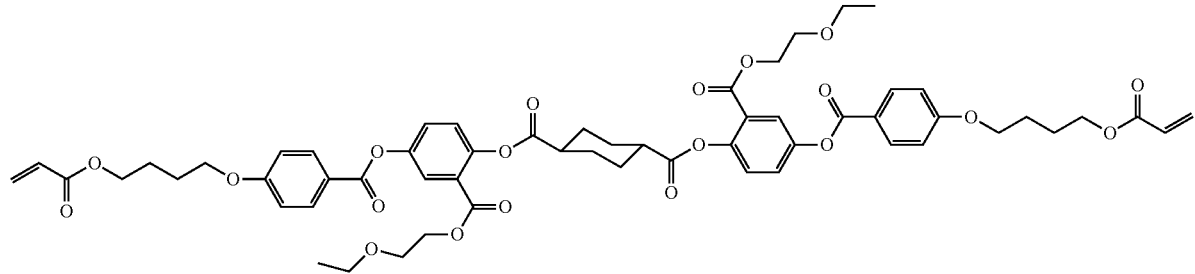

2-22
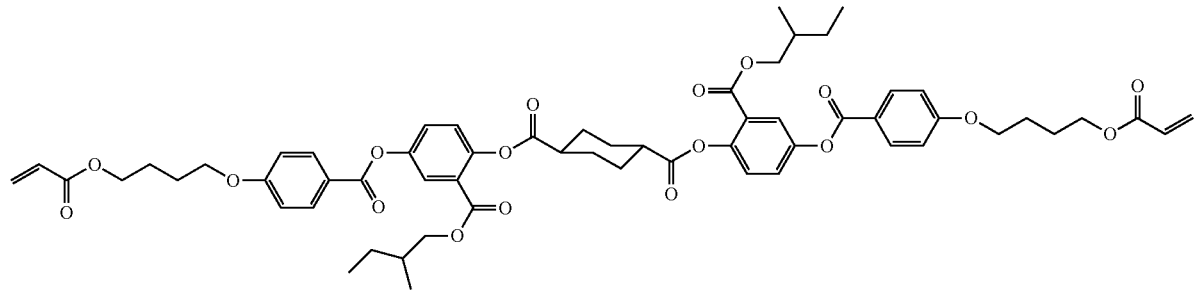
2-23
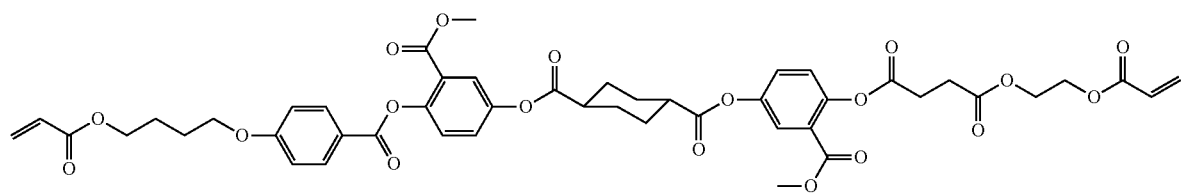
2-24
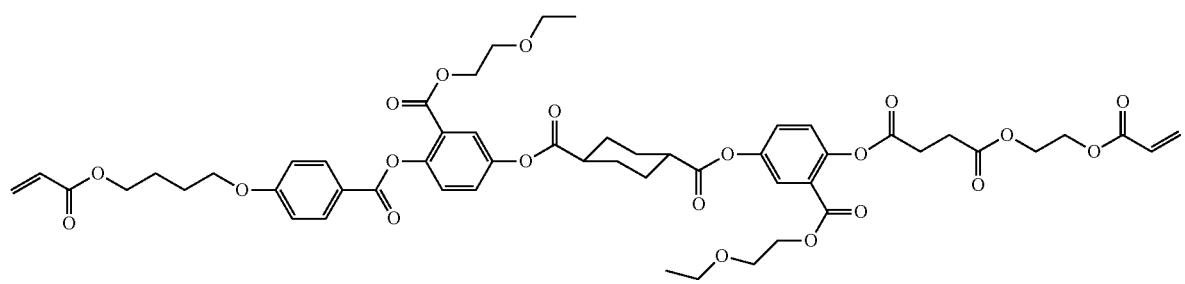
2-25
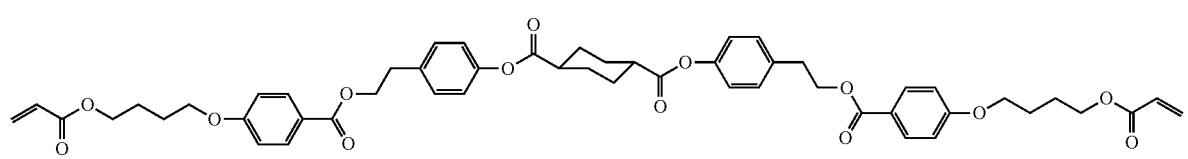
2-26
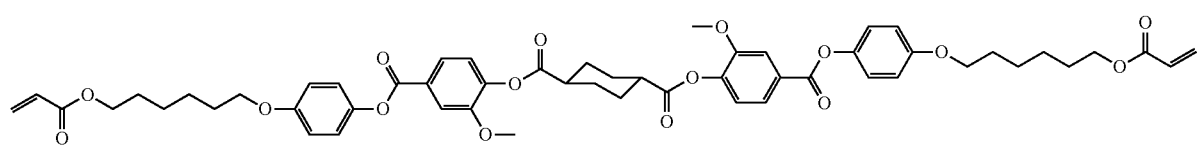
2-27
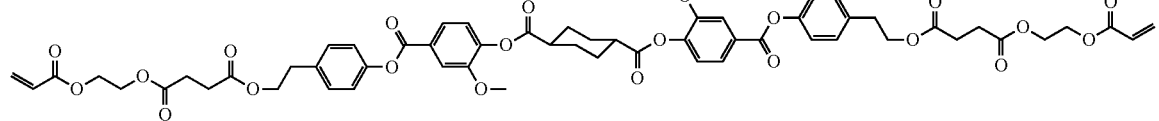
2-28
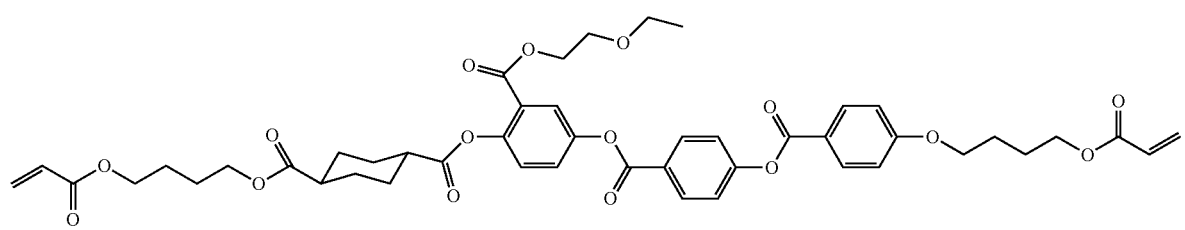

2-29
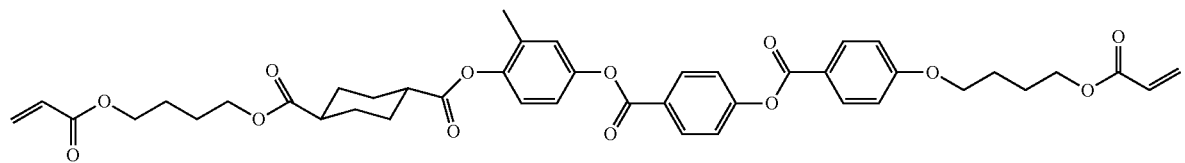
2-30
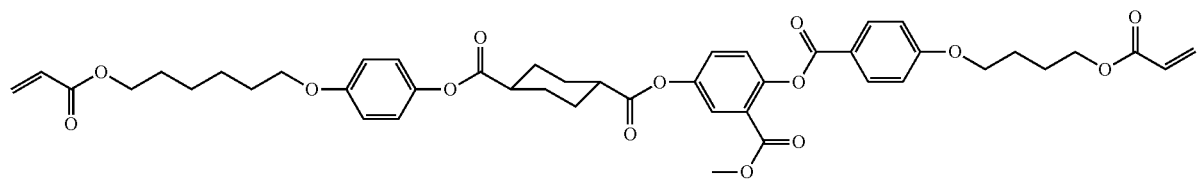
2-31
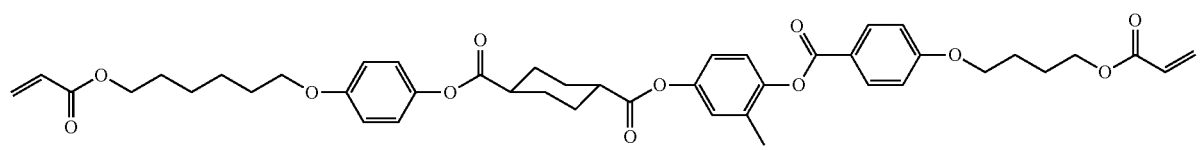
2-32
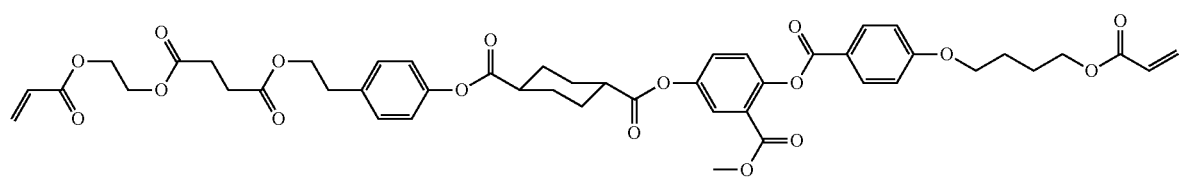
2-33
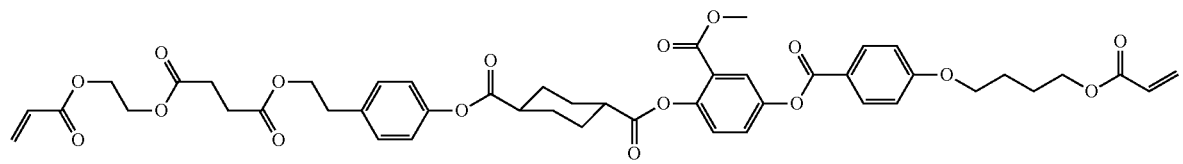
2-34
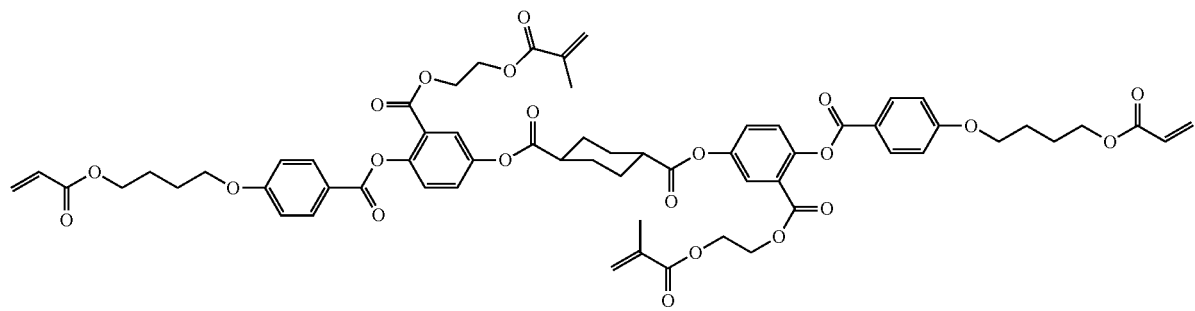
2-35
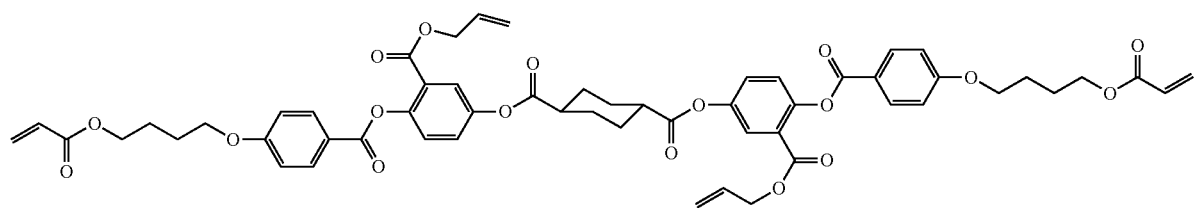

2-36

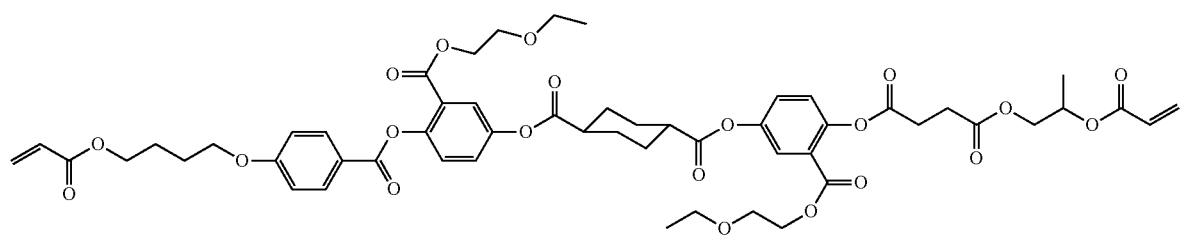

The polymerizable compound represented by Formula (I) can be manufactured by a known method, and for example, can be manufactured by the following method.

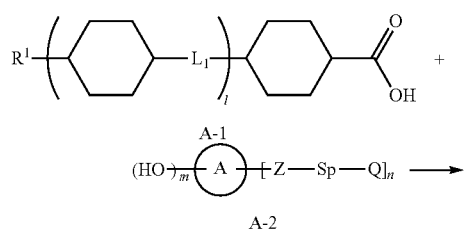

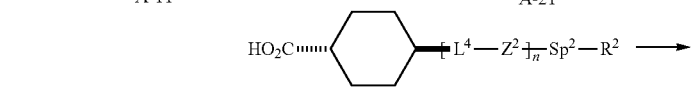

(I-11-1)

For example, in Formula (I-11-1), in a case where $L_2$ is —COO—, the polymerizable compound represented by Formula (I) can be manufactured by esterifying a carboxylic acid derivative A-1 by using a phenol (or alcohol) derivative A-2.

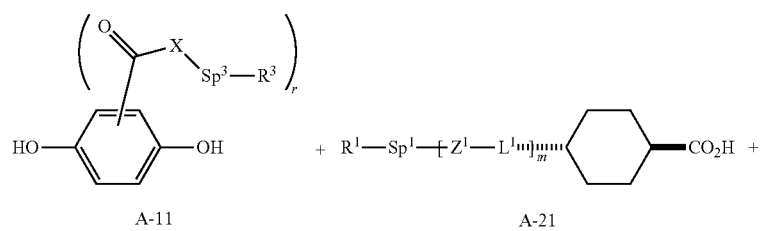

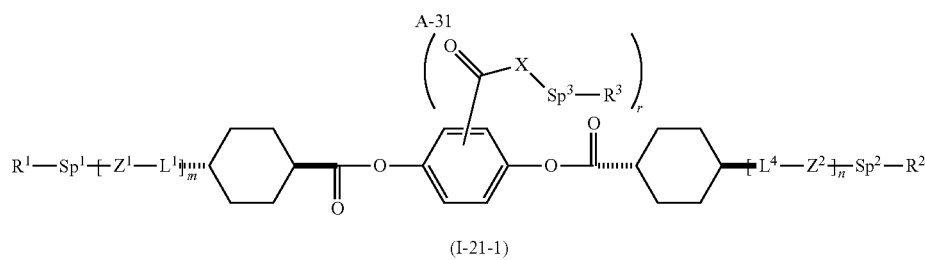

(I-21-1)

For example, in Formula (I-21-1), in a case where $L^4$ is —C(=O)O— and $L^1$ is —OC(=O)—, the polymerizable compound represented by Formula (I) can be manufactured by performing esterification by using a phenol (or alcohol) derivative A-11 and carboxylic acid derivatives A-21 and A-31.

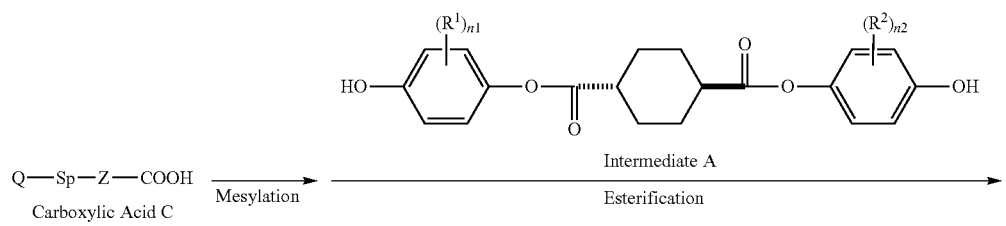

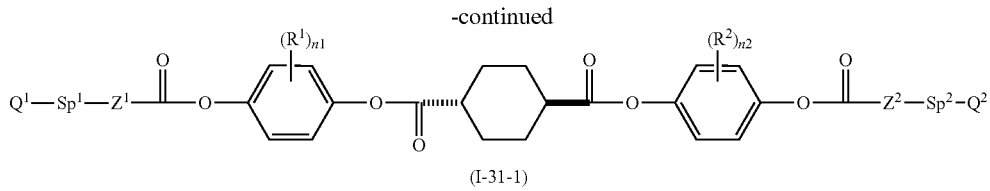

(I-31-1)

A polymerizable compound represented by Formula (I-31-1) can be manufactured by esterifying a carboxylic acid C and an intermediate A.

Examples of an esterification method include a method of allowing an activated carboxylic acid and a phenol (or alcohol) derivative to act in the presence of a base, and a method of directly esterifying a carboxylic acid and a phenol (or alcohol) derivative by using a condensation agent such as carbodiimide. A method of activating a carboxylic acid is more preferable from the viewpoint of a by-product.

An activation method of a carboxylic acid include acid chlorination using thionyl chloride, oxalyl chloride, or the like, and a method of allowing mesyl chloride to act and of preparing a mixed acid anhydride.

The polymerizable compound represented by Formula (I) generally has liquid crystallinity and low birefringence, and thus, birefringence of a phase difference film can be adjusted to be in a desired range by preparing the phase difference film by using the polymerizable compound represented by Formula (I). In addition, a cholesteric liquid crystalline phase is formed by using the polymerizable composition containing the combination described above, and a film is formed by immobilizing the cholesteric liquid crystalline phase, and thus, it is possible to obtain a reflection film having a narrow wavelength range of selective reflection, that is, a reflection film having high selectivity in a reflection wavelength range.

In addition, the polymerizable compound represented by Formula (I) satisfies a plurality of properties such as being colorless and transparent, having a wide liquid crystalline phase range, being easily dissolved in a solvent, and being easily polymerized, since absorption in a visible light range is extremely low regardless of the type of substituent of an aromatic ring or a linking group. According to this, a cured film which is prepared by using a polymerizable composition containing the polymerizable compound represented by Formula (I) can satisfy a plurality of properties such as having a sufficient hardness, being colorless and transparent, having excellent weather fastness and excellent heat resistance. Accordingly, the cured film formed by using the polymerizable composition described above, for example, can be used in various applications such as a phase difference plate, a polarization element, a selective reflection film, a color filter, an antireflection film, a view angle compensation film, a holography, and an alignment film which are constituents of an optical element.

The total mass of the polymerizable compound represented by Formula (I) is may be greater than or equal to 10 mass %, is preferably 30 to 99.9 mass %, is more preferably 50 to 99.5 mass %, and is even more preferably 70 to 99 mass %, with respect to a mass of solid contents of the polymerizable composition. Here, the total mass of the polymerizable compound represented by Formula (I) is not limited to this range.

[Combination of Polymerizable Compound Represented by Formula (I)]

When a number obtained by dividing the number of trans-1,4-cyclohexylene groups which may have a substituent and are represented by A by m is set to mc, the polymerizable composition of the present invention contains at least one type of a polymerizable compound (hereinafter, may be referred to as a "compound of Gr.1") satisfying $0.5 < mc < 0.7$ and at least one type of a polymerizable compound (hereinafter, may be referred to as a "compound of Gr.2") satisfying $0.1 < mc < 0.3$. That is, mc is a number represented by the following calculus equation.

$mc$=(the number of trans-1,4-cyclohexylene groups which may have a substituent and are represented by $A$)/$m$     Calculus Equation The polymerizable composition of the present invention contains the polymerizable compound represented by Formula (I) in a combination as described above, and thus, has low birefringence (for example, birefringence obtained from a phase difference and a film thickness of a layer obtained by polymerizing a liquid crystal layer in a monoaxial alignment state described in an example at 50° C. is 0.040 to 0.110) and excellent liquid crystallinity. That is, in a range in which excellent liquid crystallinity is exhibited, the birefringence can be adjusted in a range of a comparatively low value. In addition, even when the polymerizable composition contains a solvent which is generally used for preparing a film, the polymerizable compound is rarely precipitated. In a case where a film is formed by using the polymerizable composition of the present invention, cissing rarely occurs, and a film shape also tends to be rarely disturbed.

Specifically, mc is calculated as described below, according to the total number of cyclic divalent groups represented by A in the polymerizable compound represented by Formula (I), that is, m, and in the expression, the number of trans-1,4-cyclohexylene groups which may have a substituent and are represented by A in the polymerizable compound represented by Formula (I) (hereinafter, may be referred to as the number of cyclohexanes). Hereinafter, a compound in which m represents 3 to 9 will be described as an example.

TABLE 1

| m | Number of Cyclohexanes | mc | |
|---|---|---|---|
| 3 | 2 | 0.67 | Gr. 1 |
| 3 | 1 | 0.33 | |
| 4 | 3 | 0.75 | |
| 4 | 2 | 0.50 | |
| 4 | 1 | 0.25 | Gr. 2 |
| 5 | 4 | 0.80 | |
| 5 | 3 | 0.60 | Gr. 1 |
| 5 | 2 | 0.40 | |
| 5 | 1 | 0.20 | Gr. 2 |
| 6 | 5 | 0.83 | |
| 6 | 4 | 0.67 | Gr. 1 |
| 6 | 3 | 0.50 | |
| 6 | 2 | 0.33 | |

TABLE 1-continued

| m | Number of Cyclohexanes | mc | |
|---|---|---|---|
| 6 | 1 | 0.17 | Gr. 2 |
| 7 | 6 | 0.86 | |
| 7 | 5 | 0.71 | |
| 7 | 4 | 0.57 | Gr. 1 |
| 7 | 3 | 0.43 | |
| 7 | 2 | 0.29 | Gr. 2 |
| 7 | 1 | 0.14 | Gr. 2 |
| 8 | 7 | 0.88 | |
| 8 | 6 | 0.75 | |
| 8 | 5 | 0.63 | Gr. 1 |
| 8 | 4 | 0.50 | |
| 8 | 3 | 0.38 | |
| 8 | 2 | 0.25 | Gr. 2 |
| 8 | 1 | 0.13 | Gr. 2 |
| 9 | 7 | 0.78 | |
| 9 | 6 | 0.67 | Gr. 1 |
| 9 | 5 | 0.56 | Gr. 1 |
| 9 | 4 | 0.44 | |
| 9 | 3 | 0.33 | |
| 9 | 2 | 0.22 | Gr. 2 |
| 9 | 1 | 0.11 | Gr. 2 |

Gr. 1: Satisfying 0.5 < mc < 0.7
Gr. 2: Satisfying 0.1 < mc < 0.3

That is, the polymerizable composition of the present invention, for example, may contain at least one type of a compound having m represented by Gr.1 and the number of cyclohexanes and at least one type of a compound having m represented by Gr.2 and the number of cyclohexanes, in Table 1 described above.

A compound in which m is 3 and the number of cyclohexanes is 2, a compound in which m is 5 and the number of cyclohexanes is 3, a compound in which m is 6 and the number of cyclohexanes is 4, and a compound in which m is 7 and the number of cyclohexanes is 4 are preferable, and the compound in which m is 3 and the number of cyclohexanes is 2, and the compound in which m is 5 and the number of cyclohexanes is 3 are more preferable, as the compound of Gr. 1.

A compound in which m is 4 and the number of cyclohexanes is 1, a compound in which m is 5 and the number of cyclohexanes is 1, a compound in which m is 6 and the number of cyclohexanes is 1, and a compound in which m is 7 and the number of cyclohexanes is 2 or 1 are preferable, and the compound in which m is 4 and the number of cyclohexanes is 1 and the compound in which m is 5 and the number of cyclohexanes is 1 are more preferable, as the compound of Gr.2.

Among them, examples of a preferred combination include the followings:

a combination between the compound in which m is 3 and the number of cyclohexanes is 2 and the compound in which m is 4 and the number of cyclohexanes is 1;

a combination between the compound in which m is 5 and the number of cyclohexanes is 3 and the compound in which m is 4 and the number of cyclohexanes is 1;

a combination between the compound in which m is 3 and the number of cyclohexanes is 2 and the compound in which m is 5 and the number of cyclohexanes is 1; and a combination between the compound in which m is 5 and the number of cyclohexanes is 3 and the compound in which m is 5 and the number of cyclohexanes is 1.

Examples of a more preferred combination include the following:

a combination between the compound in which m is 5 and the number of cyclohexanes is 3 and the compound in which m is 5 and the number of cyclohexanes is 1.

It is also preferable that the polymerizable composition of the present invention, for example, contains at least one type of a compound represented by Formula (V) and at least one type of a compound represented by Formula (VI).

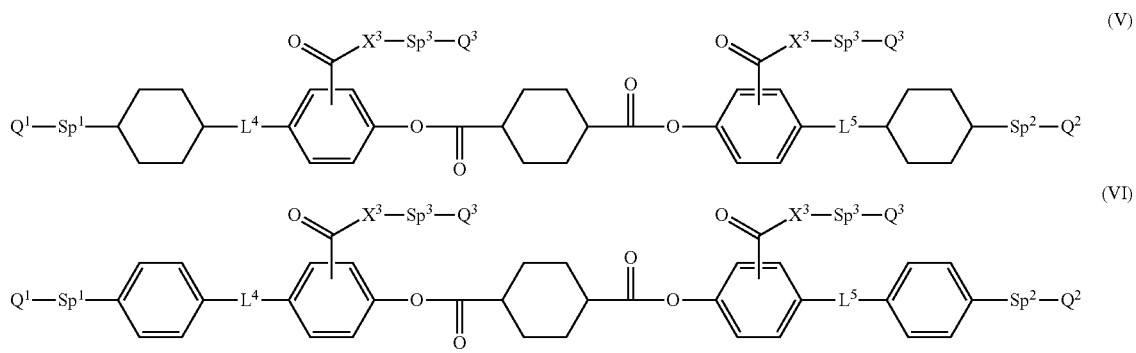

$L^4$ and $L^5$ represent a single bond or a linking group selected from the group consisting of —C(=O)O—, —OC(=O)—, and —OC(=O)O—.

Examples of a preferred combination of the polymerizable compound in the polymerizable composition of the present invention include a combination between an arbitrary one or more compounds selected from compounds 1-1 to 1-25 exemplified described above and arbitrary one or more compounds selected from compounds 2-1 to 2-31 exemplified described above.

A content ratio of the compound of Gr.1 to the compound of Gr.2 in the polymerizable composition of the present invention is not particularly limited, but a mass ratio of (Compound of Gr.1):(Compound of Gr.2) is preferably 90:10 to 10:90, is more preferably 85:15 to 20:80, and is even more preferably 80:20 to 50:50.

[Other Liquid Crystal Compounds]

The polymerizable composition may contain one or more other liquid crystal compounds along with the polymerizable compound represented by Formula (I). The polymerizable compound represented by Formula (I) has high compatibility with respect to the other liquid crystal compounds, and thus, even in a case of being mixed with the other liquid crystal compounds, it is possible to form a film having high transparency without the occurrence of opacification or the like. The other liquid crystal compounds can be used together, and thus, it is possible to provide compositions having various compositions suitable for various applications. Examples of the other liquid crystal compounds which can be used together include a rod-like nematic liquid crystal compound. Examples of the rod-like nematic liquid crystal compound include azomethines, azoxies, cyanobiphenyls, cyanophenyl esters, benzoic acid esters, phenyl cyclohexane carboxylic acid esters, cyanophenyl cyclohexanes, cyano-substituted phenyl pyrimidines, alkoxy-substituted phenyl pyrimidines, phenyl dioxanes, tolans, and alkenyl cyclohexyl benzonitriles. It is possible to use not only a low molecular liquid crystal compound but also a high molecular liquid crystal compound.

The other liquid crystal compounds may be a polymerizable liquid crystal compound or a non-polymerizable liquid crystal compound. A rod-like liquid crystal compound not having a polymerizable group is described in various literatures (for example, Y. Goto et. al., Mol. Cryst. Liq. Cryst. 1995, Vol. 260, pp. 23-28).

A polymerizable rod-like liquid crystal compound can be obtained by introducing a polymerizable group into a rod-like liquid crystal compound. Examples of the polymerizable group include an unsaturated polymerizable group, an epoxy group, and an aziridinyl group, and among them, the unsaturated polymerizable group is preferable, and an ethylenically unsaturated polymerizable group is particularly preferable. The polymerizable group can be introduced into the molecules of the rod-like liquid crystal compound by various methods. The number of polymerizable groups in the polymerizable rod-like liquid crystal compound is preferably 1 to 6, and is more preferably 1 to 3. Examples of the polymerizable rod-like liquid crystal compound include compounds described in Makromol. Chem., Vol. 190, p. 2255 (1989), Advanced Materials Vol. 5, p. 107 (1993), the specification of U.S. Pat. No. 4,683,327A, the specification of U.S. Pat. No. 5,622,648A, the specification of U.S. Pat. No. 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), JP2001-328973A, and the like. Two or more types of polymerizable rod-like liquid crystal compounds may be used together. In a case where two or more types of polymerizable rod-like liquid crystal compounds are used together, it is possible to decrease an alignment temperature.

The added amount of the other liquid crystal compounds is not particularly limited, but is preferably 0 to 70 mass %, is more preferably 0 to 50 mass %, and is even more preferably 0 to 30 mass %, with respect to the mass of solid contents of the polymerizable composition. However, the added amount of the other liquid crystal compounds is not limited to the range described above. In the polymerizable composition, a mass ratio of the polymerizable compound represented by Formula (I) to the other liquid crystal compounds (Mass of Polymerizable Compound represented by Formula (I)/Mass of Other Liquid Crystal Compounds) may be 100/0 to 30/70, is preferably 100/0 to 50/50, and is more preferably 100/0 to 70/30. The ratio can be adjusted to be in a preferred range according to the application.

[Chiral Compound]

The polymerizable composition may contain a chiral compound. By using the chiral compound, it is possible to prepare the polymerizable composition as a composition having a cholesteric liquid crystalline phase. The chiral compound may be a liquid crystalline chiral compound, or may be a non-liquid crystalline chiral compound. The chiral compound can be selected from various known chiral agents (for example, described in Liquid Crystal Device Handbook, Chap. 3, Sec. 4-3, Chiral Agent for TN and STN, p. 199, Japan Society for the Promotion of Science, edited by The 142-nd Committee, 1989). In general, the chiral compound has an asymmetric carbon atom, and an axially asymmetric compound or a planarly asymmetric compound which does not has an asymmetric carbon atom can be used. Examples of the axially asymmetric compound or the planarly asymmetric compound include binaphthyl, helicene, paracyclophane, and derivatives thereof. The chiral compound (a chiral agent) may have a polymerizable group. In a case where the chiral compound has a polymerizable group, and the rod-like liquid crystal compound to be used together also has a polymerizable group, it is possible to form a polymer having a repeating unit derived from the rod-like liquid crystal compound and a repeating unit derived from the chiral compound by a polymerization reaction between a polymerizable chiral compound and a polymerizable rod-like liquid crystal compound. Therefore, the polymerizable group in the polymerizable chiral compound is a polymerizable rod-like liquid crystal compound, and in particular, is preferably a group identical to the polymerizable group in the polymerizable compound represented by Formula (I). Accordingly, the polymerizable group of the chiral compound is preferably an unsaturated polymerizable group, an epoxy group, or an aziridinyl group, is more preferably an unsaturated polymerizable group, and is particularly preferably an ethylenically unsaturated polymerizable group.

In the polymerizable composition, it is preferable that the content of the chiral compound is 0.5 to 30 mass % with respect to a liquid crystal compound containing the polymerizable compound represented by Formula (I). It is preferable that a use amount of the chiral compound is small since a small amount of chiral compound does not tend to affect liquid crystallinity. Accordingly, a compound which has a strong twisting force such that twisted alignment at a desired spiral pitch can be attained even in a case where a small amount of chiral compound is used is preferable as the chiral compound. Examples of such a chiral agent having a strong twisting force include a chiral agent described in JP2003-287623A. In addition, chiral agents described in JP2002-302487A, JP2002-80478A, JP2002-80851A, and JP2014-034581A, LC-756 manufactured by BASF SE, and the like are included.

A film formed by setting the polymerizable composition containing the chiral compound to a cholesteric liquid crystalline phase, and then by immobilizing the cholesteric liquid crystalline phase has selective reflection properties with respect to light at a predetermined wavelength according to a spiral pitch, and is useful as a reflection film (for example, a visible light reflection film or an infrared ray reflection film). By using the polymerizable compound represented by Formula (I) which has low birefringence, there is an advantage in that a reflection wavelength range becomes narrower, and selectivity becomes higher, compared to a film having the same thickness in which a liquid crystal compound having higher birefringence is used.

[Polymerization Initiator]

It is preferable that the polymerizable composition contains a polymerization initiator. For example, in an aspect where a cured film is formed by performing a curing reaction by ultraviolet ray irradiation, it is preferable that a polymerization initiator to be used is a photopolymerization initiator which can initiate a polymerization reaction by ultraviolet ray irradiation. Examples of the photopolymerization initiator include an α-carbonyl compound (described in the specification of each of U.S. Pat. Nos. 2,367,661A and 2,367,670A), acyloin ether (described in the specification of U.S. Pat. No. 2,448,828A), an α-hydrocarbon-substituted aromatic acyloin compound (described in the specification of U.S. Pat. No. 2,722,512A), a polynuclear quinone compound (described in the specification of each of U.S. Pat. Nos. 3,046,127A and 2,951,758A), a combination between a triaryl imidazole dimer and p-aminophenyl ketone (described in the specification of U.S. Pat. No. 3,549,367A), an acridine compound and a phenazine compound (described in JP1985-105667A (JP-S60-105667A) and in the specification of U.S. Pat. No. 4,239,850A), an oxadiazole compound (described in the specification of U.S. Pat. No. 4,212,970A), and the like.

The content of the photopolymerization initiator in the polymerizable composition is preferably 0.1 to 20 mass %, and is more preferably 1 to 8 mass %, with respect to the mass of solid contents of the polymerizable composition.

[Alignment Control Agent]

An alignment control agent which contributes to stable or prompt formation of a liquid crystalline phase (for example, a cholesteric liquid crystalline phase) may be added to the polymerizable composition. Examples of the alignment control agent include a fluorine-containing (meth)acrylate-based polymer, compounds represented by General Formulas (X1) to (X3) described in WO2011/162291A, and a compound described in paragraphs [0020] to [0031] of JP2013-47204A. The polymerizable composition may contain two or more types of compounds selected from the compounds described above. The compounds can reduce tilt angles of the molecules of the liquid crystal compound or substantially horizontally align the tilt angles in an air interface of a layer. Furthermore, herein, "horizontal alignment" indicates that a major axis of a liquid crystal molecule is parallel to a surface of a film, but does not indicate that the major axis of the liquid crystal molecule is required to be exactly parallel to the surface of the film, and herein, the "horizontal alignment" indicates alignment in which a tilt angle with respect to a horizontal surface is less than 20 degrees. In a case where the liquid crystal compound is horizontally aligned in the vicinity of the air interface, an alignment defect rarely occurs, and thus, transparency in a visible light range increases. In contrast, in a case where the molecules of the liquid crystal compound are aligned at a large tilt angle, for example, the liquid crystal compound is set to a cholesteric liquid crystalline phase, this is not preferable since a spiral axis thereof is shifted from a normal direction of the surface of the film, and thus, reflectivity decreases or a fingerprint pattern is generated, and haze increases or diffraction properties are exhibited.

Examples of the fluorine-containing (meth)acrylate-based polymer which can be used as the alignment control agent are described in [0018] to [0043] of JP2007-272185A, and the like.

One type of compound may be independently used, or two or more types of compounds may be used together, as the alignment control agent.

The content of the alignment control agent in the polymerizable composition is preferably 0.01 to 10 mass %, is more preferably 0.01 to 5 mass %, and is particularly preferably 0.02 to 1 mass %, with respect to the mass of the compound represented by Formula (I).

[Cross-Linking Agent]

The polymerizable composition may arbitrarily contain a cross-linking agent in order to improve a film hardness after being cured and to improve durability. A cross-linking agent which is cured by an ultraviolet ray, heat, humidity, and the like can be preferably used as the cross-linking agent.

The cross-linking agent is not particularly limited, but can be suitably selected according to the purpose, and examples of the cross-linking agent include a polyfunctional acrylate compound such as trimethylol propane tri(meth)acrylate, pentaerythritol tri(meth)acrylate, and pentaerythritol tetraacrylate; an epoxy compound such as glycidyl (meth)acrylate and ethylene glycol diglycidyl ether; an aziridine compound such as 2,2-bishydroxy methyl butanol-tris[3-(1-aziridinyl) propionate] and 4,4-bis(ethylene iminocarbonyl amino) diphenyl methane; an isocyanate compound such as hexamethylene diisocyanate and biuret type isocyanate; a polyoxazoline compound having an oxazoline group in a side chain; an alkoxy silane compound such as vinyl trimethoxy silane and N-(2-aminoethyl)3-aminopropyl trimethoxy silane, and the like. In addition, a known catalyst can be used according to the reactivity of the cross-linking agent, and thus, productivity can be improved in addition to the improvement in the film hardness and the durability. One type of the compound may be independently used, or two or more types thereof may be used together.

The content of the cross-linking agent is preferably 3 mass % to 20 mass %, and is more preferably 5 mass % to 15 mass %, with respect to the mass of solid contents of the polymerizable composition. In a case where the content of the cross-linking agent is greater than or equal to 3 mass %, a cross-linking density improvement effect further increases, and in a case where the content of the cross-linking agent is less than or equal to 20 mass %, stability of a cholesteric liquid crystal layer becomes higher.

[Other Additives]

The polymerizable composition may contain one type or two or more types of other additives such as an antioxidant, an ultraviolet absorbent, a sensitizing agent, a stabilizer, a plasticizer, a chain transfer agent, a polymerization inhibitor, an anti-foaming agent, a leveling agent, a thickener, a flame retardant, a surface-active substance, a dispersant, and a coloring material such as a dye and pigment.

<Film>

The polymerizable composition of the present invention is useful as a material of various optical films such as a phase difference film and a reflection film, and can form various optical films by using the polymerizable composition of the present invention.

[Manufacturing Method of Film]

An example of a manufacturing method of an optical film is a manufacturing method, including at least:

(i) applying a polymerizable composition onto a surface of a substrate or the like, and setting the polymerizable composition to be in a state of a liquid crystalline phase (a cholesteric liquid crystalline phase or the like); and, (ii) performing a curing reaction with respect to the polymerizable composition, and forming a cured film by immobilizing the liquid crystalline phase.

The steps of (i) and (ii) are repeated a plurality of times, and thus, it is possible to prepare a film in which a plurality of cured films described above are laminated. In addition, the plurality of cured films are bonded to each other by an adhesive, and thus, it is also possible to prepare the film in which the plurality of cured films are laminated.

In the step of (i), first, the polymerizable composition is applied onto the surface of the substrate or the surface of an alignment film formed on the substrate. It is preferable that the polymerizable composition is prepared as a coating liquid in which a material is dissolved and/or dispersed in a solvent. An organic solvent is preferably used as the solvent which is used for preparing the coating liquid. Examples of the organic solvent include amide (for example, N,N-dimethyl formamide); sulfoxide (for example, dimethyl sulfoxide); a heterocyclic compound (for example, pyridine); hydrocarbon (for example, benzene and hexane); alkyl halide (for example, chloroform and dichloromethane); ester (for example, methyl acetate, butyl acetate, and propylene glycol monoethyl ether acetate); ketone (for example, acetone, methyl ethyl ketone, cyclohexanone, and cyclopentanone); ether (for example, tetrahydrofuran, 1,2-dimethoxy ethane); 1,4-butane diol diacetate, and the like. Among them, the alkyl halide, the ester, and the ketone are particularly preferable. Two or more types of the organic solvents may be used together.

The coating liquid can be applied by various methods such as a wire bar coating method, an extrusion coating method, a direct gravure coating method, a reverse gravure coating method, and a die coating method. In addition, the composition is ejected from a nozzle of an ink jet device, and thus, the coated film can be formed.

Next, the polymerizable composition which is applied onto the surface and becomes the coated film is set to be in the state of the liquid crystalline phase such as a cholesteric liquid crystalline phase. In an aspect where the polymerizable composition is prepared as a coating liquid containing a solvent, there is a case where the coated film is dried, and the solvent is removed, and thus, it is possible to set the polymerizable composition to be in the state of the liquid crystalline phase. In addition, in order to set a transition temperature with respect to the liquid crystalline phase, as desired, the coated film may be heated. For example, first, the coated film is heated to a temperature of an isotropic phase, and then, is cooled to a liquid crystalline phase transition temperature, and the like, and thus, it is possible to stably set the polymerizable composition to be in the state of the liquid crystalline phase. The liquid crystalline phase transition temperature of the polymerizable composition is preferably in a range of 10° C. to 250° C., and is more preferably in a range of 10° C. to 150° C., from the viewpoint of manufacturing suitability or the like. In a case where the liquid crystalline phase transition temperature of the polymerizable composition is lower than 10° C., a cooling step or the like is required in order to decrease the temperature to a temperature range in which the liquid crystalline phase is exhibited. In addition, in a case where the liquid crystalline phase transition temperature of the polymerizable composition is higher than 200° C., first, a high temperature is required in order to set the polymerizable composition to be in an isotropic liquid state at a temperature higher than the temperature range in which the liquid crystalline phase is exhibited, and thus, this is disadvantageous from the viewpoint of the waste of thermal energy, the deformation of the substrate, deterioration, and the like.

Next, in the step of (ii), the coated film which is in the state of the liquid crystalline phase is cured. The curing may be performed by any polymerization method such as a radical polymerization method, an anionic polymerization method, a cationic polymerization method, and a coordination polymerization method. A suitable polymerization method may be selected according to the polymerizable compound represented by Formula (I). By this polymerization, it is possible to obtain a polymer having a unit derived from the polymerizable compound represented by Formula (I) in a constitutional unit.

In an example, a curing reaction is performed by ultraviolet ray irradiation. In the ultraviolet ray irradiation, a light source such as an ultraviolet ray lamp is used. In this step, the curing reaction of the composition is performed by the ultraviolet ray irradiation, and thus, the liquid crystalline phase (the cholesteric liquid crystalline phase or the like) is immobilized, and the cured film is formed.

An irradiation energy amount of an ultraviolet ray is not particularly limited, but in general, is preferably approximately 0.1 J/cm$^2$ to 0.8 J/cm$^2$. In addition, a time for performing the ultraviolet ray irradiation with respect to the coated film is not particularly limited, and may be determined from the viewpoint of both of a sufficient hardness and sufficient productivity of the cured film.

In order to accelerate the curing reaction, the ultraviolet ray irradiation may be performed under heating conditions. In addition, it is preferable that a temperature at the time of performing the ultraviolet ray irradiation is maintained in a temperature range where the liquid crystalline phase is exhibited such that the liquid crystalline phase is not scattered. In addition, an oxygen concentration in the atmosphere is associated with a degree of polymerization, and thus, in a case where a desired degree of polymerization is not attained in the air, and the film hardness is insufficient, it is preferable to decrease the oxygen concentration in the atmosphere by a method such as nitrogen substitution.

In the step described above, the liquid crystalline phase is immobilized, and the cured film is formed. Here, a state where alignment of a compound formed of a liquid crystalline phase is retained is the most typical and preferred aspect as a state where the liquid crystalline phase is "immobilized". The state is not only limited to this, and specifically, indicates a state where a layer does not have fluidity, an alignment form is not changed by an external field or an external force, and an immobilized alignment form can be stably retained in a temperature range of generally 0° C. to 50° C., and in a temperature range of −30° C. to 70° C. in more rigorous conditions. In the present invention, it is preferable that the alignment state of the liquid crystalline phase is immobilized by the curing reaction which is performed by the ultraviolet ray irradiation.

Furthermore, in the film, it is sufficient that the optical properties of the liquid crystalline phase are retained in the layer, and finally, it is not necessary that the composition in the cured film has liquid crystallinity in advance. For example, the composition may have a high molecular weight by the curing reaction, and may lose the liquid crystallinity in advance.

The thickness of the cured film described above is not particularly limited. A preferred film thickness may be determined according to the application or according to optical properties to be desired. In general, the thickness is preferably 0.05 to 50 μm, and is more preferably 1 to 35 μm.

[Substrate]

The film may include a substrate. The material and the optical properties of the substrate are not particularly limited insofar as the substrate has self-supporting properties, and supports the cured film described above. The substrate can be selected from a glass plate, a quartz plate, a polymer film, and the like. According to the application, a substrate having high transparency with respect to ultraviolet light may be used. Examples of a polymer film having high transmittance with respect to visible light include polymer films for various optical films which are used as a member of a display device such as a liquid crystal display device. Examples of the substrate include a polyester film such as polyethylene terephthalate (PET), polybutylene terephthalate, and polyethylene naphthalate (PEN); a polycarbonate (PC) film, a polymethyl methacrylate film; a polyolefin film such as polyethylene and polypropylene; a polyimide film, a triacetyl cellulose (TAC) film, and the like. The polyethylene terephthalate film and the triacetyl cellulose film are preferable.

[Alignment Layer]

The film may include an alignment layer between the substrate and the cured film. The alignment layer has a function of more accurately defining an alignment direction of the liquid crystal compound. The alignment layer can be disposed by means such as a rubbing treatment of an organic compound (preferably, a polymer), oblique vapor deposition of an inorganic compound, and formation of a layer having a microgroove. Further, an alignment layer is also known in which an alignment function is generated by applying an electric field, by applying a magnetic field, or by performing light irradiation. It is preferable that the alignment layer is formed by performing a rubbing treatment with respect to a surface of a polymer film.

A polymer of an organic compound is preferable as a material to be used in the alignment layer, a polymer which can be cross-linked by itself or a polymer which is cross-linked by a cross-linking agent is commonly used. It is natural that a polymer having both functions is also used. Examples of the polymer can include a polymer such as polymethyl methacrylate, an acrylic acid/methacrylic acid copolymer, a styrene/malein imide copolymer, polyvinyl alcohol and modified polyvinyl alcohol, poly(N-methylol acryl amide), a styrene/vinyl toluene copolymer, chlorosulfonated polyethylene, nitrocellulose, polyvinyl chloride, chlorinated polyolefin, polyester, polyimide, a vinyl acetate/vinyl chloride copolymer, an ethylene/vinyl acetate copolymer, carboxy methyl cellulose, gelatine, polyethylene, polypropylene, and polycarbonate, and a compound such as a silane coupling agent. Preferred examples of the polymer include a water-soluble polymer such as poly(N-methylol acryl amide), carboxy methyl cellulose, gelatine, polyvinyl alcohol and modified polyvinyl alcohol, and among them, the gelatine, and the polyvinyl alcohol and the modified polyvinyl alcohol are preferable, and in particular, the polyvinyl alcohol and the modified polyvinyl alcohol are preferable.

[Adhesive Layer]

In a case where a plurality of cured films are bonded to each other by an adhesive, an adhesive layer is disposed between the cured films. The adhesive layer may be formed of an adhesive.

Examples of the adhesive include a hot melt type adhesive, a thermal curing type adhesive, a photocuring type adhesive, a reaction curing type adhesive, and a pressure sensitive adhesive type adhesive which is not necessary to be cured, from the viewpoint of a curing method, and a compound such as an acrylate-based compound, a urethane-based compound, a urethane acrylate-based compound, an epoxy-based compound, an epoxy acrylate-based compound, a polyolefin-based compound, a modified olefin-based compound, a polypropylene-based compound, an ethylene vinyl alcohol-based compound, a vinyl chloride-based compound, a chloroprene rubber-based compound, a cyanoacrylate-based compound, a polyamide-based compound, a polyimide-based compound, a polystyrene-based compound, and a polyvinyl butyral-based compound can be used as the material of each of the adhesives. The photocuring type adhesive is preferable as the curing method from the viewpoint of workability and productivity, and the acrylate-based compound, the urethane acrylate-based compound, the epoxy acrylate-based compound, and the like are preferably used as the material of the adhesive from the viewpoint of optical transparency and heat resistance.

The film thickness of the adhesive layer is 0.5 to 10 vim, and is preferably 1 to 5 µm. In a case where the adhesive layer is used as a half mirror for displaying a projection image, it is preferable that the adhesive layer is disposed with an even film thickness in order to reduce color unevenness or the like.

[Application of Film]

An Example of the film formed by using the polymerizable composition includes a film formed by immobilizing alignment (for example, horizontal alignment, vertical alignment, hybrid alignment, and the like) of a liquid crystalline phase of a polymerizable composition. In general, such a film has optical anisotropy, and is used as an optical compensation film or the like of a liquid crystal display device or the like.

Another example of the film is a film which includes a layer formed by immobilizing a cholesteric liquid crystalline phase of a polymerizable composition and has selective reflection properties with respect to light in a predetermined wavelength range.

In the cholesteric liquid crystalline phase, liquid crystal molecules are arranged into the shape of a spiral. The layer formed by immobilizing the cholesteric liquid crystalline phase (hereinafter, may be referred to as a "cholesteric liquid crystal layer" or a "liquid crystal layer") functions as a circularly polarized light selective reflection layer which selectively reflects any one of right circularly polarized light and left circularly polarized light in a selective reflection wavelength range, and transmits the other sense of circularly polarized light. A film including one or two or more cholesteric liquid crystal layers can be used in various applications. In a film including two or more cholesteric liquid crystal layers, the senses of circularly polarized light rays which are reflected on the respective cholesteric liquid crystal layers may be identical to each other or opposite to each other according to the application. In addition, the center wavelengths of the selective reflections of the respective cholesteric liquid crystal layers described below may also be identical to each other or different from each other according to the application.

Furthermore, herein, the "sense" of the circularly polarized light indicates whether the circularly polarized light is right circularly polarized light or left circularly polarized light. In the sense of the circularly polarized light, in a case of observing light such that the light propagates towards the front side thereof, a case where a distal end of an electric field vector is rotated in a clockwise direction according to an increase in time is defined as right circularly polarized light, and a case where the distal end of the electric field vector is rotated in a counterclockwise direction is defined as left circularly polarized light. Herein, the term of "sense" may be used in a twisted direction of a spiral of a cholesteric liquid crystal. In the selective reflection of the cholesteric liquid crystal, in a case where the twisted direction (the sense) of the spiral of the cholesteric liquid crystal is in a right direction, the right circularly polarized light is reflected, and the left circularly polarized light is transmitted, and in a case where the sense is in a left direction, the left circularly polarized light is reflected, and the right circularly polarized light is transmitted.

For example, a film including a cholesteric liquid crystal layer having selective reflection properties in a visible light wavelength range (a wavelength of 400 to 750 nm) can be used as a screen or a half mirror for displaying a projection image. In addition, the film can be used as a color filter or a filter which improves a color purity of display light of a display (for example, refer to JP2003-294948A) by controlling a reflection range.

In addition, the optical film can be used in various applications such as a polarization element, a reflection film, an antireflection film, a view angle compensation film, a holography, and an alignment film, which are constituents of an optical element.

Hereinafter, an application as a member for displaying a projection image, which is a particularly preferred application, will be described.

[Member for Displaying Projection Image]

At a wavelength where projection light is selectively reflected by the function of the cholesteric liquid crystal layer described above, any one sense of the circularly polarized light is reflected, and thus, a projection image can be formed. The projection image may be an image which is displayed on the surface of the member for displaying a projection image and is viewed in this way, or may be a virtual image that emerges from the front of the member for displaying a projection image in a case of being observed by an observer.

A center wavelength $\lambda$ of the selective reflection described above depends on a pitch P (=a cycle of a spiral) of a spiral structure in a cholesteric liquid crystalline phase, and corresponds to a relationship of $\lambda=n \times P$ with an average refractive index n of the cholesteric liquid crystal layer. Furthermore, here, the center wavelength $\lambda$ of the selective reflection of the cholesteric liquid crystal layer indicates a wavelength in a centroid position of a reflection peak of a circularly polarized light reflection spectrum measured from a normal direction of the cholesteric liquid crystal layer. As apparent from the expression described above, the pitch of the spiral structure is adjusted, and thus, the center wavelength of the selective reflection can be adjusted. That is, an n value and a P value are adjusted, and for example, the center wavelength $\lambda$ is adjusted in order to selectively reflect any one of right circularly polarized light and left circularly polarized light with respect to blue light, and thus, it is possible to set the center wavelength of the selective reflection on appearance to be in a wavelength range of 450 nm to 495 nm. Furthermore, the center wavelength of the selective reflection on appearance indicates the wavelength in the centroid position of the reflection peak of the circularly polarized light reflection spectrum of the cholesteric liquid crystal layer measured from an observation direction at the time of being practically used (at the time of being used as the member for displaying a projection image). The pitch of the cholesteric liquid crystalline phase depends on the type of chiral agent which is used along with the polymerizable liquid crystal compound, or the addition concentration thereof, and thus, a desired pitch can be obtained by adjusting the type of chiral agent or the addition concentration thereof. Furthermore, methods described in "Introduction of Liquid Crystal Chemical Experiments" of The Japanese Liquid Crystal Society, published by Sigma Publishing Company in 2007, p. 46, and "Liquid Crystal Handbook" of Editorial Committee of Liquid Crystal Handbook, published by MARUZEN-YUSHODO Company, Limited, p. 196 can be used as a measurement method of the sense of the spiral or the pitch.

A half-width $\Delta\lambda$ (nm) of the selective reflection wavelength range where circularly polarized light selective reflection is exhibited depends on birefringence $\Delta n$ of the liquid crystal compound and the pitch P described above, and corresponds to a relationship of $\Delta\lambda = \Delta n \times P$. For this reason, the width of the selective reflection wavelength range can be controlled by adjusting $\Delta n$. That is, in the cholesteric liquid crystal layer formed of the composition containing the polymerizable liquid crystal compound having low birefringence of the present invention, it is possible to increase the wavelength selectivity of the selective reflection.

For example, $\Delta\lambda/\lambda$, which is a ratio of the half-width $\Delta\lambda$ of the selective reflection wavelength range to the center wavelength $\lambda$ of the selective reflection, can be used as an index indicating the wavelength selectivity of the selective reflection. In the film of the present invention, in particular, in the film which is used as the member for displaying a projection image, $\Delta\lambda/\lambda$ is preferably less than or equal to 0.09, and is more preferably less than or equal to 0.07. More specifically, in the cholesteric liquid crystal layer of the film, it is preferable that $\Delta\lambda/\lambda$ satisfies the range described above, and in each of the two or more cholesteric liquid crystal layers of the film including the two or more cholesteric liquid crystal layers, it is preferable that $\Delta\lambda/\lambda$ satisfies the range described above. Furthermore, $\Delta\lambda$'s and $\lambda$'s of the respective layers may be identical to each other or different from each other.

Each cured film having a center wavelength of selective reflection on appearance in each of a red light wavelength range, a green light wavelength range, and a blue light wavelength range is prepared by using the polymerizable composition described above, and the cured films are laminated, and thus, a member for displaying a projection image which can display a full color projection image can be prepared. Specifically, in a half mirror, it is preferable that cured films having different center wavelengths of selective reflections (for example, different by greater than or equal to 50 nm) in each of ranges of 750 to 620 nm, 630 to 500 nm, and 530 to 420 nm are laminated.

The center wavelength of the selective reflection of each of the cured films is adjusted according to a light emission wavelength range of a light source to be used in projection and a use aspect of the member for displaying a projection image, and thus, a clear projection image with excellent light utilization efficiency can be displayed. In particular, each of the center wavelengths of the selective reflections of the cured films is adjusted according to the light emission wavelength range of the light source to be used in the projection, and the like, and thus, a clear color projection image with excellent light utilization efficiency can be displayed. In particular, the use aspect of the member for displaying a projection image includes an incidence angle of projection light on the surface of the half mirror for displaying a projection image, a projection image observation direction on the surface of the member for displaying a projection image, and the like.

For example, the member for displaying a projection image described above is configured to have transmittance with respect to light in a visible light range, and thus, can be used as a half mirror which can be used as a combiner of a head-up display. The half mirror for displaying a projection image can visibly display an image projected from a projector or the like, and simultaneously, when the half mirror for displaying a projection image is observed from the same surface side as the surface on which the image is displayed, information and scenery on the opposite surface side can be observed.

When the member for displaying a projection image is used as a half mirror for displaying a projection image, it is preferable that the cured film prepared as described above, in particular, a laminate of three or more cured films is disposed on a surface of a base material. It is preferable that the base material is transparent and has low birefringence in a visible light range. For example, a phase difference of the base material at a wavelength of 550 nm is preferably less than or equal to 50 nm, and is more preferably less than or equal to 20 nm.

Examples of the base material include inorganic glass or a polymer resin (an acrylic resin (acrylic acid esters such as polymethyl (meth)acrylate, and the like), cyclic polyolefin such as polycarbonate, cyclopentadiene-based polyolefin, or norbornene-based polyolefin, polyolefins such as polypropylene, aromatic vinyl polymers such as polystyrene, polyarylate, cellulose acylate, and the like).

The half mirror for displaying a projection image may include an antireflection layer. It is preferable that the antireflection layer is provided on the outermost surface. The antireflection layer may be disposed on the outermost surface which becomes an viewing side at the time of using the half mirror for displaying a projection image, or may be disposed on the outermost surface on the opposite side, and it is preferable that the antireflection layer is disposed on the outermost surface on the viewing side. In a case where the cured film is disposed on the surface of the base material, the antireflection layer may be disposed on both of the surface on the base material side and the surface on the cured film side which becomes the viewing side. According to such a configuration, a double image, which is particularly generated in a case where the birefringence of the base material is high, is rarely generated.

Examples of the antireflection layer include a film having a configuration of a two-layer film in which a layer of high refractive index and a layer of low refractive index are combined, a film having a configuration of three-layer film in which a layer of intermediate refractive index, a layer of high refractive index, and a layer of low refractive index are sequentially laminated, and the like, in addition to a film in which fine surface concavities and convexities are formed.

Configuration examples include a configuration including two layers of a layer of high refractive index/a layer of low refractive index in this order from a lower side, a configuration including three layers having different refractive indices, in which a layer of intermediate refractive index (a layer having a refractive index which is higher than that of a underlayer and is lower than that of a layer of high refractive index)/a layer of high refractive index/a layer of low refractive index are laminated in this order, and the like, and it is also proposed that more antireflection layers are laminated. Among them, it is preferable that a layer of intermediate refractive index/a layer of high refractive index/a layer of low refractive index are provided on a hard coat layer in this order, from the viewpoint of durability, optical properties, costs, productivity, and the like, and examples of the configuration include configurations described in JP1996-122504A (JP-1108-122504A), JP1996-110401A (JP-H08-110401A), JP1998-300902A (JP-H10-300902A), JP2002-243906A, JP2000-111706A, and the like. In addition, an antireflection film having a three-layer configuration, which has excellent robustness with respect to a variation in a film thickness, is described in JP2008-262187A. In a case where the antireflection film having a three-layer configuration described above is disposed on a surface of an image display device, it is possible to set an average value of reflectivity to be less than or equal to 0.5%, to considerably reduce reflected glare, and to obtain an image having excellent stereoscopic effects. In addition, other functions may be imparted to each layer, and examples of a layer to which other functions are imparted include a layer of low refractive index having antifouling properties, a layer of high refractive index having antistatic properties, a hard coat layer having antistatic properties, and a hard coat layer having anti-glare characteristics (for example, JP1998-206603A (JP-H10-206603A), JP2002-243906A, JP2007-264113A, and the like), and the like.

Examples of an inorganic material configuring the antireflection layer include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, $WO_3$, and the like, and one type of material can be independently used, or two or more types thereof can be used together. Among them, $SiO_2$, $ZrO_2$, $TiO_2$, and $Ta_2O_5$ are preferable since vacuum vapor deposition can be performed at a low temperature, and thus, a film can also be formed on a surface of a plastic substrate.

A laminated structure of alternately forming a high refractive index material layer and a low refractive index material layer, in which the total optical film thickness of a $ZrO_2$ layer and a $SiO_2$ layer from the substrate side is $\lambda/4$, an optical film thickness of the $ZrO_2$ layer is $\lambda/4$, and an optical film thickness of the $SiO_2$ layer which is the outermost layer is $\lambda/4$, is exemplified as a multilayer film which is formed of the inorganic material. Here, $\lambda$ is a design wavelength, and a wavelength of 520 nm is generally used. It is preferable that the outermost layer is formed of $SiO_2$ since a refractive index is low, and a mechanical hardness can be imparted to the antireflection layer.

In a case where the antireflection layer is formed of the inorganic material, for example, a vacuum vapor deposition method, an ion plating method, a sputtering method, a CVD method, a method of performing precipitation in a saturated solution by a chemical reaction, and the like can be adopted as a film formation method.

Examples of an organic material which is used in the layer of low refractive index can include a tetrafluoroethylene-hexafluoropropylene copolymer (FFP), polytetrafluoroethylene (PTFE), an ethylene-tetrafluoroethylene copolymer (ETFE), and the like, and a composition containing a fluorine-containing curable resin and inorganic fine particles, which is described in JP2007-298974A, a low refractive index coating composition containing hollow silica fine particles, which is described in JP2002-317152A, JP2003-202406A, and JP2003-292831A can be preferably used. The film formation method can be performed by coating methods such as a spin coating method, a dip coating method, and a gravure coating method, which have excellent productivity, in addition to the vacuum vapor deposition method.

It is preferable that the refractive index of the layer of low refractive index is preferably 1.30 to 1.51. The refractive index of the layer of low refractive index is more preferably 1.30 to 1.46, and is even more preferably 1.32 to 1.38.

Examples of an organic material which is used in the layer of intermediate refractive index and the layer of high refractive index can include a binder which is obtained by cross-linking or a polymerization reaction, such as an ionizing radiation curable compound having an aromatic ring, an ionizing radiation curable compound containing a halogenated element other than fluorine (for example, Br, I, Cl, and the like), and an ionizing radiation curable compound containing an atom such as S, N, and P, and inorganic particles containing $TiO_2$ to be added to the binder as a main component. Specifically, an organic material described in paragraphs [0074] to [0094] of JP2008-262187A can be exemplified.

The refractive index of the layer of high refractive index is preferably 1.65 to 2.20, and is more preferably 1.70 to 1.80. The refractive index of the layer of intermediate refractive index is adjusted to be a value between the refractive index of the layer of low refractive index and the refractive index of the layer of high refractive index. The refractive index of the layer of intermediate refractive index is preferably 1.55 to 1.65, and is more preferably 1.58 to 1.63.

The film thickness of the antireflection layer is not particularly limited, but may be approximately 0.1 to 10 μm, 1 to 5 μm, and 2 to 4 μm.

EXAMPLES

Hereinafter, the characteristics of the present invention will be described in detail with reference to the examples and comparative examples. Materials, use amounts, ratios, treatment contents, treatment sequences, and the like of the following examples can be suitably changed unless the changes cause deviance from the gist of the present invention. Accordingly, the range of the present invention will not be restrictively interpreted by the following specific examples.

<Synthesis of Compound 1-3>

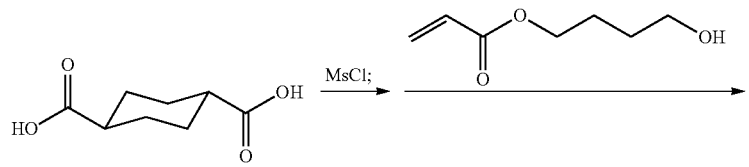

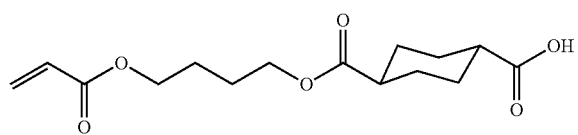

Carboxylic Acid A

A trans-1,4-cyclohexane dicarboxylic acid (10 g), mesyl chloride (1.9 mL), and dibutyl hydroxy toluene (BHT) (0.2 g) were stirred in THF (72 mL), and triethyl amine (3.7 mL) was subjected to dropwise addition by retaining an internal temperature to be lower than or equal to 25° C. Stirring was performed at a room temperature for 2 hours, and then, N,N-dimethyl aminopyridine (0.3 g) and 4-hydroxy butyl acrylate (3.1 g) were added, and triethyl amine (3.7 mL) was subjected to dropwise addition at an internal temperature of lower than or equal to 25° C. Stirring was performed at a room temperature for 3 hours, and then, water (0.5 mL) and methanol (2 mL) were added, and a reaction liquid to which ethyl acetate was added was subjected to celite filtration, a water layer was removed by adding a dilute hydrochloric acid to a filtrate, and washing was sequentially performed with sodium bicarbonate water and saline. An organic layer was dried with magnesium sulfate, the desiccant was filtered, and then, a solvent was distilled under reduced pressure, and thus, a carboxylic acid A (7.1 g) was obtained.

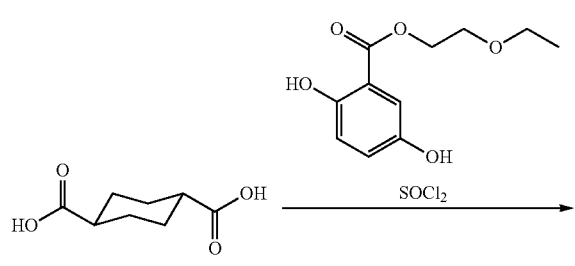

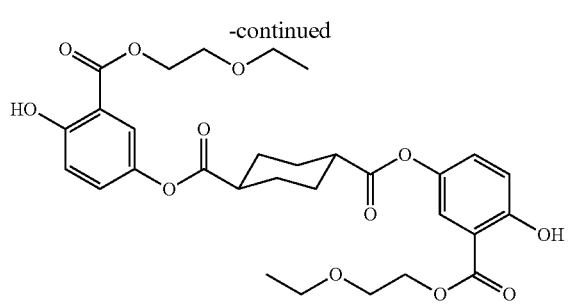

Phenol Derivative B

A mixture of a trans-1,4-cyclohexane dicarboxylic acid (5 g), toluene (40 mL), and N,N-dimethyl formamide (0.05 mL) was heated and stirred, thionyl chloride (8.3 g) was subjected to dropwise addition at an internal temperature of 80° C., and then, heating and stirring were performed at an internal temperature 80° C. for 2 hours. Cooling was performed to an internal temperature of 30° C., and then, 2-ethoxy ethyl-2,5-dihydroxy benzoate (13.1 g) was added, and then, heating and stirring were performed at an internal temperature of 90° C. for 4 hours. Methanol (60 mL) was added at an internal temperature of 40° C., and then, stirring was further performed at an internal temperature 5° C. for 30 minutes, and generated crystals were filtered, and thus, 11.5 g of a phenol derivative B was obtained.

$^1$H-NMR (Solvent: CDCl$_3$) δ(ppm):
1.25 (t, 6H), 1.6-1.7 (m, 4H), 2.2-2.4 (m, 4H), 2.5-2.6 (m, 2H), 3.55-3.65 (m, 4H), 3.8-3.85 (m, 4H), 4.45-4.5 (m, 4H), 7.0 (d, 2H), 7.2 (dd, 2H), 7.6 (d, 2H)

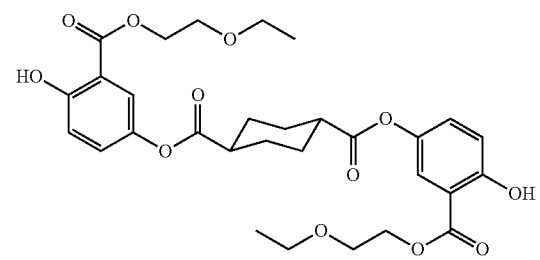

Phenol Derivative B

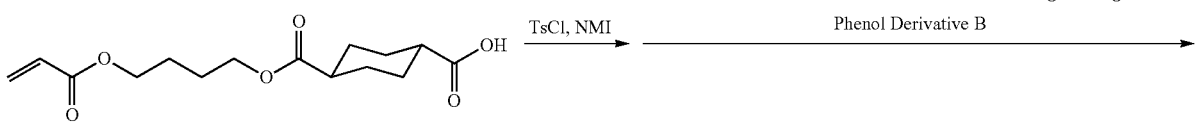

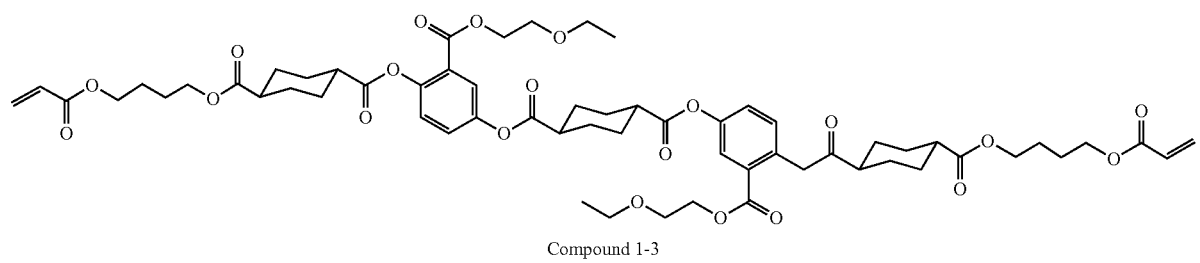

Compound 1-3

The carboxylic acid A (13.4 g), TsCl (10.3 g), and BHT (0.2 g) were stirred in THF (40 mL) and 1-ethyl-2-pyrrolidone (25 mL), 1-methyl imidazole (11 mL) was subjected to dropwise addition under ice cooling, and stirring was performed at a room temperature for 1 hour. The phenol derivative B (10.6 g) was added, and stirring was further performed at a room temperature for 2 hours. Water (10 mL) was added, and then, a water layer was removed, water and methanol were added, stirring was performed for 1 hour under ice cooling, and generated crystals were filtered, and thus, a compound 1-3 (18.3 g) was obtained.

$^1$H-NMR (Solvent: CDCl$_3$) δ(ppm):
1.2 (t, 6H), 1.4-1.8 (m, 18H), 2.1-2.2 (m, 4H), 2.2-2.4 (m, 12H), 2.5-2.7 (m, 4H), 3.5 (q, 4H), 3.7-3.8 (m, 4H), 4.1-4.3 (m, 8H), 4.4-4.5 (m, 4H), 5.8 (dd, 2H), 6.1 (dd, 2H), 6.4 (dd, 2H), 7.1 (d, 2H), 7.3 (dd, 2H), 7.7 (d, 2H)

<Synthesis of Compound 2-3>

A 4-(4-acryloyloxy butyloxy) benzoic acid was synthesized with reference to a method described in [0085] to [0087] on Page 18 of JP4397550B.

BHT (60 mg) was added to a tetrahydrofuran (10 mL) solution of methane sulfonyl chloride (1.62 mL), and an internal temperature was cooled to −5° C. A tetrahydrofuran (8 mL) solution of 4-(4-acryloyloxy butyloxy) benzoic acid (5.5 g) and diisopropyl ethyl amine (3.7 mL), which was separately prepared, was subjected to dropwise addition such that an internal temperature did not become higher than or equal to 0° C. Stirring was performed at −5° C. for 1 hour, and then, a small amount of N-methyl imidazole was added, the phenol derivative B (5.2 g) was added, and 15 mL of tetrahydrofuran was added, and then, triethyl amine (3.1 mL) was subjected to dropwise addition, and after that, stirring was performed at a room temperature for 3 hours. The reaction was stopped by adding water (13 mL), a water layer was removed by adding ethyl acetate, and washing was sequentially performed with a dilute hydrochloric acid and saline. Filtration was performed by adding a desiccant, and then, generated crystals were filtered by adding methanol, and thus, 8.4 g of a compound 2-3 was obtained.

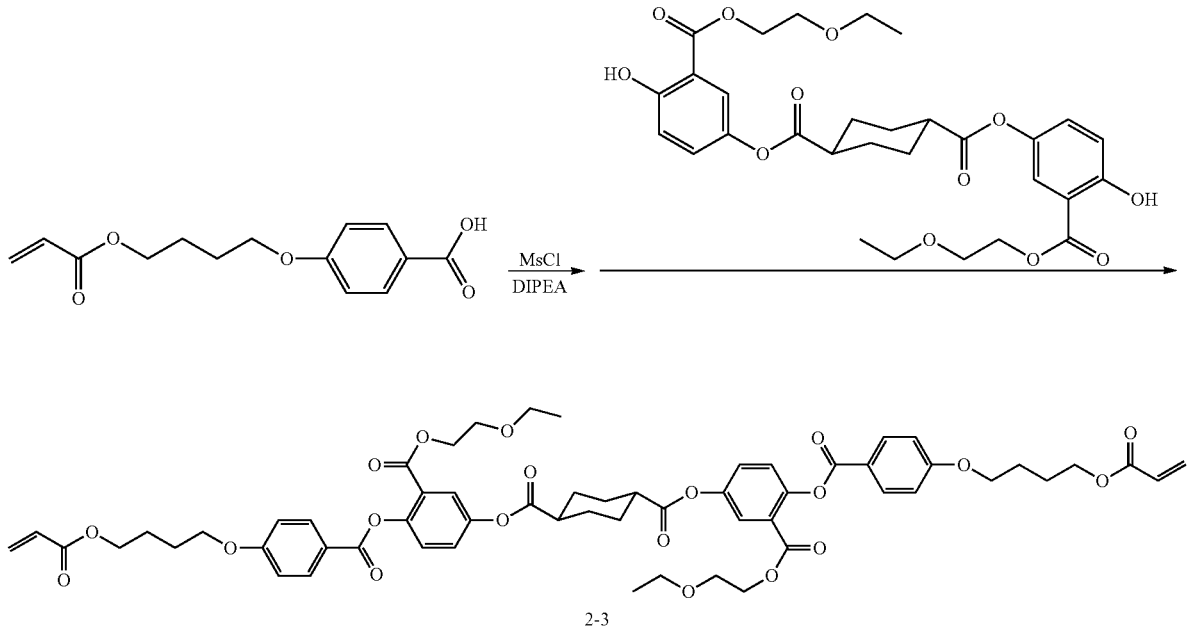

2-3

$^1$H-NMR (Solvent: CDCl$_3$) δ(ppm):
1.2 (t, 6H), 1.65-1.8 (m, 4H), 1.85-1.95 (m, 8H), 2.3-2.4 (m, 4H), 2.6-2.7 (m, 2H), 3.4 (q, 4H), 3.5-3.6 (m, 4H), 4.1 (m, 4H), 4.15-4.25 (m, 8H), 5.85 (dd, 2H), 6.1 (dd, 2H), 6.4 (dd, 2H), 7.0 (d, 4H), 7.25 (d, 2H), 7.35 (dd, 2H), 7.8 (d, 2H), 8.15 (d, 4H)

<Synthesis of Compound 1-16>

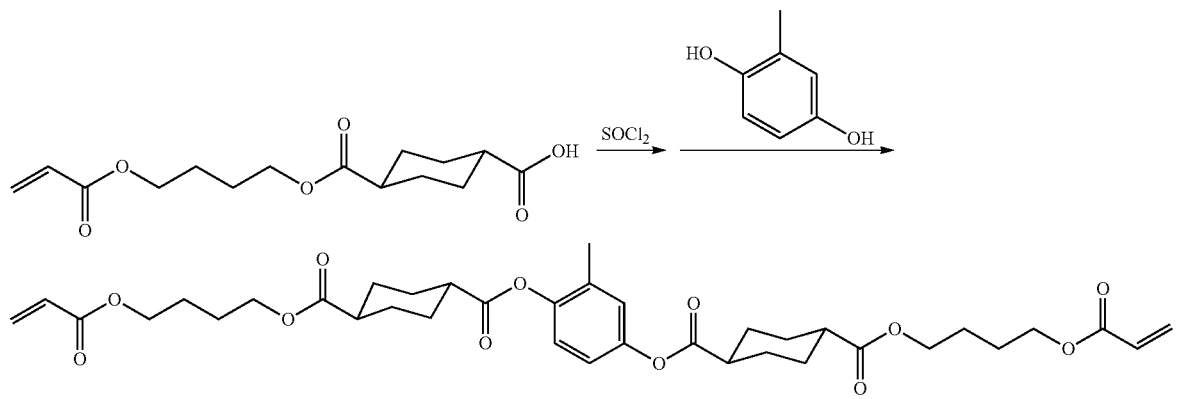

The carboxylic acid A (1.0 g), BHT (0.05 g), and thionyl chloride (0.27 mL) were stirred in toluene (2.0 mL) at a room temperature for 1 hour. A solvent was distilled under reduced pressure, and then, ethyl acetate (3 mL) and methyl hydroquinone (0.18 g) were added, N,N-dimethyl aminopyridine (0.03 g) and triethyl amine (0.7 mL) were subjected to dropwise addition, and stirring was performed at a room temperature for 3 hours. Methanol (1 mL) was added, stirring was performed at a room temperature for 15 minutes, and then, a water layer was removed by adding water and ethyl acetate, and an organic layer was washed by sequentially using a dilute hydrochloric acid and saline. The organic layer was dried with magnesium sulfate, and the desiccant was filtered, and then, a solvent was distilled under reduced pressure. Purification of a silica gel column chromatography was performed, and thus, 0.5 g of a compound 1-16 was obtained.

$^{1}$H-NMR (Solvent: CDCl$_{3}$) δ(ppm):
1.5-1.8 (m, 8H), 2.1-2.4 (s+m, 3H+10H), 2.5-2.7 (m, 2H), 4.1-4.3 (m, 8H), 5.8 (dd, 2H), 6.1 (dd, 2H), 6.4 (dd, 2H), 6.85-7.0 (m, 3H)

<Synthesis of Compound 1-19>

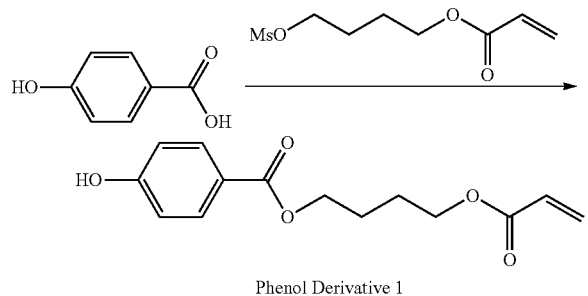

Phenol Derivative 1

A parahydroxy benzoic acid (9.0 g) was stirred in dimethyl acetoamide (70 mL), triethyl amine (9.8 mL), a methane sulfonic acid 4-acryloyloxy butyl (11.1 g), and BHT (0.2 g) were added, and stirring was performed at an internal temperature of 70° C. for 10 hours. Cooling was performed to a temperature of 30° C., a water layer was removed by adding water and ethyl acetate, and washing was sequentially performed with saturated sodium bicarbonate water, a dilute hydrochloric acid, and saline. An organic layer was dried with magnesium sulfate, the desiccant was filtered, and then, a solvent was distilled under reduced pressure by adding BHT (0.1 g), and thus, a phenol derivative 1 was obtained.

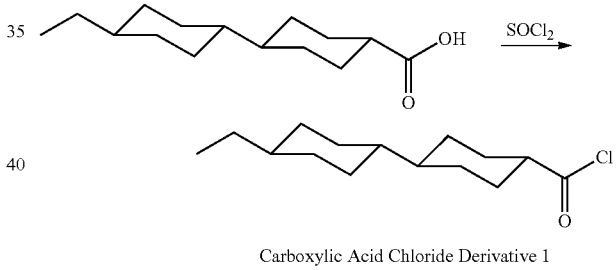

Carboxylic Acid Chloride Derivative 1

Next, a 4-ethyl cyclohexyl-4-cyclohexyl carboxylic acid (31 g) was added with toluene (40 mL) and dimethyl formamide (0.3 mL) and heated to 60° C., thionyl chloride (18 g) was subjected to dropwise addition, and stirring was performed at an internal temperature 60° C. for 3 hours. After that, a solvent was distilled under reduced pressure, and thus, a carboxylic acid chloride derivative 1 (33 g) was obtained.

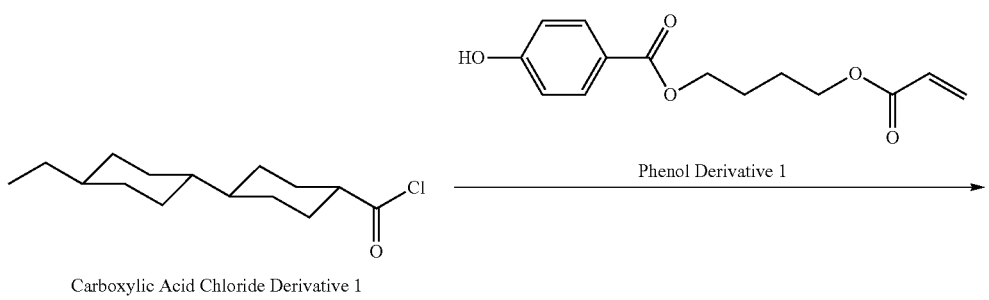

Carboxylic Acid Chloride Derivative 1

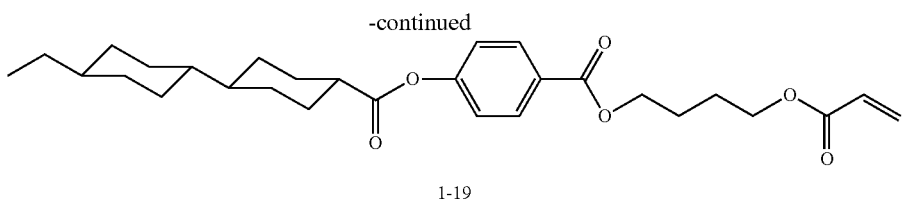

1-19

The phenol derivative 1 (11.9 g) was stirred in 70 mL of tetrahydrofuran, and dimethyl aminopyridine (0.3 g) and the carboxylic acid chloride derivative 1 (12.7 g) were added. A reaction liquid was cooled to an internal temperature of 0° C., triethyl amine (7.6 mL) was subjected to dropwise addition, stirring was performed at 25° C. for 2 hours, and stirring was further performed for 30 minutes by adding methanol (20 mL). A water layer was removed by adding water and ethyl acetate, washing was sequentially performed with saturated sodium bicarbonate water, a dilute hydrochloric acid, and saline, and then, an organic layer was dried with magnesium sulfate, and the desiccant was filtered. A solvent was distilled under reduced pressure by adding BHT (0.1 g), cooling was performed to an internal temperature of 0° C. by adding methanol (80 mL), crystals which were generated by performing stirring for 3 hours were filtered, and thus, 10 g of a compound 1-19 was obtained.

$^1$H-NMR (Solvent: CDCl$_3$) δ(ppm):
0.8-1.3 (m, 14H), 1.5-1.6 (m, 2H), 1.7-1.9 (m, 10H), 2.1-2.2 (m, 2H), 2.4-2.5 (m, 1H), 4.2 (t, 2H), 4.4 (t, 2H), 5.8 (dd, 1H), 6.1 (dd, 1H), 6.4 (dd, 1H), 7.1 (d, 2H), 8.1 (d, 2H)

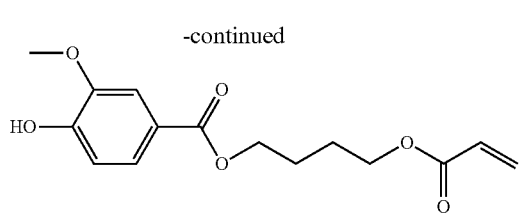

Phenol Derivative 2

A vanillic acid (10.9 g) was stirred in dimethyl acetoamide (70 mL), triethyl amine (9.8 mL), methane sulfonic acid 4-acryloyloxy butyl (11.1 g), and BHT (0.2 g) were added, and stirring was performed at an internal temperature of 70° C. for 10 hours. Cooling was performed to 30° C., and then, a water layer was removed by adding water and ethyl acetate, and washing was sequentially performed with saturated sodium bicarbonate water, a dilute hydrochloric acid, and saline. An organic layer was dried with magnesium sulfate, the desiccant was filtered, and then, a solvent was distilled under reduced pressure by adding BHT (0.1 g), and thus, a phenol derivative 2 was obtained.

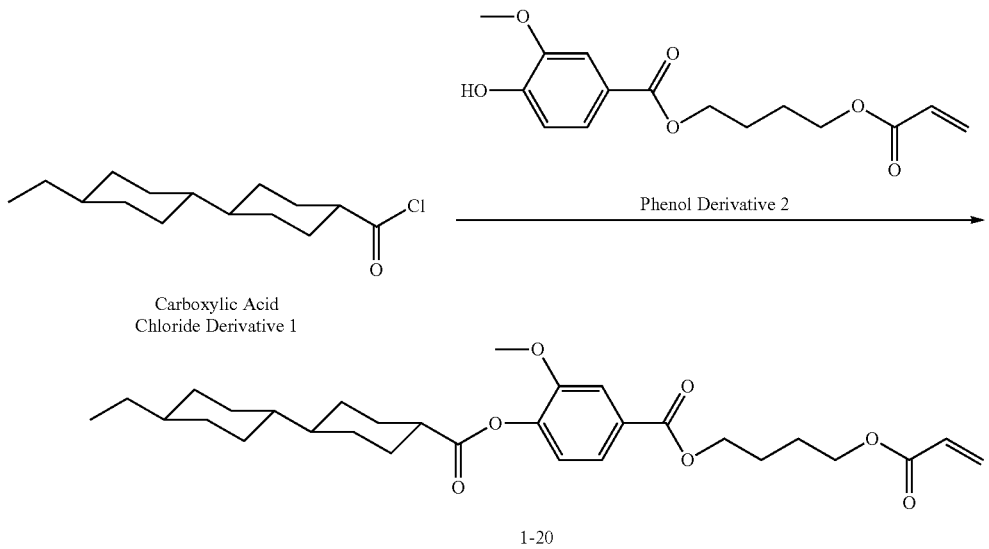

1-20

<Synthesis of Compound 1-20>

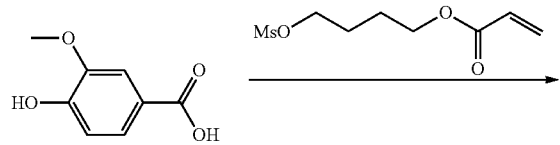

The phenol derivative 2 (13.1 g) was stirred in 70 mL of tetrahydrofuran, and dimethyl aminopyridine (0.3 g) and the carboxylic acid chloride derivative 1 (12.7 g) were added. A reaction liquid was cooled to an internal temperature of 0° C., triethyl amine (7.6 mL) was subjected to dropwise addition, stirring was performed at 25° C. for 2 hours, and stirring was further performed for 30 minutes by adding methanol (20 mL). A water layer was removed by adding water and ethyl acetate, washing was sequentially performed with saturated sodium bicarbonate water, a dilute hydrochloric acid, and saline, and then, an organic layer was dried with magnesium sulfate, and the desiccant was filtered. A solvent was distilled under reduced pressure by adding BHT (0.1 g), cooling was performed to an internal temperature of 0° C. by adding methanol (80 mL), and crystals which were generated by performing stirring for 3 hours were filtered, and thus, 13 g of a compound 1-20 was obtained.

$^1$H-NMR (Solvent: CDCl$_3$) δ(ppm):

0.8-1.3 (m, 14H), 1.5-1.6 (m, 2H), 1.7-1.9 (m, 10H), 2.1-2.2 (m, 2H), 2.5-2.6 (m, 1H), 3.9 (s, 314), 4.2 (t, 2H), 4.4 (t, 2H), 5.8 (dd, 1H), 6.1 (dd, 1H), 6.4 (dd, 1H), 7.0 (d, 1H), 7.6-7.7 (m, 2H)

<Synthesis of Compound 1-26>

-continued

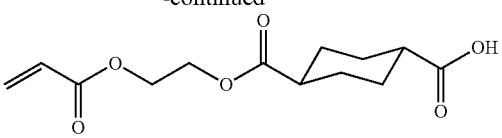

A trans-1,4-cyclohexane dicarboxylic acid (10 g), mesyl chloride (1.9 mL), and BHT (0.2 g) were stirred in THF (72 mL), triethyl amine (3.7 mL) was subjected to dropwise addition by retaining an internal temperature to be lower

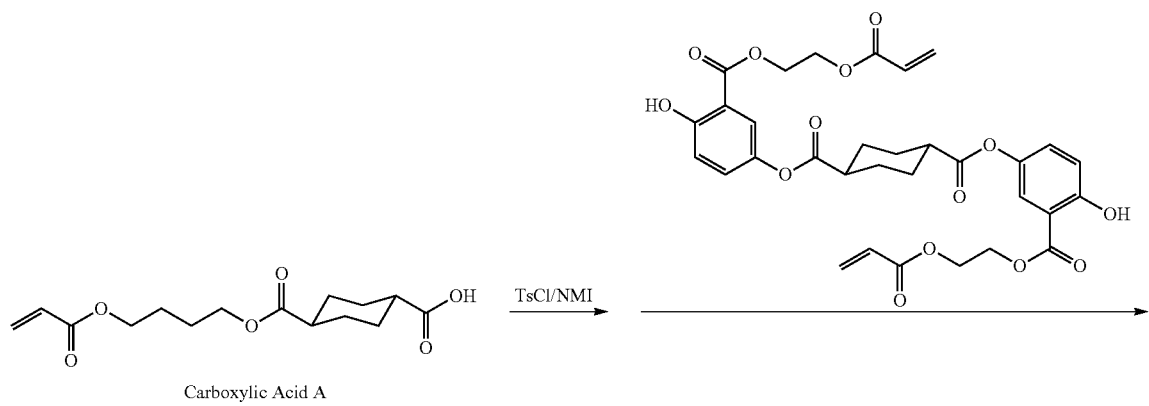

Carboxylic Acid A

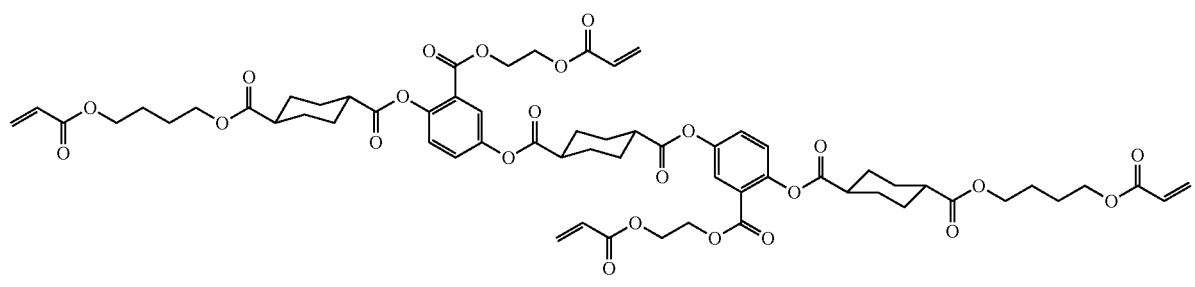

Compound 1-26

The phenol derivative described above was synthesized by the same method as that of the phenol derivative B. Further, a compound 1-26 was obtained by performing purification of a column chromatography and by using the same synthesis method as that of the compound 1-3.

$^1$H-NMR (Solvent: CDCl$_3$) δ(ppm):

1.45-1.8 (m, 18H), 2.1-2.2 (m, 4H), 2.25-2.4 (m, 1214), 2.5-2.7 (m, 4H), 4.1-4.35 (m, 8H), 4.4-4.55 (m, 8H), 5.8 (dd, 4H), 6.1 (dd, 4H), 6.4 (dd, 4H), 7.1 (d, 2H), 7.3 (dd, 2H), 7.7 (d, 2H)

<Synthesis of Compound 1-29>

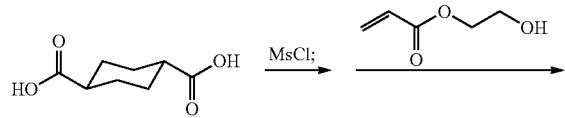

than or equal to 25° C. Stirring was performed at a room temperature for 2 hours, and then, N,N-dimethyl aminopyridine (0.3 g) and 2-hydroxy ethyl acrylate (2.3 mL) were added, triethyl amine (3.7 mL) was subjected to dropwise addition at an internal temperature of lower than or equal to 25° C. Stirring was performed at a room temperature for 3 hours, and then, a water layer was removed by adding a dilute hydrochloric acid and ethyl acetate, and washing was sequentially performed with a dilute hydrochloric acid, saturated sodium bicarbonate water, and saline. An organic layer was dried with magnesium sulfate, the desiccant was filtered, and then, a solvent was distilled under reduced pressure, and thus, a carboxylic acid B (3.8 g) was obtained.

$^1$H-NMR (Solvent: CDCl$_3$) δ(ppm):

1.3-1.6 (m, 4H), 2.0-2.2 (m, 4H), 2.2-2.4 (m, 2H), 4.3-4.4 (m, 4H), 5.9 (dd, 1H), 6.1 (dd, 1H), 6.4 (dd, 1H)

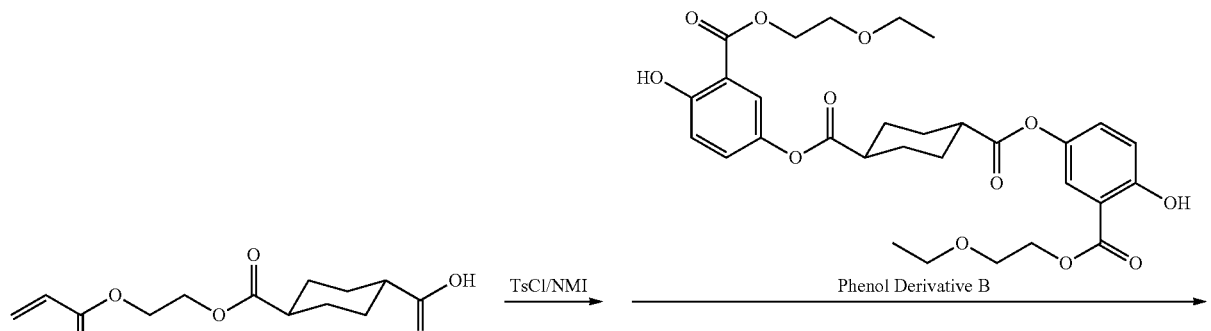

Carboxylic Acid B

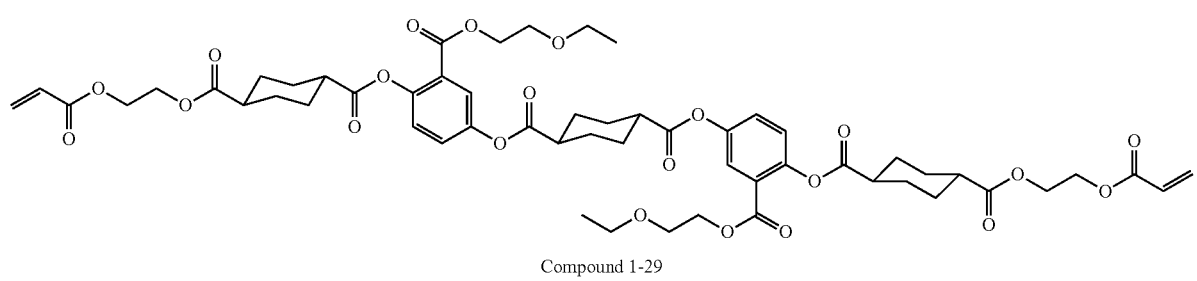

Compound 1-29

A compound 1-29 was obtained by using the same synthesis method as that of the compound 1-3.

$^1$H-NMR (Solvent: CDCl$_3$) δ(ppm):

1.2 (t, 6H), 1.5-1.7 (m, 12H), 2.1-2.2 (m, 4H), 2.2-2.5 (m, 10H), 2.5-2.7 (m, 4H), 3.5 (q, 4H), 3.7-3.8 (m, 4H), 4.3-4.4 (m, 12H), 5.9 (dd, 2H), 6.1 (dd, 2H), 6.4 (dd, 2H), 7.1 (d, 2H), 7.3 (dd, 2H), 7.7 (d, 2H)

<Synthesis of Mixture of Compounds 1-33, 1-34, and 1-35>

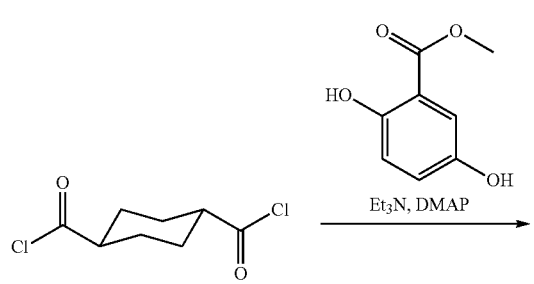

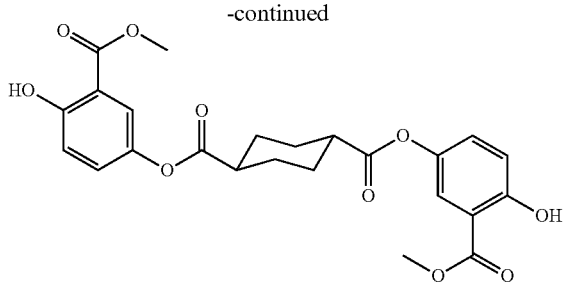

Phenol Derivative C

A dicarboxylic acid chloride 1-6 (960 mg) and 2-(methoxy carbonyl) hydroquinone (1.5 g) were stirred in THF (5.7 mL). Triethyl amine (1.5 mL) and N,N-dimethyl aminopyridine (56 mg) were added at an internal temperature of 2° C., and stirring was performed at a room temperature for 2 hours. A water layer was removed by adding water and ethyl acetate, and an organic layer was washed by sequentially using water and saline. The organic layer was dried with magnesium sulfate, the desiccant was filtered, and then, a solvent was distilled under reduced pressure. Stirring was performed at an internal temperature of 0° C. for 30 minutes by adding methanol (15 mL), and generated crystals were filtered, and thus, 1.85 g of a phenol derivative C was obtained.

$^1$H-NMR (Solvent: CDCl$_3$) δ(ppm):

1.6-1.7 (m, 4H), 2.2-2.4 (m, 4H), 2.5-2.6 (m, 2H), 3.9 (s, 6H), 7.0 (d, 2H), 7.2 (dd, 2H), 7.6 (d, 2H)

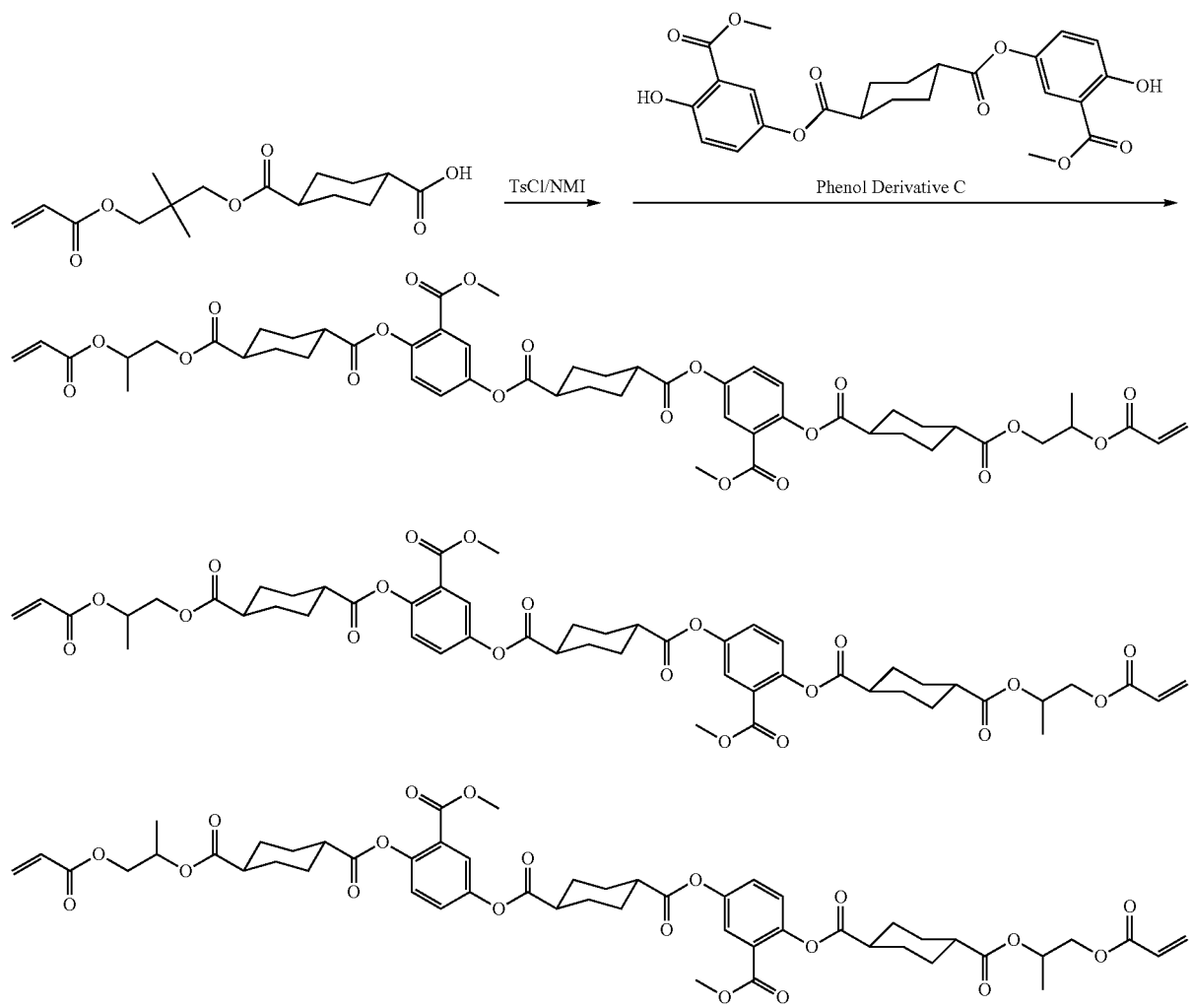
The carboxylic acid described above was synthesized by the same method as that of the compound 1-29. Further, a mixture of compounds 1-33, 1-34, and 1-35 was obtained by performing purification of a column chromatography and by using the same synthesis method as that of the compound 1-3.
$^1$H-NMR (Solvent: CDCl$_3$) δ(ppm):
1.2-1.3 (m, 6H), 1.5-1.7 (m, 12H), 2.1-2.2 (m, 4H), 2.2-2.4 (m, 10H), 2.6-2.7 (m, 4H), 3.9 (s, 6H), 4.1-4.3 (m, 4H), 5.2-5.3 (m, 2H), 5.8-5.9 (m, 2H), 6.1-6.2 (m, 2H), 6.4-6.5 (m, 2H), 7.1 (d, 2H), 7.3 (dd, 2H), 7.7 (d, 2H)
<Synthesis of Compound 1-28>
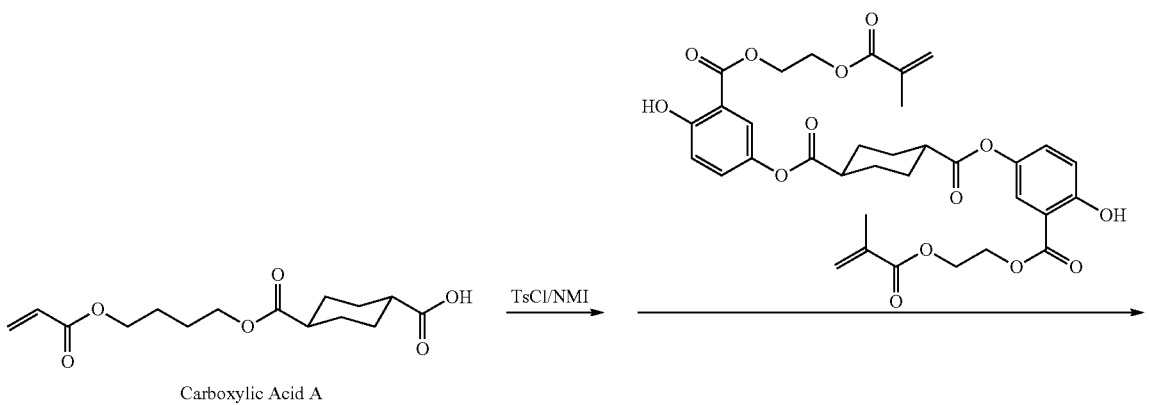

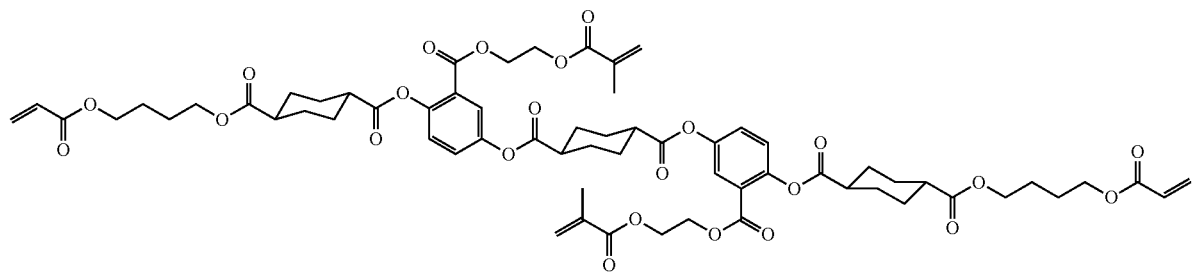
Compound 1-28
A compound 1-28 was obtained by using the same synthesis method as that of the compound 1-3.
$^1$H-NMR (Solvent: CDCl$_3$) δ(ppm):
1.45-1.8 (m, 18H), 1.95 (s, 6H), 2.1-2.2 (m, 4H), 2.25-2.4 (m, 12H), 2.5-2.7 (m, 4H), 4.1-4.35 (m, 8H), 4.4-4.55 (m, 8H), 5.6 (s, 2H), 5.8 (dd, 2H), 6.1-6.2 (m, 4H), 6.4 (dd, 2H), 7.1 (d, 2H), 7.3 (dd, 2H), 7.7 (d, 2H)
<Synthesis of Compound 1-36>
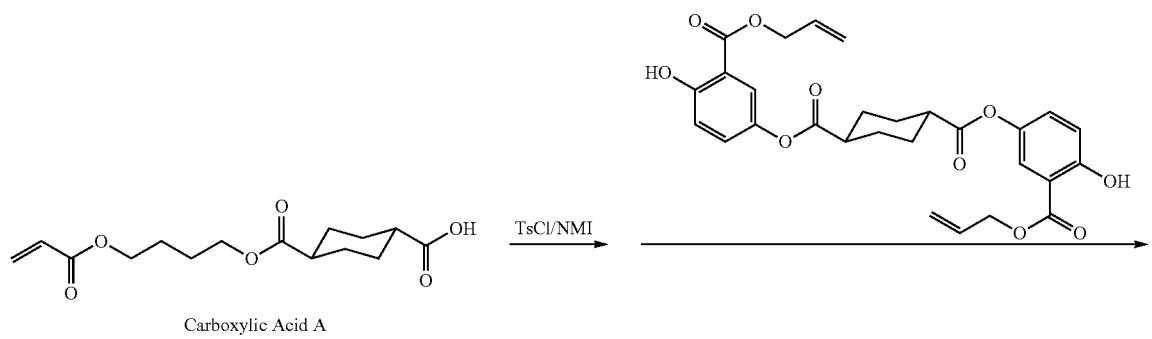
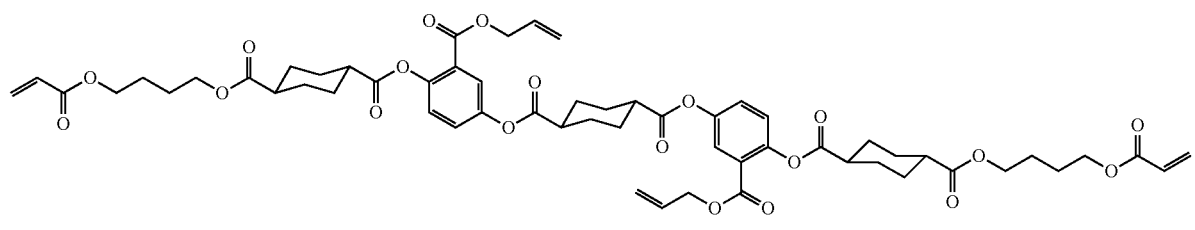
Compound 1-36
A compound 1-36 was obtained by using the same synthesis method as that of the compound 1-3.
$^1$H-NMR (Solvent: CDCl$_3$) δ(ppm):
1.45-1.8 (m, 18H), 2.1-2.2 (m, 4H), 2.25-2.4 (m, 12H), 2.5-2.7 (m, 4H), 4.1-4.35 (m, 4H), 4.4-4.55 (m, 4H), 4.6-4.7 (m, 4H), 5.2-5.45 (m, 4H), 5.8-6.0 (m, 4H), 6.1 (dd, 2H), 6.4 (d, 2H), 7.1 (d, 2H), 7.3 (dd, 2H), 7.7 (d, 2H)

<Synthesis of Compound 2-8>
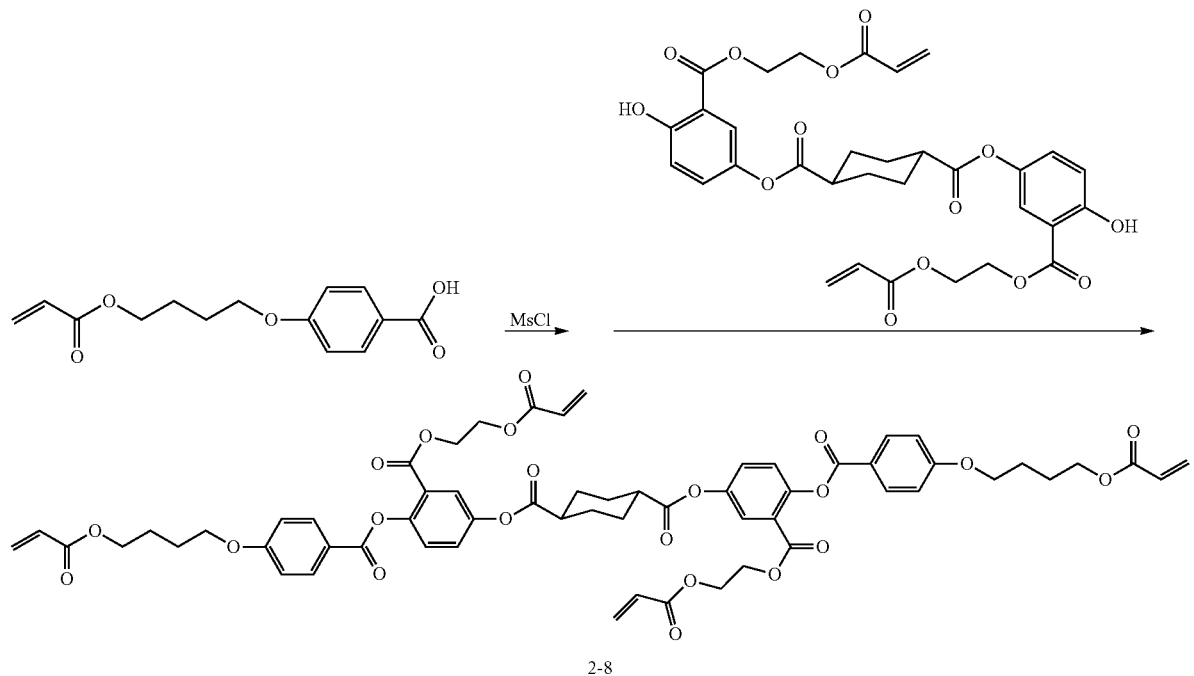
2-8
A compound 2-8 was obtained by using the same synthesis method as that of the compound 2-3.
$^1$H-NMR (Solvent: CDCl$_3$) δ(ppm):
1.65-1.8 (m, 4H), 1.9-1.95 (m, 8H), 2.3-2.4 (m, 4H), 2.6-2.7 (m, 2H), 4.05-4.15 (m, 4H), 4.2-4.3 (m, 8H), 4.4-4.45 (m, 4H), 5.85 (dd, 4H), 6.0-6.2 (m, 4H), 6.4 (dd, 4H), 6.95 (d, 4H), 7.25 (d, 2H), 7.35 (dd, 2H), 7.8 (d, 2H), 8.15 (d, 4H)
<Synthesis of Compound 2-34>
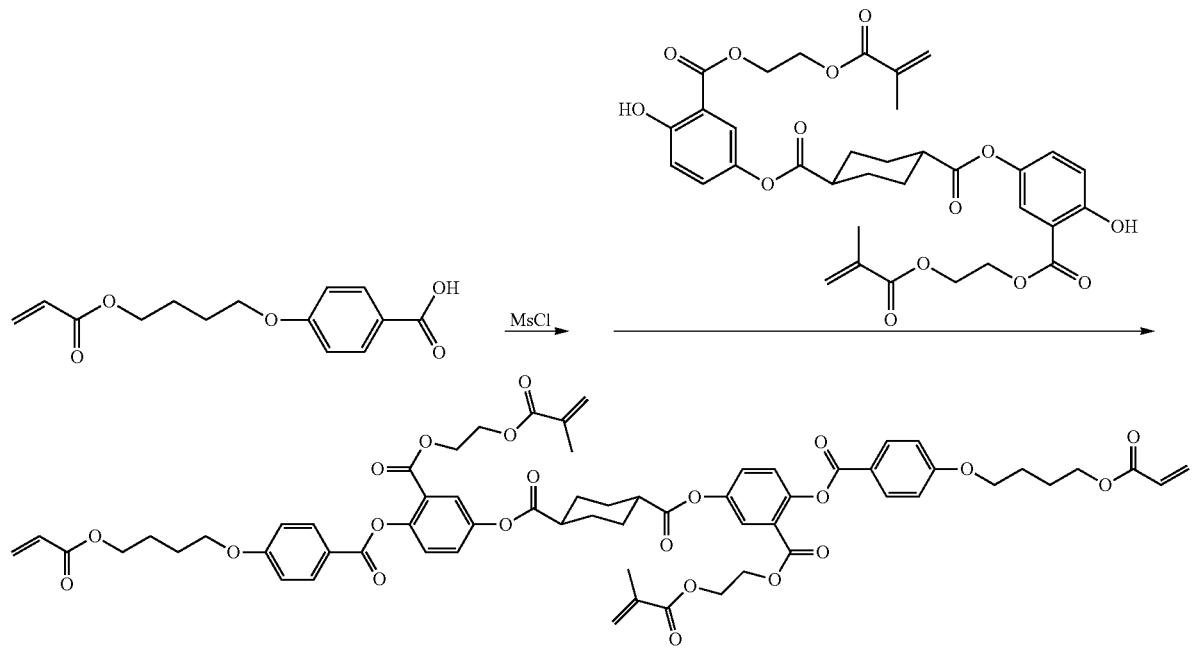
2-34

A compound 2-34 was obtained by using the same synthesis method as that of the compound 2-3.
¹H-NMR (Solvent: CDCl₃) δ(ppm):
1.65-1.8 (m, 4H), 1.9-2.0 (m, 14H), 2.3-2.4 (m, 4H), 2.6-2.7 (m, 2H), 4.05-4.15 (m, 4H), 4.2-4.35 (m, 8H), 4.4-4.45 (m, 4H), 5.6 (s, 2H), 5.85 (dd, 2H), 6.1-6.2 (m, 4H), 6.4 (d, 2H), 6.95 (d, 4H), 7.25 (d, 2H), 7.35 (dd, 2H), 7.8 (d, 2H), 8.15 (d, 4H)
<Synthesis of Compound 2-35>
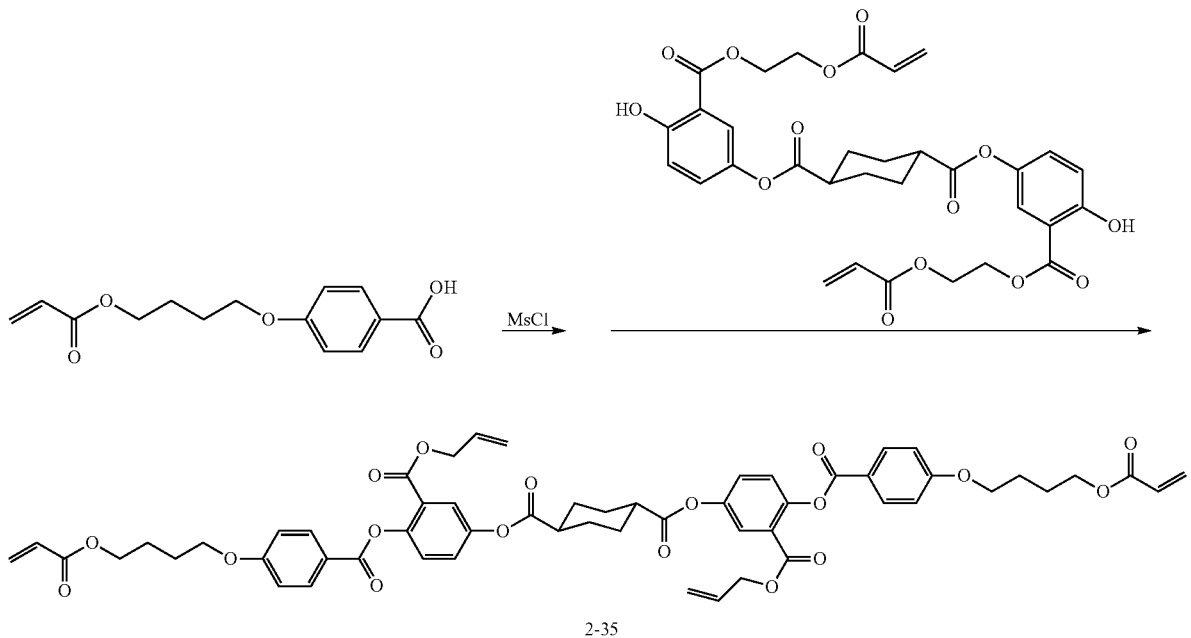
2-35
A compound 2-35 was obtained by using the same synthesis method as that of the compound 2-3.
¹H-NMR (Solvent: CDCl₃) δ(ppm):
1.65-1.8 (m, 4H), 1.9-1.95 (m, 8H), 2.3-2.4 (m, 4H), 2.6-2.7 (m, 2H), 4.05-4.15 (m, 4H), 4.2-4.3 (m, 4H), 4.6-4.7 (m, 4H), 5.2-5.45 (m, 4H), 5.8-6.2 (m, 6H), 6.4 (d, 2H), 6.95 (d, 4H), 7.25 (d, 2H), 7.35 (dd, 2H), 7.8 (d, 2H), 8.15 (d, 4H)
<Synthesis of Compound 2-36>
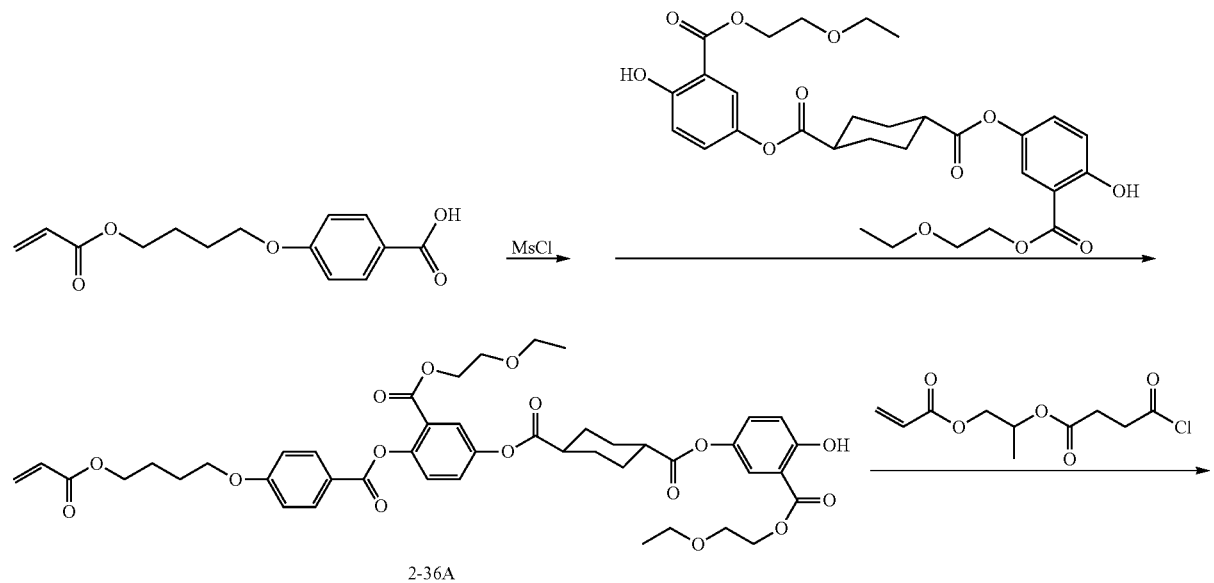
2-36A

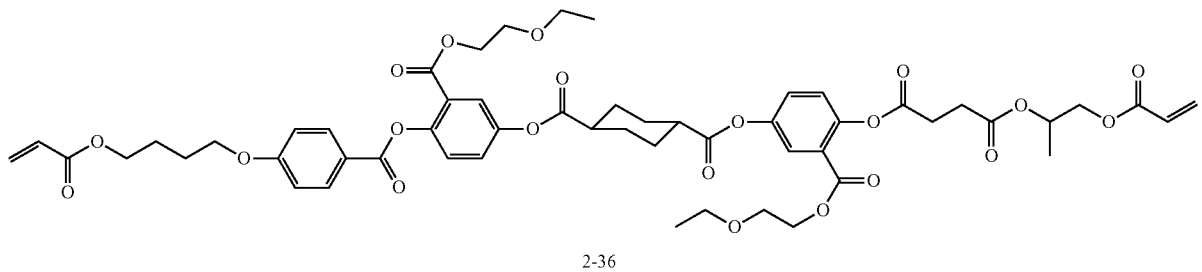

2-36

BHT (60 mg) was added to a tetrahydrofuran (10 mL) solution of methane sulfonyl chloride (1.62 mL), and an internal temperature was cooled to −5° C. A tetrahydrofuran (8 mL) solution of a 4-(4-acryloyloxy butyloxy) benzoic acid (5.5 g) and diisopropyl ethyl amine (3.7 mL), which was separately prepared, was subjected to dropwise addition such that an internal temperature did not become higher than or equal to 0° C. Stirring was performed at −5° C. for 1 hour, and then, a small amount of N-methyl imidazole was added, the phenol derivative B (15.2 g) was added, and 5 mL of tetrahydrofuran was added, and then, triethyl amine (3.1 mL) was subjected to dropwise addition, and after that, stirring was performed at a room temperature for 3 hours. The reaction was stopped by adding water (13 mL), a water layer was removed by adding ethyl acetate, and washing was sequentially performed with a dilute hydrochloric acid and saline. A crude product obtained by distilling a solvent under reduced pressure was purified by a silica gel column chromatography, and thus, a compound 2-36A (5.8 g) was obtained.

Next, BHT (60 mg) was added to a tetrahydrofuran (15 mL) solution of 1-acryloyloxy-2-propyl 4-chloro-4-oxobutanate (1.0 g) which was separately prepared, and an internal temperature was cooled to 0° C. A compound 17A (3.0 g) was added, and triethyl amine (0.7 mL) was subjected to dropwise addition. Stirring was performed at a room temperature for 2 hours, and then, water (5 mL) and ethyl acetate (15 mL) were added. A water layer was removed, and a solvent of an organic layer was distilled under reduced pressure, and then, purification of a silica gel column chromatography was performed, and thus, a compound 2-36 (1.8 g) was obtained.

$^1$H-NMR (Solvent: CDCl$_3$) δ(ppm):

1.15 (t, 3H), 1.2-1.25 (m, 6H), 1.6-1.75 (m, 6H), 1.9-2.0 (m, 4H), 2.3-2.35 (m, 4H), 2.6-2.7 (m, 2H), 2.75-2.85 (m, 2H), 2.95-3.05 (m, 2H), 3.4 (q, 2H), 3.5-3.6 (m, 4H), 3.75 (q, 2H), 4.1-4.35 (m, 8H), 4.4-4.45 (m, 2H), 5.2-5.3 (m, 1H), 5.85 (dd, 2H), 6.1-6.2 (m, 2H), 6.4 (dd, 2H), 6.95 (d, 2H), 7.1 (d, 1H), 7.2-7.35 (m, 3H), 7.75 (d, 2H), 8.15 (d, 2H)

<Formation of Phase Difference Film>

[Preparation of Polymerizable Composition] A polymerizable composition coating liquid having compositions described below was prepared.

Compound 1-3 80 parts by mass
Compound 2-3 20 parts by mass
Chloroform 900 parts by mass

[Preparation of Coating Sample]

A polyimide alignment film SE-130 manufactured by Nissan Chemical Industries, Ltd. was applied onto a washed glass substrate by using a spin coating method, was dried, and then, was calcined at 250° C. for 1 hour. This was subjected to a rubbing treatment, and thus, a substrate with an alignment film was prepared. The polymerizable composition coating liquid described above was applied onto a rubbing treatment surface of the alignment film of the substrate at a room temperature by a spin coating method, was heated at 80° C. for 1 minute, and then, was left to stand at room temperature for 10 minutes, and thus, a coating sample of Example 1 was prepared.

Coating samples of Examples 2 to 7 and Comparative Examples 1 to 5 were prepared by the same method as that in Example 1 except that the polymerizable compound of the polymerizable composition coating liquid described above (the compound 1-3 and the compound 2-3) was changed as shown in the following table.

[Haze Test]

The haze of the coating samples of Examples 1 to 7 and Comparative Examples 1 to 5 after being left to stand was measured by a hazemeter (NDH2000, manufactured by NIPPON DENSHOKU INDUSTRIES CO., LTD.). The haze of the coating sample of Example 1 was 0.35. Evaluation results of each of the samples are shown in Table 2 such that the haze of greater than or equal to 1 is evaluated as C, and the haze of less than 1 is evaluated as A.

[Δn Measurement]

<Preparation of Phase Difference Film>

A liquid crystalline composition coating liquid (1) having compositions described below was prepared by using the exemplary compounds synthesized in the examples described above.

Compound 1-3 80 parts by mass
Compound 2-3 20 parts by mass
Air Interface Alignment Agent (1) 0.1 parts by mass
Polymerization Initiator IRGACURE819 (manufactured by BASF SE) 2 parts by mass
Solvent Chloroform 900 parts by mass Air Interface Alignment Agent (1)

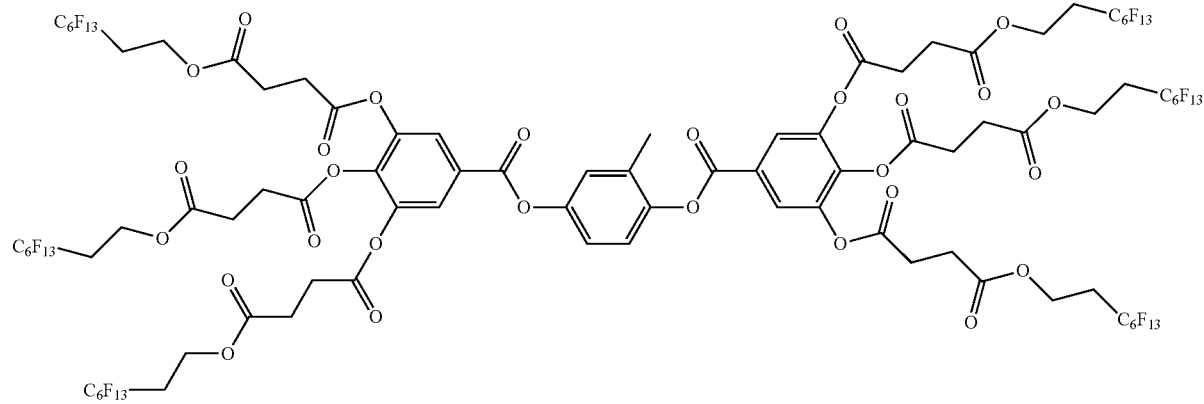

Next, a polyimide alignment film SE-130 manufactured by Nissan Chemical Industries, Ltd. was applied onto a washed glass substrate by a spin coating method, was dried, and then, was calcined at 250° C. for 1 hour. This was subjected to a rubbing treatment, and thus, a substrate with an alignment film was prepared. The liquid crystalline composition coating liquid (1) was applied onto a rubbing treatment surface of the prepared substrate with an alignment film at a room temperature by a spin coating method, was aligned and matured at 80° C. for 1 minute, and then, was subjected to light irradiation at 50° C. for 30 seconds under an atmosphere of nitrogen gas by using a high pressure mercury lamp, and the alignment was immobilized, and thus, a phase difference film 1 was formed. The precipitation of the crystals was not observed on a coated film during a period from the coating to the polymerization.

As a result of measuring the prepared phase difference film in a Tip-Tilt mode by using AxoScan manufactured by Axometrics, Inc, it was confirmed that the average tilt angle of the liquid crystal calculated by the device was 2.8 degrees, and thus, it was possible to form an A-plate type phase difference film. In addition, a phase difference (Re) measured by using the device was 135 nm.

In addition, a film thickness (d) measured by using a non-contact three-dimensional surface shape measurement system (BW-A501, manufactured by Nikon Corporation) was 2.2 nm, and Δn (Re/d) at a wavelength of 550 nm calculated from a ratio of the phase difference (Re) to the film thickness (d) was 0.061.

Phase difference films of Examples 2 to 9 and Comparative Examples 1 to 5 were prepared by the same method as that in Example 1 except that the polymerizable compound of the polymerizable composition coating liquid described above (the compound 1-3 and the compound 2-3) was changed as shown in the following table, and a phase difference and a film thickness were calculated. Furthermore, in Comparative Examples 1, 2, 3, and 5, the precipitation of the crystals was observed during a period from the coating to the polymerization, and in particular, in Comparative Examples 3 and 5, the precipitation considerably occurred, and thus, it was not possible to measure the phase difference. In addition, a cured film of Comparative Example 4 was an isotropic film not having a phase difference.

TABLE 2

|  | 0.5 < mc < 0.7 | | 0.1 < mc < 0.3 | | | |
|---|---|---|---|---|---|---|
|  | Compound No | Parts by Mass | Compound No | Parts by Mass | Haze Test | Δn (Re/d) |
| Example 1 | 1-3 | 80 | 2-3 | 20 | A | 0.059 |
| Example 2 | 1-3 | 70 | 2-3 | 30 | A | 0.062 |
| Example 3 | 1-3 | 50 | 2-3 | 50 | A | 0.074 |
| Example 4 | 1-16 | 50 | 2-3 | 50 | A | 0.071 |
| Example 5 | 1-20 | 20 | 2-3 | 80 | A | 0.108 |
| Example 6 | 1-26 | 80 | 2-3 | 20 | A | 0.058 |
| Example 7 | 1-29 | 80 | 2-3 | 20 | A | 0.062 |
| Example 8 | 1-28 | 80 | 2-35 | 20 | A | 0.055 |
| Example 9 | 1-19 | 80 | 2-36 | 20 | A | 0.068 |
| Comparative Example 1 | 1-3 | 100 | — | — | C | 0.042* |
| Comparative Example 2 | — | — | 2-3 | 100 | C | 0.115* |
| Comparative Example 3 | 1-16 | 100 | — | — | C | Unmeasurable Due to Precipitation* |
| Comparative Example 4 | 1-20 | 100 | — | — | A | Isotropy |
| Comparative Example 5 | 1-3 | 80 | M-1 | 20 | C | Unmeasurable Due to Precipitation* |

*Precipitation Occurs

Compound (M-1)

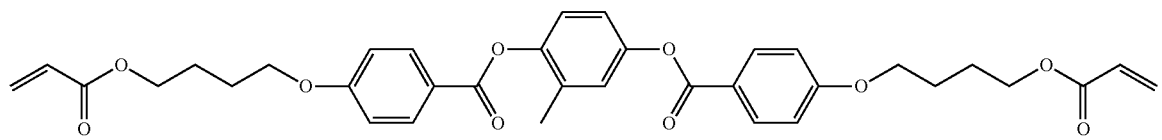

[Formation of Phase Difference Film of Example 10]

A liquid crystalline composition coating liquid (8) having compositions described below was prepared by using the exemplary compounds synthesized in the examples described above.

Mixture of Compounds 1-33, 1-34, and 1-35 80 parts by mass
Compound 2-3 20 parts by mass
Air Interface Alignment Agent (1) 0.1 parts by mass
Polymerization Initiator IRGACURE819 (manufactured by BASF SE) 2 parts by mass
Solvent Chloroform 900 parts by mass Polymerizable Composition Coating Liquid (1)
Compound 1-3 80 parts by mass
Compound 2-3 20 parts by mass
Chiral Agent LC-756 (manufactured by BASF SE) 4.6 parts by mass
Air Interface Alignment Agent (1) 0.07 parts by mass
Polymerization Initiator IRGACURE819 (manufactured by BASF SE) 3 parts by mass
Solvent Methyl Ethyl Ketone 250 parts by mass
Solvent Cyclohexanone 50 parts by mass
Air Interface Alignment Agent (1)

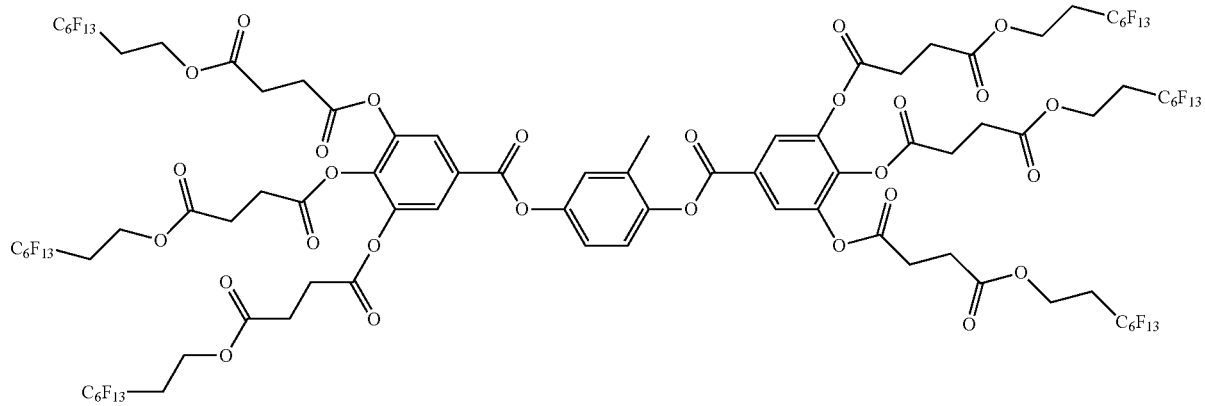

Next, a polyimide alignment film SE-130 manufactured by Nissan Chemical Industries, Ltd. was applied onto a washed glass substrate by a spin coating method, was dried, and then, was calcined at 250° C. for 1 hour. This was subjected to a rubbing treatment, and thus, a substrate with an alignment film was prepared. The liquid crystalline composition coating liquid (1) was applied onto a rubbing treatment surface of the prepared substrate with an alignment film at a room temperature by a spin coating method, was aligned and matured at 140° C. for 1 minute, and then, was subjected to light irradiation at 50° C. for 30 minutes under an atmosphere of nitrogen gas by using a high pressure mercury lamp, and the alignment was immobilized, and thus, a phase difference film of Example 10 was formed. The precipitation of the crystals was not observed on a coated film during a period from the coating to the polymerization.

As a result of measuring the prepared phase difference film in a Tip-Tilt mode by using AxoScan manufactured by Axometrics, Inc, it was confirmed that the average tilt angle of the liquid crystal calculated by the device was 2.1 degrees, and thus, it was possible to form an A-plate type phase difference film. In addition, a phase difference measured by using the device was 143 nm.

In addition, a film thickness measured by using a non-contact three-dimensional surface shape measurement system (BW-A501, manufactured by Nikon Corporation) was 2.0 nm, and Δn at a wavelength of 550 nm calculated from a ratio of the phase difference to the film thickness was 0.071.

<Formation of Selective Reflection Films 1 to 6 (Single-Layer Liquid Crystal Layer)>

[Selective Reflection Film 1]

A polymerizable composition coating liquid (1) having compositions described below was prepared by using the exemplary compounds synthesized as described above.

A polymerizable composition coating liquid (1) was applied onto a rubbing treatment surface of PET manufactured by Fujifilm Corporation, which had been subjected to a rubbing treatment, at a room temperature by using a wire bar such that the thickness of the dried film after being dried became 5.2 μm. The coated layer was dried at a room temperature for 10 seconds, and then, was heated at an atmosphere of 75° C. for 2 minutes, and after that, was subjected to UV irradiation at 50° C. and an output of 80% for 8 seconds by a D bulb (a lamp of 90 mW/cm) manufactured by Fusion UV Systems, Inc., and thus, a selective reflection film 1 was obtained. The precipitation of the crystals was not observed on a coated film during a period from the coating to the heating. A transmission spectrum of the film was measured by using a spectrophotometer UV-3100PC manufactured by SHIMADZU CORPORATION, and thus, the transmission spectrum had a selective reflection peak having a center at 565 nm, and a half-width of the selective reflection peak was 26 nm. A ratio (Δλ/λ) of the half-width of the selective reflection wavelength range to the center wavelength of the selective reflection was 0.046.

The obtained transmission spectrum is illustrated in FIG. 1.

[Selective Reflection Film 2]

A polymerizable composition coating liquid (2) having compositions described below was prepared by the same method as that of the polymerizable composition coating liquid (1).

Polymerizable Composition Coating Liquid (2)
Compound 1-3 80 parts by mass
Compound 2-3 20 parts by mass
Chiral Agent LC-756 (manufactured by BASF SE) 5.3 parts by mass
Air Interface Alignment Agent (1) 0.07 parts by mass Polymerization Initiator IRGACURE819 (manufactured by BASF SE) 3 parts by mass
Solvent Methyl Ethyl Ketone 250 parts by mass
Solvent Cyclohexanone 50 parts by mass The polymerizable composition coating liquid (2) was applied onto a rubbing treatment surface of PET manufactured by Fujifilm Corporation, which had been subjected to a rubbing treatment, at a room temperature by using a wire bar such that the thickness of the dried film after being dried became 5.1 The coated layer was dried at a room temperature for 10 seconds, and then, was heated at an atmosphere of 75° C. for 2 minutes, and after that, was subjected to UV irradiation at 50° C. and an output of 80% for 8 seconds by a D bulb (a lamp of 90 mW/cm) manufactured by Fusion UV Systems, Inc., and thus, a selective reflection film 2 was obtained. The precipitation of the crystals was not observed on a coated film during a period from the coating to the heating. A transmission spectrum of the film was measured by using a spectrophotometer UV-3100PC manufactured by SHIMADZU CORPORATION, and thus, the transmission spectrum had a selective reflection peak having a center at 464 nm, and a half-width of the selective reflection peak was 20 nm. A ratio ($\Delta 80 /\lambda$) of the half-width of the selective reflection wavelength range to the center wavelength of the selective reflection was 0.043.

[Selective Reflection Film 3]

A polymerizable composition coating liquid (3) having compositions described below was prepared by the same method as that of the polymerizable composition coating liquid (1).

Polymerizable Composition Coating Liquid (3)
Compound 1-3 80 parts by mass
Compound 2-3 20 parts by mass
Chiral Agent LC-756 (manufactured by BASF SE) 4.0 parts by mass
Air Interface Alignment Agent (1) 0.07 parts by mass
Polymerization Initiator IRGACURE819 (manufactured by BASF SE) 3 parts by mass
Solvent Methyl Ethyl Ketone 250 parts by mass
Solvent Cyclohexanone 50 parts by mass The polymerizable composition coating liquid (3) was applied onto a rubbing treatment surface of PET manufactured by Fujifilm Corporation, which had been subjected to a rubbing treatment, at a room temperature by using a wire bar such that the thickness of the dried film after being dried became 6.1 μm. The coated layer was dried at a room temperature for 10 seconds, and then, was heated at an atmosphere of 75° C. for 2 minutes, and after that, was subjected to UV irradiation at 50° C. and an output of 80% for 8 seconds by a D bulb (a lamp of 90 mW/cm) manufactured by Fusion UV Systems, Inc., and thus, a selective reflection film 3 was obtained. The precipitation of the crystals was not observed on a coated film during a period from the coating to the heating. A transmission spectrum of the film was measured by using a spectrophotometer UV-3100PC manufactured by SHIMADZU CORPORATION, and thus, the transmission spectrum had a selective reflection peak having a center at 645 nm, and a half-width of the selective reflection peak was 30 nm. A ratio ($\Delta\lambda/\lambda$) of the half-width of the selective reflection wavelength range to the center wavelength of the selective reflection was 0.048.

[Selective Reflection Film 4]

A polymerizable composition coating liquid (7) having compositions described below was prepared by using the exemplary compounds synthesized as described above.

Polymerizable Composition Coating Liquid (7)
Compound 1-26 55 parts by mass
Compound 2-8 30 parts by mass
Compound (M-1) 13 parts by mass
Compound (M-2) 2 parts by mass
Polymerization Initiator IRGACURE819 (manufactured by BASF SE) 3 parts by mass
Chiral Agent LC756 (manufactured by BASF SE) 4.4 parts by mass
Alignment Agent (2) 0.01 parts by mass
Alignment Agent (3) 0.02 parts by mass
Methyl Acetate 260 parts by mass
Cyclohexanone 65 parts by mass Compound M-2

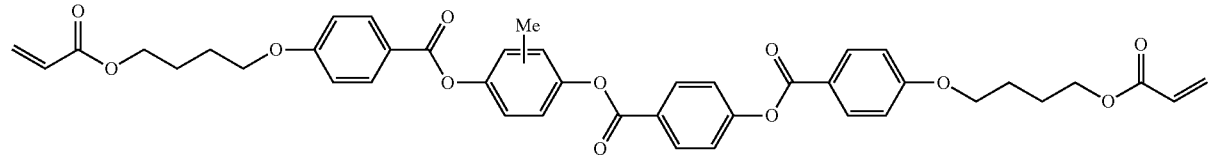

Alignment Agent (2)

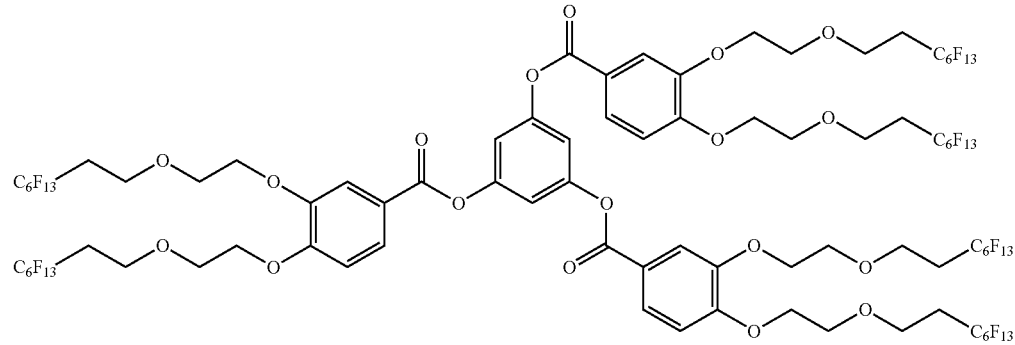

Alignment Agent (3)

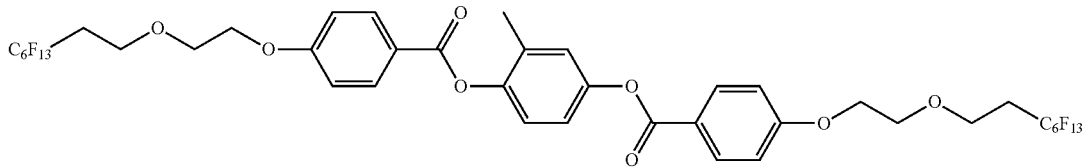

The polymerizable composition coating liquid (7) was applied onto a rubbing treatment surface of PET (A-4100) manufactured by TOYOBO CO., LTD., which had been subjected to a rubbing treatment, at a room temperature by using a wire bar such that the thickness of the dried film after being dried became 4.5 μm. The coated layer was dried at a room temperature for 30 seconds, and then, was heated at an atmosphere of 85° C. for 1 minute, and was subjected to UV irradiation at 60° C. by using a high pressure mercury lamp under an atmosphere of nitrogen gas such that irradiation dose became 300 mJ/cm$^2$, and thus, a selective reflection film 4 was obtained. The precipitation of the crystals was not observed on a coated film during a period from the coating to the heating.

A transmission spectrum of the film was measured by using a spectrophotometer UV-3100PC manufactured by SHIMADZU CORPORATION, and thus, the transmission spectrum had a selective reflection peak having a center at 544 nm, and a half-width of the selective reflection peak was 33 nm. A ratio (WA) of the half-width of the selective reflection wavelength range to the center wavelength of the selective reflection was 0.062.

[Selective Reflection Film 5]

A polymerizable composition coating liquid (8) having compositions described below was prepared by using the exemplary compounds synthesized as described above.

Polymerizable Composition Coating Liquid (8)
Compound 1-28 55 parts by mass
Compound 2-34 30 parts by mass
Compound (M-1) 13 parts by mass
Compound (M-2) 2 parts by mass
Polymerization Initiator IRGACURE819 (manufactured by BASF SE) 3 parts by mass
Chiral Agent LC756 (manufactured by BASF SE) 4.4 parts by mass
Alignment Agent (2) 0.01 parts by mass
Alignment Agent (3) 0.02 parts by mass
Methyl Acetate 260 parts by mass
Cyclohexanone 65 parts by mass The polymerizable composition coating liquid (8) was applied onto a rubbing treatment surface of PET (A-4100) manufactured by TOYOBO CO., LTD., which had been subjected to a rubbing treatment, at a room temperature by using a wire bar such that the thickness of the dried film after being dried became 4.5 μm. The coated layer was dried at a room temperature for 30 seconds, and then, was heated at an atmosphere of 85° C. for 1 minute, and was subjected to UV irradiation at 60° C. by using a high pressure mercury lamp under an atmosphere of nitrogen gas such that irradiation dose became 300 mJ/cm$^2$, and thus, a selective reflection film 5 was obtained. The precipitation of the crystals was not observed on a coated film during a period from the coating to the heating.

A transmission spectrum of the film was measured by using a spectrophotometer UV-3100PC manufactured by SHIMADZU CORPORATION, and thus, the transmission spectrum had a selective reflection peak having a center at 570 nm, and a half-width of the selective reflection peak was 35 nm. A ratio ($\Delta\lambda/\lambda$) of the half-width of the selective reflection wavelength range to the center wavelength of the selective reflection was 0.061.

[Selective Reflection Film 6]

A polymerizable composition coating liquid (9) having compositions described below was prepared by using the exemplary compounds synthesized as described above.

Polymerizable Composition Coating Liquid (9)
Compound 1-36 55 parts by mass
Compound 2-35 30 parts by mass
Compound (M-1) 13 parts by mass
Compound (M-2) 2 parts by mass
Polymerization Initiator IRGACURE819 (manufactured by BASF SE) 3 parts by mass
Chiral Agent LC756 (manufactured by BASF SE) 4.4 parts by mass
Alignment Agent (2) 0.01 parts by mass
Alignment Agent (3) 0.02 parts by mass
Methyl Acetate 260 parts by mass
Cyclohexanone 65 parts by mass The polymerizable composition coating liquid (9) was applied onto a rubbing treatment surface of PET (A-4100) manufactured by TOYOBO CO., LTD., which had been subjected to a rubbing treatment, at a room temperature by using a wire bar such that the thickness of the dried film after being dried became 4.5 μm. The coated layer was dried at a room temperature for 30 seconds, and then, was heated at an atmosphere of 85° C. for 1 minute, and was subjected to UV irradiation at 60° C. by using a high pressure mercury lamp under an atmosphere of nitrogen gas such that irradiation dose became 300 mJ/cm$^2$, and thus, a selective reflection film 6 was obtained. The precipitation of the crystals was not observed on a coated film during a period from the coating to the heating.

A transmission spectrum of the film was measured by using a spectrophotometer UV-3100PC manufactured by SHIMADZU CORPORATION, and thus, the transmission spectrum had a selective reflection peak having a center at 588 nm, and a half-width of the selective reflection peak was 40 nm. A ratio ($\Delta\lambda/\lambda$) of the half-width of the selective reflection wavelength range to the center wavelength of the selective reflection was 0.068.

<Preparation 1 of Laminated Film (Including Two or More Liquid Crystal Layers)>

Figure 2:
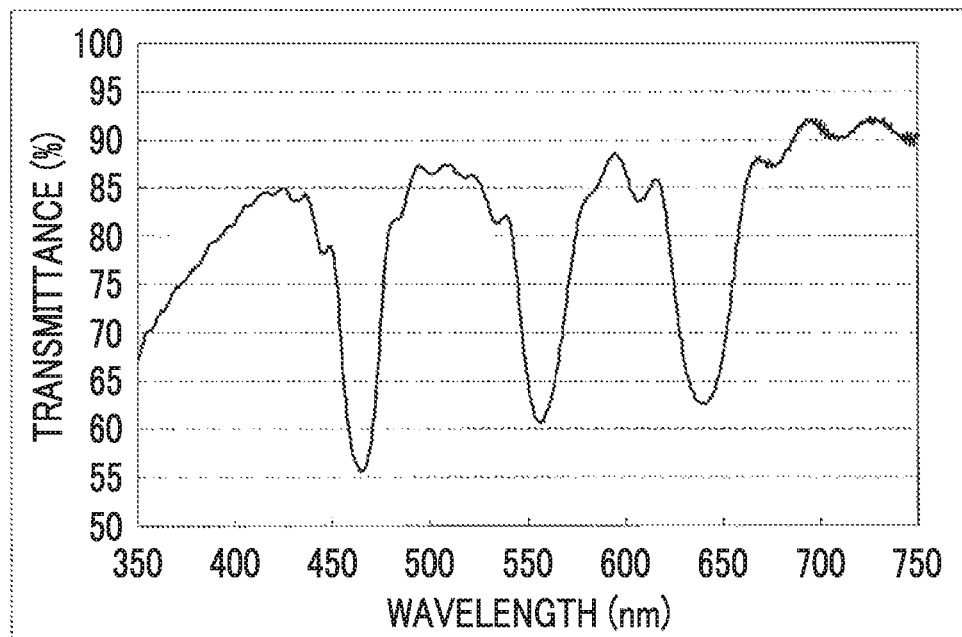
FIG. 2 is a diagram illustrating a transmission spectrum of a laminated film 2 which is prepared in an example.

A liquid crystal layer of the polymerizable composition coating liquid (1) was formed on a liquid crystal layer of the selective reflection film 2 by using the same conditions as the conditions in which a liquid crystal layer was formed in the selective reflection film 1, and thus, a laminated film 1 was obtained. Next, a liquid crystal layer of the polymerizable composition coating liquid (3) was formed on a liquid crystal layer of the laminated film 1 by using the same conditions as the conditions in which a liquid crystal layer was formed in the selective reflection film 3, and thus, a laminated film 2 was obtained. The surfaces of the laminated films 1 and 2 had no cissing defect, and were even. A transmission spectrum of the laminated film 2 was measured by using a spectrophotometer UV-3100PC manufactured by SHIMADZU CORPORATION, and thus, it was found that the transmission spectrum had a selective reflection peak having a center at each of 464 nm, 563 nm, and 640 nm, and had high visible light transmittance of greater than or equal to 70%. The obtained transmission spectrum is illustrated in FIG. 2.

<Preparation 2 of Laminated Film (Including Two or More Liquid Crystal Layers)>

A polymerizable composition coating liquid (4) having compositions described below was prepared by using the exemplary compounds synthesized as described above.

Polymerizable Composition Coating Liquid (4)
Compound 1-3 55 parts by mass
Compound 2-3 30 parts by mass
Compound (M-1) 13 parts by mass
Compound (M-2) 2 parts by mass
Polymerization Initiator IRGACURE819 (manufactured by BASF SE) 3 parts by mass
Chiral Agent LC756 (manufactured by BASF SE) 3.7 parts by mass
Alignment Agent (2) 0.01 parts by mass
Alignment Agent (3) 0.02 parts by mass
Methyl Acetate 260 parts by mass
Cyclohexanone 65 parts by mass The polymerizable composition coating liquid (4) was applied onto a rubbing treatment surface of PET (A-4100) manufactured by TOYOBO CO., LTD., which had been subjected to a rubbing treatment, at a room temperature by using a wire bar such that the thickness of the dried film after being dried became 5.0 µm. The coated layer was dried at a room temperature for 30 seconds, and then, was heated at an atmosphere of 85° C. for 1 minute, and was subjected to UV irradiation at 60° C. by using a high pressure mercury lamp under an atmosphere of nitrogen gas such that irradiation dose became 300 mJ/cm², and thus, a selective reflection film 4 was obtained. The precipitation of the crystals was not observed on a coated film during a period from the coating to the heating.

A transmission spectrum of the film was measured by using a spectrophotometer UV-3100PC manufactured by SHIMADZU CORPORATION, and thus, the transmission spectrum had a selective reflection peak having a center at 672 nm, and a half-width of the selective reflection peak was 40 nm. A ratio (Δλ/λ) of the half-width of the selective reflection wavelength range to the center wavelength of the selective reflection was 0.059.

Polymerizable composition coating liquids (5) and (6) having compositions described below were prepared by the same method as that of the polymerizable composition coating liquid (4).

Polymerizable Composition Coating Liquid (5)
Compound 1-3 55 parts by mass
Compound 2-3 30 parts by mass
Compound (M-1) 13 parts by mass
Compound (M-2) 2 parts by mass
Polymerization Initiator IRGACURE819 (manufactured by BASF SE) 3 parts by mass
Chiral Agent LC756 (manufactured by BASF SE) 4.7 parts by mass
Alignment Agent (2) 0.005 parts by mass
Alignment Agent (3) 0.01 parts by mass
Methyl Acetate 260 parts by mass
Cyclohexanone 65 parts by mass
Polymerizable Composition Coating Liquid (6)
Compound 1-3 55 parts by mass
Compound 2-3 30 parts by mass
Compound (M-1) 13 parts by mass
Compound (M-2) 2 parts by mass
Polymerization Initiator IRGACURE819 (manufactured by BASF SE) 3 parts by mass
Chiral Agent LC756 (manufactured by BASF SE) 5.4 parts by mass
Alignment Agent (2) 0.005 parts by mass
Alignment Agent (3) 0.01 parts by mass
Methyl Acetate 260 parts by mass
Cyclohexanone 65 parts by mass The polymerizable composition coating liquid (5) was applied onto the surface of a liquid crystal layer of the selective reflection film 4 at a room temperature by using a wire bar such that the thickness of the dried film after being dried became 4.1 µm (the total film thickness including the thickness of the underlayer was 9.2 µm). The coated layer was dried at a room temperature for 30 seconds, and then, was heated at an atmosphere of 85° C. for 1 minute, and was subjected to UV irradiation at 60° C. by using a high pressure mercury lamp under an atmosphere of nitrogen gas such that irradiation dose became 300 mJ/cm², and thus, a laminated film 3 was obtained.

Further, the polymerizable composition coating liquid (6) was applied onto the surface of a liquid crystal layer of the laminated film 3 at a room temperature by using a wire bar such that the thickness of the dried film after being dried became 3.9 µm (the total film thickness including the thickness of the underlayer was 13.1 µm). The coated layer was dried at a room temperature for 30 seconds, and then, was heated at an atmosphere of 85° C. for 1 minute, and was subjected to UV irradiation at 60° C. by using a high pressure mercury lamp under an atmosphere of nitrogen gas such that irradiation dose became 300 mJ/cm², and thus, a laminated film 4 was obtained.

Figure 3:
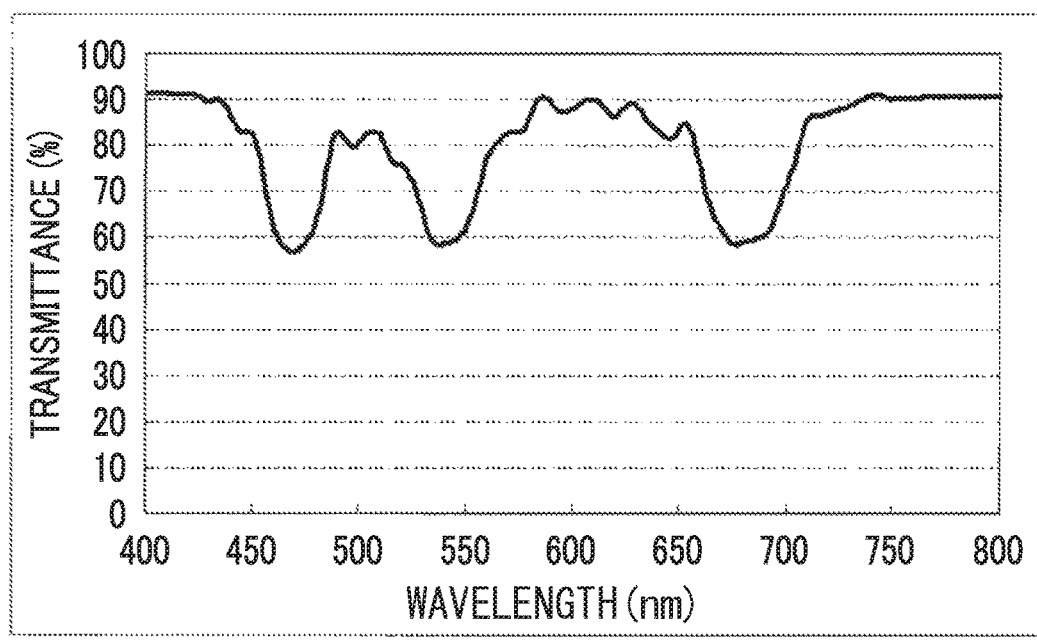
FIG. 3 is a diagram illustrating a transmission spectrum of a laminated film 4 which is prepared in an example.

A transmission spectrum of the laminated film 4 was measured by using a spectrophotometer UV-3100PC manufactured by SHIMADZU CORPORATION, and thus, it was found that the transmission spectrum had a selective reflection peak having a center at each of 680 nm, 538 nm, and 466 nm, and had high visible light transmittance of greater than or equal to 75%. The obtained transmission spectrum is illustrated in FIG. 3.

<Preparation of Half Mirror 1>

A UV curable adhesive Exp. U12034-6 manufactured by DIC CORPORATION was applied onto the laminated film 2 on the liquid crystal layer side at a room temperature by using a wire bar such that the thickness of the dried film after being dried became 5 µm. In a state where polarizing plates were arranged to be orthogonal to each other, and the laminated film 2 was disposed between the polarizing plates, a surface of a methacrylic transparent base material ("ACRYLITE L", manufactured by Mitsubishi Rayon Co., Ltd.), which had a thickness of 5 mm and had a maximum phase difference of 5 nm in a plane of 10 cm square in which in-plane color unevenness was invisible, and an adhesive coating surface of the laminated film 2 were bonded to each other, and were subjected to UV irradiation, and the PET film of the laminated film 2 was peeled off, and thus, a half mirror for displaying a projection image 1 including an acrylic base material was prepared.

What is claimed is:

1. A polymerizable composition, comprising:
   at least two types of polymerizable compounds represented by Formula (I);

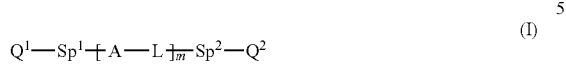
   (I)

in the formula, A represents a phenylene group which may have a substituent or a trans-1,4-cyclohexylene group which may have a substituent,
   L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—,
   m represents an integer of 3 to 12,
   Sp$^1$ and Sp$^2$ each independently represent a single bond or a linking group selected from the group consisting of a linear alkylene group or a branched alkylene group having 1 to 20 carbon atoms, and a group in which one or two or more —CH$_2$—'s in the linear alkylene group or the branched alkylene group having 1 to 20 carbon atoms are substituted with —O—, —S—, —NH—, —N(CH$_3$)—, —C(=O)—, —OC(=O)—, or —C(=O)O—,
   Q$^1$ and Q$^2$ each independently represent a polymerizable group selected from the group consisting of a hydrogen atom or groups represented by Formula (Q-1) to Formula (Q-5) below, and any one of Q$^1$ and Q$^2$ represents a polymerizable group,

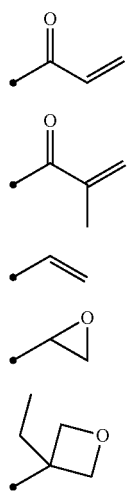

(Q-1)
   (Q-2)
   (Q-3)
   (Q-4)
   (Q-5)

wherein when a number obtained by dividing the number of trans-1,4-cyclohexylene groups which may have a substituent and are represented by A by m is set to mc, at least one type of the polymerizable compounds satisfies 0.5<mc<0.7, and other at least one type of the polymerizable compound satisfies 0.1<mc<0.3, and
   wherein the mass ratio of the polymerizable compounds satisfying 0.5<mc<0.7 and the polymerizable compound satisfying 0.1<mc<0.3 is 80:20 to 50:50.

2. The polymerizable composition according to claim 1, wherein in Formula (I), the substituent that the phenylene group and the trans-1,4-cyclohexylene group may have is selected from the group consisting of an alkyl group, an alkoxy group, and a group represented by —C(=O)—X$^3$-Sp$^3$-Q$^3$, and here, X$^3$ represents a single bond, —O—, —S—, or —N(Sp$^4$-Q$^4$)-, or represents a nitrogen atom which forms a cyclic structure along with Q$^3$ and Sp$^3$, Sp$^3$ and Sp$^4$ each independently represent a single bond or a linking group selected from the group consisting of a linear alkylene group or a branched alkylene group having 1 to 20 carbon atoms, and a group in which one or two or more —CH$_2$-'s in the linear alkylene group or the branched alkylene group having 1 to 20 carbon atoms are substituted with —O—, —S—, —NH—, —N(CH$_3$)—, —C(=O)—, —OC(=O)—, or —C(=O)O—, and Q$^3$ and Q$^4$ each independently represent any one polymerizable group selected from the group consisting of a hydrogen atom, a cycloalkyl group, a group in which one or two or more —CH$_2$-'s in the cycloalkyl group are substituted with —O—, —S—, —NH—, —N(CH$_3$)—, —C(=O)—, —OC(=O)—, or —C(=O)O—, or groups represented by Formula (Q-1) to Formula (Q-5).

3. The polymerizable composition according to claim 1, wherein in Formula (I), m is an integer of 3 to 5.

4. The polymerizable composition according to claim 1, wherein the compound represented by Formula (I) has a partial structure represented by Formula (II) below;

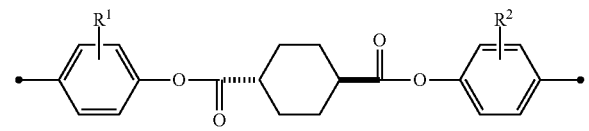
   (II)

in the formula, R$^1$ and R$^2$ are each independently selected from the group consisting of a hydrogen atom, an alkyl group, an alkoxy group, and a group represented by —C(=O)—X$^3$-Sp$^3$-Q$^3$, and here, X$^3$ represents a single bond, —O—, —S—, or —N(Sp$^4$-Q$^4$)-, or represents a nitrogen atom which forms a cyclic structure along with Q$^3$ and Sp$^3$, Sp$^3$ and Sp$^4$ each independently represent a single bond or a linking group selected from the group consisting of a linear alkylene group or a branched alkylene group having 1 to 20 carbon atoms, and a group in which one or two or more —CH$_2$-'s in the linear alkylene group or the branched alkylene group having 1 to 20 carbon atoms are substituted with —O—, —S—, —NH—, —N(CH$_3$)—, —C(=O)—, —OC(=O)—, or —C(=O)O—, and Q$^3$ and Q$^4$ each independently represent any one polymerizable group selected from the group consisting of a hydrogen atom, a cycloalkyl group, a group in which one or two or more —CH$_2$-'s in the cycloalkyl group are substituted with —O—, —S—, —NH—, —N(CH$_3$)—, —C(=O)—, —OC(=O)—, or —C(=O)O—, or groups represented by Formula (Q-1) to Formula (Q-5).

5. The polymerizable composition claim 4, wherein R$^1$ and R$^2$ are each independently —C(=O)—X$^3$-Sp$^3$-Q$^3$, and X$^3$ is —O—.

6. The polymerizable composition according to claim 4, wherein R$^1$ and R$^2$ are identical to each other.

7. The polymerizable composition according to claim 4, comprising:
   at least one type of a compound represented by Formula (V) and at least one type of a compound represented by Formula (VI);

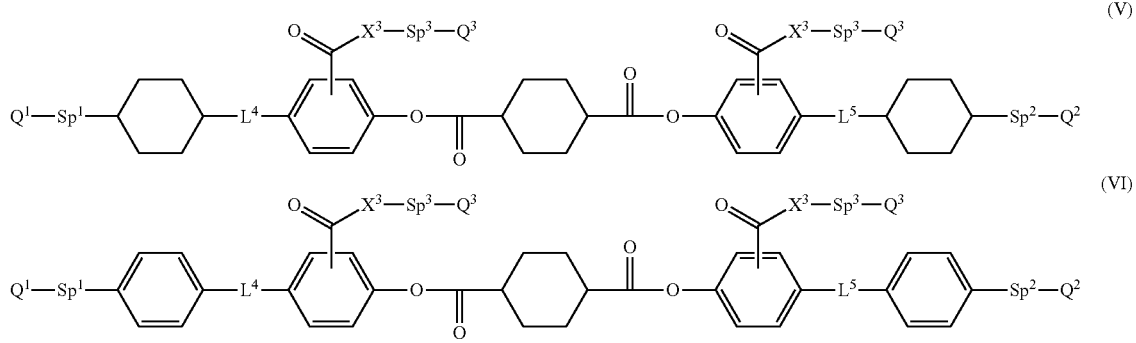

in the formulas, $L^4$ and $L^5$ each independently represent a single bond or a linking group selected from the group consisting of —C(=O)O—, —OC(=O)—, and —OC(=O)O—.

8. The polymerizable composition according to claim 1, further comprising:
a cross-linking agent.

9. The polymerizable composition according to claim 1, further comprising:
a polymerization initiator.

10. The polymerizable composition according to claim 1, further comprising:
a chiral compound.

11. A film, comprising:
a layer obtained by curing the polymerizable composition according to claim 1.

12. A film, comprising:
two or more layers obtained by curing the polymerizable composition according to claim 1.

13. The film according to claim 11,
wherein the film exhibits selective reflection, and
Δλ/λ which is a ratio of a half-width Δλ of a wavelength range of the selective reflection to a center wavelength λ of the selective reflection is less than or equal to 0.09.

14. The film according to claim 11,
wherein the film reflects visible light.

15. A film, comprising:
at least three layers formed of the polymerizable composition according to claim 1,
wherein the three layers are a layer formed by immobilizing a cholesteric liquid crystalline phase having a center wavelength of selective reflection in a red light wavelength range, a layer formed by immobilizing a cholesteric liquid crystalline phase having a center wavelength of selective reflection in a green light wavelength range, and a layer formed by immobilizing a cholesteric liquid crystalline phase having a center wavelength of selective reflection in a blue light wavelength range.

16. A half mirror for displaying a projection image, comprising:
the film according to claim 15.

17. The half mirror for displaying a projection image according to claim 16, further comprising:
a base material which is inorganic glass or an acrylic resin.

18. The half mirror for displaying a projection image according to claim 16, further comprising:
an antireflection layer on an outermost surface.

* * * * *